(12) United States Patent
Gholmieh et al.

(10) Patent No.: US 12,356,297 B2
(45) Date of Patent: Jul. 8, 2025

(54) TECHNIQUES FOR SERVICE STATES IN A SERVICE-BASED WIRELESS SYSTEM

(71) Applicant: QUALCOMM Incorporated, San Diego, CA (US)

(72) Inventors: Aziz Gholmieh, Del Mar, CA (US); Miguel Griot, La Jolla, CA (US); Gavin Bernard Horn, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 486 days.

(21) Appl. No.: 17/948,041

(22) Filed: Sep. 19, 2022

(65) Prior Publication Data

US 2024/0098468 A1    Mar. 21, 2024

(51) Int. Cl.
*H04W 76/27* (2018.01)
*H04W 4/20* (2018.01)
*H04W 4/50* (2018.01)
*H04W 60/00* (2009.01)
(Continued)

(52) U.S. Cl.
CPC ............ *H04W 4/50* (2018.02); *H04W 60/00* (2013.01); *H04W 76/10* (2018.02); *H04W 76/36* (2018.02)

(58) Field of Classification Search
CPC ....... H04W 4/50; H04W 60/00; H04W 76/10; H04W 76/36; H04W 76/27; H04W 76/30; H04W 88/085; H04W 48/18; H04W 4/20
See application file for complete search history.

(56) References Cited

U.S. PATENT DOCUMENTS

| 9,014,023 | B2 | 4/2015 | Anthony, Jr. et al. |
| 9,658,876 | B2 * | 5/2017 | Chang ................. H04L 12/6418 |
| 11,356,887 | B2 * | 6/2022 | Huang .................. H04W 76/12 |

(Continued)

OTHER PUBLICATIONS

3GPP TS 38.401 V17.1.1: "3rd Generation Partnership Project, Technical Specification Group Radio Access Network, NG-RAN, Architecture description (Release 17)", 3GPP TS 38.401, 3Rd Generation Partnership Project, Mobile Competence Centre, 650, Route Des Lucioles, F-06921 Sophia-Antipolis Cedex, France, vol. RAN WG3, No. V17.1.1, Jul. 5, 2022, pp. 1-122, XP052183629, paragraph [8.9.6].

(Continued)

*Primary Examiner* — Andrew Wendell
(74) *Attorney, Agent, or Firm* — Holland & Hart LLP

(57) ABSTRACT

Methods, systems, and devices for wireless communications are described. In the context of a service-based wireless system, a user equipment (UE) may communicate with one or more core network services offered by a service-based network, where respective core network services are in one of an active, inactive, or unconnected state at the UE. The UE may be configured to maintain service contexts for communicating with core network services that are in an active or an inactive state at the UE, where signaling between the UE and each respective core network service may be used to activate or deactivate the respective core network services at the UE between the active and inactive states. By maintaining service contexts for inactive core network services, the UE may be able to quickly and efficiently resume communications with a core network service in accordance with the stored service context upon activating the core network service.

30 Claims, 18 Drawing Sheets

(51) Int. Cl.
    *H04W 76/10*     (2018.01)
    *H04W 76/36*     (2018.01)

(56) References Cited

U.S. PATENT DOCUMENTS

| | | | |
|---|---|---|---|
| 11,503,519 B2* | 11/2022 | Sharma | H04W 76/10 |
| 2012/0149421 A1* | 6/2012 | Korus | H04W 4/10 |
| | | | 455/518 |
| 2012/0178457 A1* | 7/2012 | Liao | H04W 76/18 |
| | | | 455/437 |
| 2017/0374620 A1* | 12/2017 | Yadav | H04W 48/06 |
| 2020/0275515 A1* | 8/2020 | Li | H04W 76/34 |
| 2022/0038925 A1 | 2/2022 | Agarwal et al. | |
| 2022/0104181 A1* | 3/2022 | Velev | H04W 72/04 |
| 2023/0380008 A1* | 11/2023 | Huang-Fu | H04W 76/38 |
| 2024/0314670 A1* | 9/2024 | Alvarez Flores | H04W 40/12 |

OTHER PUBLICATIONS

International Search Report and Written Opinion—PCT/US2023/073938—ISA/EPO—Jan. 26, 2024.

\* cited by examiner

TECHNIQUES FOR SERVICE STATES IN A SERVICE-BASED WIRELESS SYSTEM

FIELD OF TECHNOLOGY

The following relates to wireless communications, including techniques for service states in a service-based wireless system.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

In the context of a service-based wireless system, different core network services offered by a service-based network may be in different activation or service states (e.g., active state, inactive state, unconnected state) at a UE. For example, a first core network service may be in an active state, and a second core network service may be in an inactive state.

SUMMARY

The described techniques relate to improved methods, systems, devices, and apparatuses that support techniques for service states in a service-based wireless system. Generally, aspects of the present disclosure are directed to signaling that may be used to selectively adjust activation states (e.g., service states) of core network service at a user equipment (UE). In particular, aspects of the present disclosure are directed to signaling, configurations, and other mechanisms that enable UEs to subscribe to core network services, exchange signaling indicating whether respective core network services are in an active or inactive state, and to maintain context information for both active and inactive core network services to facilitate quick service re-establishment. Moreover, aspects of the present disclosure may enable network entities and the core network services themselves to maintain context information for performing communications associated with the respective core network services in order to facilitate efficient communications within the service-based wireless communications system.

A method for wireless communication at a UE is described. The method may include communicating, via a distributed unit (DU), a first service message with a first core network service offered by a service-based network, the first service message communicated in accordance with a first service context for communicating with the first core network service, the first service context maintained at the UE based on the first core network service being in an active state at the UE, transmitting, to the DU, a request to activate a second core network service offered by the service-based network, the second core network service associated with a second service context for communicating with the second core network service, where the second service context is maintained at the UE based on the second core network service being in an inactive state at the UE, receiving, from the DU in response to the request, a message indicating an activation of the second core network service at the UE, and communicating, via a DU, a second service message with the second core network service in accordance with the second service context based on the activation of the second core network service at the UE.

An apparatus for wireless communication at a UE is described. The apparatus may include a processor, memory coupled with the processor, and instructions stored in the memory. The instructions may be executable by the processor to cause the apparatus to communicate, via a DU, a first service message with a first core network service offered by a service-based network, the first service message communicated in accordance with a first service context for communicating with the first core network service, the first service context maintained at the UE based on the first core network service being in an active state at the UE, transmit, to the DU, a request to activate a second core network service offered by the service-based network, the second core network service associated with a second service context for communicating with the second core network service, where the second service context is maintained at the UE based on the second core network service being in an inactive state at the UE, receive, from the DU in response to the request, a message indicating an activation of the second core network service at the UE, and communicate, via a DU, a second service message with the second core network service in accordance with the second service context based on the activation of the second core network service at the UE.

Another apparatus for wireless communication at a UE is described. The apparatus may include means for communicating, via a DU, a first service message with a first core network service offered by a service-based network, the first service message communicated in accordance with a first service context for communicating with the first core network service, the first service context maintained at the UE based on the first core network service being in an active state at the UE, means for transmitting, to the DU, a request to activate a second core network service offered by the service-based network, the second core network service associated with a second service context for communicating with the second core network service, where the second service context is maintained at the UE based on the second core network service being in an inactive state at the UE, means for receiving, from the DU in response to the request, a message indicating an activation of the second core network service at the UE, and means for communicating, via a DU, a second service message with the second core network service in accordance with the second service context based on the activation of the second core network service at the UE.

A non-transitory computer-readable medium storing code for wireless communication at a UE is described. The code may include instructions executable by a processor to communicate, via a DU, a first service message with a first core network service offered by a service-based network, the first service message communicated in accordance with a first service context for communicating with the first core network service, the first service context maintained at the UE based on the first core network service being in an active state at the UE, transmit, to the DU, a request to activate a second core network service offered by the service-based network, the second core network service associated with a second service context for communicating with the second core network service, where the second service context is maintained at the UE based on the second core network service being in an inactive state at the UE, receive, from the DU in response to the request, a message indicating an activation of the second core network service at the UE, and communicate, via a DU, a second service message with the second core network service in accordance with the second service context based on the activation of the second core network service at the UE.

Some examples of the method, apparatuses, and non-transitory computer-readable medium described herein may further include operations, features, means, or instructions for transmitting, to the DU, a second request to establish service with a third core network service based on the third core network service being in an unconnected state at the UE, receiving, from the DU based on the second request, a second message indicating a third service context for communicating with the third core network service, and storing the third service context in memory based on transitioning the third core network service from the unconnected state to one of the active state or the inactive state at the UE.

Some examples of the method, apparatuses, and non-transitory computer-readable medium described herein may further include operations, features, means, or instructions for communicating, with the DU, a second message indicating a deactivation of the first core network service at the UE, where the first service context may be maintained at the UE based on the deactivation.

In some examples of the method, apparatuses, and non-transitory computer-readable medium described herein, the deactivation of the first core network service may be based on signaling from the first core network service, a release of a wireless connection between the UE and the DU, a radio link failure, a failure of one or more messages transmitted from the UE to the first core network service, or any combination thereof.

Some examples of the method, apparatuses, and non-transitory computer-readable medium described herein may further include operations, features, means, or instructions for identifying that all core network services including the first core network service and the second core network service may have been deactivated at the UE and releasing a wireless connection with the DU based on the identifying.

Some examples of the method, apparatuses, and non-transitory computer-readable medium described herein may further include operations, features, means, or instructions for transmitting, via the request, a network address associated with the second core network service, a third service message associated with the second core network service, or both.

Some examples of the method, apparatuses, and non-transitory computer-readable medium described herein may further include operations, features, means, or instructions for transmitting, to the DU, a second request to activate a third core network service offered by the service-based network, the third core network service associated with a third service context for communicating with the third core network service, where the third service context may be maintained at the UE based on third core network service being in an inactive state at the UE and receiving, from the DU based on the second request, a second message indicating an activation failure of the third core network service.

Some examples of the method, apparatuses, and non-transitory computer-readable medium described herein may further include operations, features, means, or instructions for removing the third service context from memory based on receiving the second message indicating the activation failure of the third service context.

A method for wireless communication at a DU is described. The method may include communicating a first service message between a UE and a first core network service offered by a service-based network, the first service message communicated in accordance with a first service context for communicating with the first core network service, the first service context maintained at the DU based on the first core network service being in an active state at the UE, receiving a request to activate a second core network service offered by the service-based network from an inactive state to the active state at the UE, the second core network service associated with a second service context for communicating with the second core network service, transmitting, to the UE based on the request, a message indicating an activation of the second core network service at the UE, and communicating a second service message between the UE and the second core network service in accordance with the second service context based on the activation of the second core network service at the UE.

An apparatus for wireless communication at a DU is described. The apparatus may include a processor, memory coupled with the processor, and instructions stored in the memory. The instructions may be executable by the processor to cause the apparatus to communicate a first service message between a UE and a first core network service offered by a service-based network, the first service message communicated in accordance with a first service context for communicating with the first core network service, the first service context maintained at the DU based on the first core network service being in an active state at the UE, receive a request to activate a second core network service offered by the service-based network from an inactive state to the active state at the UE, the second core network service associated with a second service context for communicating with the second core network service, transmit, to the UE based on the request, a message indicating an activation of the second core network service at the UE, and communicate a second service message between the UE and the second core network service in accordance with the second service context based on the activation of the second core network service at the UE.

Another apparatus for wireless communication at a DU is described. The apparatus may include means for communicating a first service message between a UE and a first core network service offered by a service-based network, the first service message communicated in accordance with a first service context for communicating with the first core network service, the first service context maintained at the DU based on the first core network service being in an active state at the UE, means for receiving a request to activate a second core network service offered by the service-based network from an inactive state to the active state at the UE, the second core network service associated with a second service context for communicating with the second core network service, means for transmitting, to the UE based on the request, a message indicating an activation of the second core network service at the UE, and means for communicating a second service message between the UE and the second core network service in accordance with the second service context based on the activation of the second core network service at the UE.

A non-transitory computer-readable medium storing code for wireless communication at a DU is described. The code may include instructions executable by a processor to communicate a first service message between a UE and a first core network service offered by a service-based network, the first service message communicated in accordance with a first service context for communicating with the first core network service, the first service context maintained at the DU based on the first core network service being in an active state at the UE, receive a request to activate a second core network service offered by the service-based network from an inactive state to the active state at the UE, the second core network service associated with a second service context for communicating with the second core network service, transmit, to the UE based on the request, a message indicating an activation of the second core network service at the UE, and communicate a second service message between the UE and the second core network service in accordance with the second service context based on the activation of the second core network service at the UE.

Some examples of the method, apparatuses, and non-transitory computer-readable medium described herein may further include operations, features, means, or instructions for communicating, with the UE, the first core network service, or both, a second message indicating a deactivation of the first core network service at the UE.

Some examples of the method, apparatuses, and non-transitory computer-readable medium described herein may further include operations, features, means, or instructions for reallocating a set of resources that were previously allocated for wireless communications between the UE and the first core network service to an additional UE, an additional core network service, or both, where the reallocation may be based on the second message indicating the deactivation of the first core network service.

In some examples of the method, apparatuses, and non-transitory computer-readable medium described herein, the deactivation of the first core network service may be based on signaling from the first core network service, signaling from the UE, a release of a wireless connection between the UE and the DU, a radio link failure, a failure of one or more messages transmitted from the UE to the first core network service, or any combination thereof.

Some examples of the method, apparatuses, and non-transitory computer-readable medium described herein may further include operations, features, means, or instructions for establishing a wireless connection with the UE based on a handover procedure from a second DU to the DU and obtaining the first service context associated with the first core network service from the first core network service, an additional core network service, or both, based on establishing the wireless connection, where communicating the first service message may be based on obtaining the first service context.

Some examples of the method, apparatuses, and non-transitory computer-readable medium described herein may further include operations, features, means, or instructions for transmitting the request to the second core network service based on receiving the request and receiving, from the second core network service based on transmitting the request, an acknowledgment of the activation of the second core network service, where transmitting the message indicating the activation of the second core network service may be based on the acknowledgment.

Some examples of the method, apparatuses, and non-transitory computer-readable medium described herein may further include operations, features, means, or instructions for receiving, via the request, a network address associated with the second core network service, a third service message associated with the second core network service, or both, where transmitting the request to the second core network service may be based on receiving the network address, the third service message, or both.

Some examples of the method, apparatuses, and non-transitory computer-readable medium described herein may further include operations, features, means, or instructions for receiving, from the UE, a second request to activate a third core network service offered by the service-based network at the UE, the third core network service associated with a third service context for communicating with the third core network service and transmitting, to the UE based on the second request, a second message indicating an activation failure of the third core network service.

Some examples of the method, apparatuses, and non-transitory computer-readable medium described herein may further include operations, features, means, or instructions for identifying that all core network services including the first core network service and the second core network service may have been deactivated at the UE and releasing a wireless connection with the UE based on the identifying.

A method for wireless communication at a core network service offered by a service-based network is described. The method may include communicating, via a DU, a first service message with a UE in accordance with a first UE context for communicating with the UE, the first UE context maintained at the core network service based on the core network service being in an active state at the UE, receiving, from the DU, a message indicating a deactivation of the core network service at the UE, where the first UE context is maintained in memory based on the message indicating the deactivation of the core network service at the UE, receiving, from the DU, a request to activate the core network service at the UE, and communicating, via the DU, a second service message with the UE in accordance with the first UE context and based on maintaining the first UE context in memory and receiving the request to activate the core network service at the UE.

An apparatus for wireless communication at a core network service offered by a service-based network is described. The apparatus may include a processor, memory coupled with the processor, and instructions stored in the memory. The instructions may be executable by the processor to cause the apparatus to communicate, via a DU, a first service message with a UE in accordance with a first UE context for communicating with the UE, the first UE context maintained at the core network service based on the core network service being in an active state at the UE, receive, from the DU, a message indicating a deactivation of the core network service at the UE, where the first UE context is maintained in memory based on the message indicating the deactivation of the core network service at the UE, receive, from the DU, a request to activate the core network service at the UE, and communicate, via the DU, a second service message with the UE in accordance with the first UE context and based on maintaining the first UE context in memory and receiving the request to activate the core network service at the UE.

Another apparatus for wireless communication at a core network service offered by a service-based network is described. The apparatus may include means for communicating, via a DU, a first service message with a UE in accordance with a first UE context for communicating with the UE, the first UE context maintained at the core network service based on the core network service being in an active state at the UE, means for receiving, from the DU, a message indicating a deactivation of the core network service at the UE, where the first UE context is maintained in memory based on the message indicating the deactivation of the core network service at the UE, means for receiving, from the DU, a request to activate the core network service at the UE, and means for communicating, via the DU, a second service message with the UE in accordance with the first UE context and based on maintaining the first UE context in memory and receiving the request to activate the core network service at the UE.

A non-transitory computer-readable medium storing code for wireless communication at a core network service offered by a service-based network is described. The code may include instructions executable by a processor to communicate, via a DU, a first service message with a UE in accordance with a first UE context for communicating with the UE, the first UE context maintained at the core network service based on the core network service being in an active state at the UE, receive, from the DU, a message indicating a deactivation of the core network service at the UE, where the first UE context is maintained in memory based on the message indicating the deactivation of the core network service at the UE, receive, from the DU, a request to activate the core network service at the UE, and communicate, via the DU, a second service message with the UE in accordance with the first UE context and based on maintaining the first UE context in memory and receiving the request to activate the core network service at the UE.

Some examples of the method, apparatuses, and non-transitory computer-readable medium described herein may further include operations, features, means, or instructions for receiving, from the DU, a second request to establish service with a second UE based on the core network service being in an unconnected state at the second UE, transmitting, to the DU based on the second request, a second message indicating a first service context for communicating with the core network service, and storing a second UE context associated with the second UE in memory based on transmitting the second message indicating the first service context.

Some examples of the method, apparatuses, and non-transitory computer-readable medium described herein may further include operations, features, means, or instructions for receiving, from the DU, a second request for a first service context associated with wireless communications with the core network service based on a handover procedure from a second DU to the DU and transmitting, to the DU based on the second request, the first service context associated with the core network service, where communicating the first service message may be based on the first service context.

Some examples of the method, apparatuses, and non-transitory computer-readable medium described herein may further include operations, features, means, or instructions for transmitting, to the DU, a second message indicating the deactivation of the core network service at the UE, where receiving the message indicating the deactivation may be based on the second message.

In some examples of the method, apparatuses, and non-transitory computer-readable medium described herein, the deactivation of the core network service may be based on signaling from the core network service, a release of a wireless connection between the UE and the DU, a radio link failure, a failure of one or more messages transmitted from the UE to the core network service, or any combination thereof.

DETAILED DESCRIPTION

Figure 1:
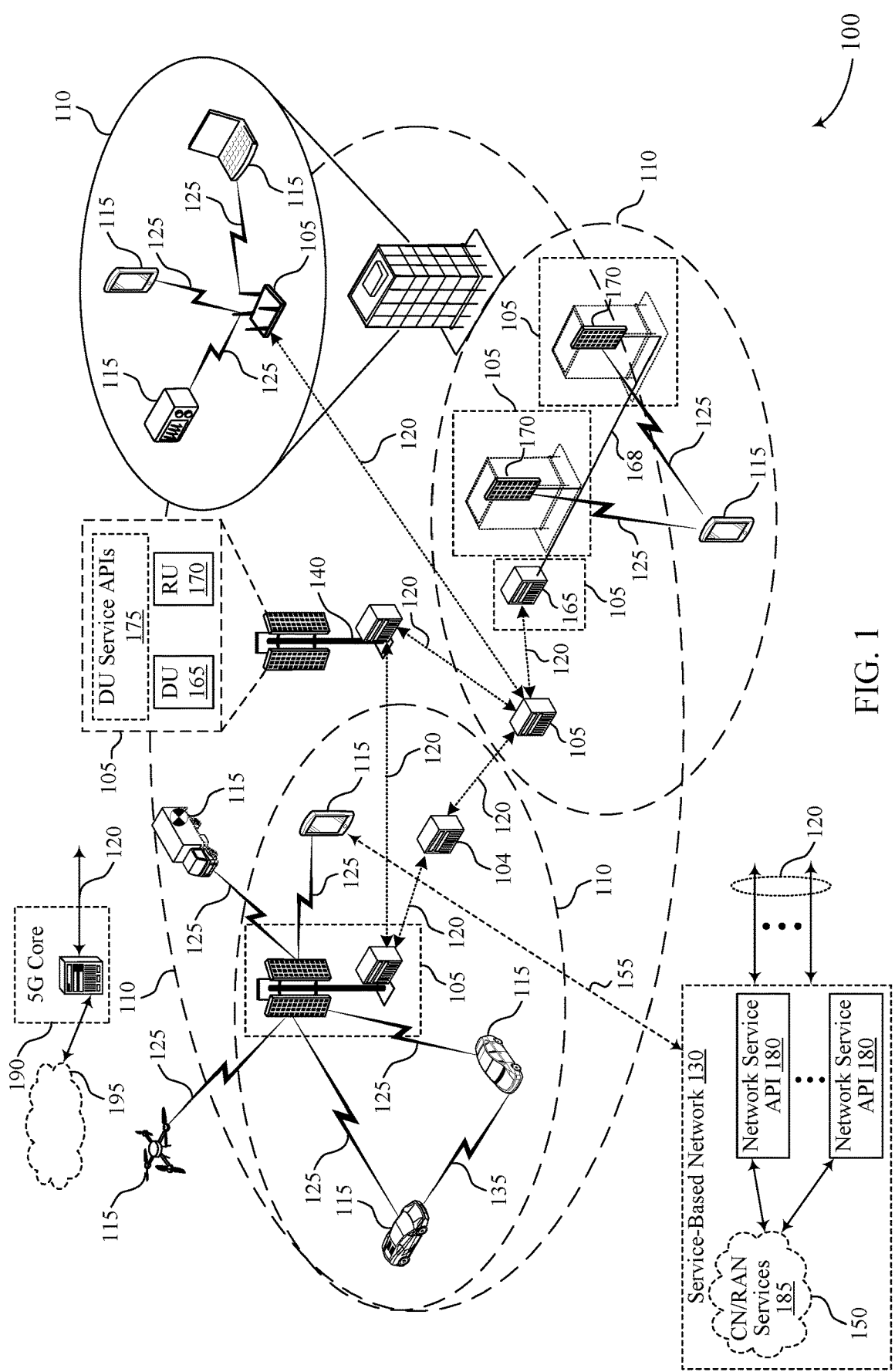
FIG. 1 illustrates an example of a wireless communications system that supports techniques for service states in a service-based wireless system in accordance with one or more aspects of the present disclosure.

Some wireless systems may exhibit a relatively vertical, hierarchal architecture that includes many "layers" of different devices that perform functions for the system. For example, a wireless system may include user equipments (UEs), base stations/network entities, and numerous back-end (e.g., core network) devices associated with one or more functions for the system. Such a hierarchal structure may result in processing and other functions being performed at multiple devices (e.g., duplicative processing or capabilities across multiple back-end devices), thereby leading to wasted resources and excess power consumption. Additionally, the back-end architecture of some wireless systems may be owned and maintained by a small handful of operators, which may make it difficult for other parties/entities to integrate with the systems and may complicate the ability of the systems to offer customized services and functionality to wireless devices.

Comparatively, some wireless systems, such as Sixth Generation (6G) systems, may exhibit a flatter, service-based architecture in which a radio access network (RAN) (e.g., network entities) interfaces with a service-based network in order to connect UEs to core network services maintained at various network addresses within the service-based network. In the context of a service-based system, operations and functions that may otherwise be performed by a few centralized back-end components (e.g., in some systems) may be distributed across a number of core network services that may be hosted at different network addresses, such as in a cloud-based architecture. As a result, UEs in a service-based system may be able to establish and maintain connections with (e.g., "subscribe" to) different core network services or groups thereof on an à la carte basis, where each core network service offers or provides a respective network functionality or service. For example, a service-based system may include a mobility service, a security service, a privacy service, a location service, and the like. In this regard, each UE within a service-based system may be able to select to which core network services the UE will subscribe based on the individualized characteristics or needs of the respective UE.

In some wireless systems, a RAN may interface with a service-based network that offers various core network services, and may relay communications between UEs and the respective core network services. In such cases, a UE may "subscribe" to different core network services, where each respective core network service may be in a different activation state at the UE (e.g., active state, inactive state, unconnected state). For example, a first core network service may be in an active state, a second core network service may be in an inactive state, and a third core network service may be in an unconnected state at the UE. The UE may be able to actively perform communications with core network services in the active state. Comparatively, the UE may be unable to perform communications with core network services in the inactive or unconnected states. However, some conventional, non-service-based wireless communications systems do not provide any signaling or other mechanisms that enable core network services to be individually activated and deactivated at UEs.

Accordingly, aspects of the present disclosure are directed to signaling that may be used to selectively adjust activation states (e.g., service states) of core network services at a UE. In particular, aspects of the present disclosure are directed to signaling, configurations, and other mechanisms that enable UEs to subscribe to core network services, exchange signaling indicating whether respective core network services are in an active or inactive state, and to maintain context information for both active and inactive core network services to facilitate quick service re-establishment. Moreover, aspects of the present disclosure may enable network entities and the core network services themselves to maintain context information for performing communications associated with the respective core network services in order to facilitate efficient communications within the service-based wireless communications system.

As it is used herein, the term "context information" may be used to refer to information maintained at devices (e.g., UEs, network entities, core network services) that enable the respective devices to communicate with other devices. Context information may include identifiers associated with other devices, communications parameters (e.g., type/format of communications), feedback procedures between devices, resources for communications between devices, and the like. Context information may include "service context" information, which may include information stored/maintained by UEs and/or network entities for communicating with core network services, and "UE context" information, which may include information stored/maintained by core network services and/or network entities for communicating with UEs (e.g., UE context may enable core network services to communicate with UEs via a relay provided by a DU).

For example, a UE may subscribe to a first core network service and a second core network service, where the first core network service is in an active state at the UE and the second core network service is in an inactive state at the UE. The UE may maintain (e.g., store in memory) a first service context for the first core network service and a second service context for the second core network service based on the respective core network services being in the active and inactive states at the UE, respectively. In this regard, the UE may communicate with the first core network service in accordance with the first service context. Subsequently, the UE may transmit or receive a communication that activates the second core network service at the UE. Upon activating the second core network service to the active state, the UE may communicate with the second core network service in accordance with the second service context.

Context information used for performing core network services (e.g., service context, UE context) for active and inactive core network services may be stored in one or more places across the respective devices in order to facilitate quick service re-establishment. For example, when a core network service is in an active state at the UE, the context information for performance of the service may be maintained in three places: (1) the UE, (2) the serving network entity (e.g., distributed unit (DU)), and (3) the core network service itself. Comparatively, when a core network service is in an inactive state, the context information for performance of the core network service may be maintained at two places: (1) the UE, and (2) the core network service. Maintaining context information for core network services in the inactive state may enable the UE and the respective core network service to quickly re-establish communications.

Aspects of the disclosure are initially described in the context of wireless communications systems. Additional aspects of the disclosure are described in the context of an example network architecture, example activation state configurations, and an example process flow. Aspects of the disclosure are further illustrated by and described with reference to apparatus diagrams, system diagrams, and flow-charts that relate to techniques for service states in a service-based wireless system.

FIG. 1 illustrates an example of a wireless communications system 100 that supports techniques for service states in a service-based wireless system in accordance with one or more aspects of the present disclosure. The wireless communications system 100 may include one or more network entities 105, one or more UEs 115, and a service-based network 130. In some examples, the wireless communications system 100 may implement aspects of a 6G network, a 5G network (e.g., a New Radio (NR) network), a 4G network (e.g., a Long Term Evolution (LTE) network, an LTE-Advanced (LTE-A) network, an LTE-A Pro network), or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, access point, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the service-based network 130, or with one another, or both. For example, network entities 105 may communicate with the service-based network 130 via one or more backhaul communication links 120 (e.g., in accordance with an S1, N2, N3, or other interface protocol). Similarly, UEs 115 may communicate with the service-based network 130 via one or more communication links 155. In some examples, network entities 105 may communicate with one another via a backhaul communication link 120 (e.g., in accordance with an X2, Xn, or other interface protocol) either directly (e.g., directly between network entities 105) or indirectly (e.g., via a service-based network 130). In some examples, network entities 105 may communicate with one another via one or more communication links such as a fronthaul communication link 168 (e.g., between a radio unit 170 and a distributed unit 165). The backhaul communication links 120 or fronthaul communication links 168, or other communication links between network entities 105, may be or include one or more wired links (e.g., an electrical link, an optical fiber link), one or more wireless links (e.g., a radio link, a wireless optical link), among other examples or various combinations thereof.

In some examples, network entities 105 may communicate with a service platform 150 (e.g., a cloud platform) that provides one or more core network services (CN services), one or more radio access network services (RAN services), or any combinations thereof (CN/RAN services 185). The CN/RAN services may be provided via the service-based network 130, using one or more APIs. For example, one or more DU service APIs 175 may provide an interface for one or more services at a UE 115. The services at the UE 115 may correspond to one or more CN/RAN services 185 at service platform 150. For example, network service APIs 180 at service-based network 130 may interface with corresponding DU service APIs 175 at a DU 165, which interface with corresponding APIs at a UE 115 to provide service connectivity between the one or more UE 115 services and corresponding CN/RAN services 185.

One or more of the network entities 105 described herein may include or may be referred to as a base station 140 (e.g., a base transceiver station, a radio base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, a 6G NB, or other suitable terminology). In some examples, a network entity 105 (e.g., a base station 140) may be implemented in an aggregated (e.g., monolithic, standalone) base station architecture, which may be configured to utilize a service-based architecture and provide radio access within a single network entity 105 (e.g., a single RAN node, such as a base station 140, may include a RU 170, a DU 165, and DU APIs 175 for CN/RAN services 185). An RU 170 may also be referred to as a radio head, a smart radio head, a remote radio head (RRH), a remote radio unit (RRU), or a transmission reception point (TRP).

Additionally, in some examples, one or more network entities 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU), a DU 165, RU 170, a RAN Intelligent Controller (RIC) (e.g., a Near-Real Time RIC (Near-RT RIC), a Non-Real Time RIC (Non-RT RIC)), a Service Management and Orchestration (SMO) system, or any combination thereof. One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between components (e.g., CU, DU, and RU) is flexible and may support different functionalities depending on which functions (e.g., network layer functions, protocol layer functions, baseband functions, RF functions, and any combinations thereof) are performed at a component. For example, a functional split of a protocol stack may be employed between a CU and a DU 165 such that the CU may support one or more layers of the protocol stack and the DU 165 may support one or more different layers of the protocol stack. In some examples, the CU may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). In some examples, the CU may host one or more service APIs for one or more CN/RAN services 185 via corresponding network service APIs 180 of service-based network 130. The CU may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU and a DU 165, or between a DU 165 and an RU 170 may be within a protocol layer (e.g., some functions for a protocol layer may be performed by one of a CU, a DU 165, or an RU 170, while other functions of the protocol layer are performed by a different one of the CU, the DU 165, or the RU 170). A DU 165 may be connected to one or more RUs 170 via a fronthaul communication link 168 (e.g., open fronthaul (FH) interface). In some examples, a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a service-based network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support techniques for capability indication to multiple services in a service-based wireless system as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs, RUs 170, RIC, SMO).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., 4G, 5G, 6G radio access technology). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID), or others). In some examples, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate using the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications via the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that uses the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

In some deployments, multiple RANs may be accessed by one or more UEs 115 or network entities 105 such as, for example, a 6G RAT and a 5G RAT. In some examples, the 6G RAT may be associated with service-based network 130 and the 5G RAT may be associated with a 5G Core 190. The 5G core 190 may provide user authentication, access authorization, tracking, Internet Protocol (IP) connectivity, and other access, routing, or mobility functions. The 5G core 190 may be an evolved packet core (EPC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the 5G core 190. User IP packets may be transferred through the user plane entity, which may provide IP address allocation as well as other functions. The user plane entity may be connected to IP services 195 for one or more network operators. The IP services 195 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may also operate using a super high frequency (SHF) region, which may be in the range of 3 GHz to 30 GHz, also known as the centimeter band, or using an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, such techniques may facilitate using antenna arrays within a device. The propagation of EHF transmissions, however, may be subject to even greater attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

In some examples, the wireless communications system 100 may include a packet-based network that operates using a cloud platform, such as service platform 150, that provides CN/RAN services 185. The CN/RAN services 185, in some examples, may be hosted based on a deployment topology and capabilities for service parameters associated with each service. Providing CN/RAN services 185 allows for separation of particular services (e.g., mobility, connection state management, security, paging, radio access services, quality of service (QoS) configuration and data services, UE capability management, location, messaging, among others) from transport functions (e.g., data radio bearer (DRB) and logical channel (LC) management, data service configuration, among others). Service-based functions (e.g., a message broker decouple radio network procedures from network delivery mechanisms) may allow for flexibility of some functions (e.g., layer 2 (L2) functions) to be hosted anywhere in the cloud, and may enable enhanced scalability, resiliency, elasticity, agility, reuse, visibility, automation, failover, or any combinations thereof (e.g., each service across RAN and core network may scale independently by increasing or decreasing resources allocated across functions independently). Further, efficiency may be enhanced through providing real-time link management to the RAN edge, and allowing for adaptation at the DU 165 for more efficient activation, deactivation, or selection of features based on UE conditions.

In some implementations, the wireless communications system 100 support signaling and other mechanisms that may be used to selectively adjust activation states of core network services (e.g., CN/RAN services 185) at a UE 115. In particular, aspects of the present disclosure are directed to signaling, configurations, and other mechanisms that enable UEs 115 to subscribe to core network services (e.g., CN/RAN services 185) of the service-based network 130, exchange signaling indicating whether respective core network services are in an active or inactive state, and to maintain context information for both active and inactive core network services to facilitate quick service re-establishment. Moreover, aspects of the present disclosure may enable network entities 105 (e.g., DUs 165) and the core network services themselves to maintain context information for performing communications associated with the respective core network services in order to facilitate efficient communications within the service-based wireless communications system.

For example, a UE 115 of the wireless communications system 100 may subscribe to a first core network service and a second core network service, where the first core network service is in an active state at the UE 115 and the second core network service is in an inactive state at the UE 115. The UE 115 may maintain (e.g., store in memory) a first service context for the first core network service and a second service context for the second core network service based on the respective core network services being in the active and inactive states at the UE 115, respectively. In this regard, the UE 115 may communicate with the first core network service in accordance with the first service context. Subsequently, the UE 115 may transmit or receive a communication that activates the second core network service at the UE 115. Upon activating the second core network service to the active state, the UE 115 may communicate with the second core network service in accordance with the second service context.

Context information used for performing core network services (e.g., service context, UE context) for active and inactive core network services may be stored or maintained in one or more places across the respective devices in order to facilitate quick service re-establishment. For example, when a core network service is in an active state at the UE 115, the context information for performance of the service may be maintained in three places: (1) the UE 115, (2) the serving network entity 105 (e.g., DU 165), and (3) the core network service itself. Comparatively, when a core network service is in an inactive state, the context information for performance of the core network service may be maintained at two places: (1) the UE 115, and (2) the core network service. Maintaining context information for core network services in the inactive state may enable the UE 115 and the respective core network service to quickly re-establish communications.

Techniques described herein may enable UEs 115 to subscribe to different core network services on an à la carte basis depending on the needs or requirements of the respective UEs 115, and to activate and deactivate the respective core network services. In this regard, aspects of the present disclosure enable different core network services to be maintained in different activation states at the UEs 115 depending on the needs or requirements of the respective UEs 115, and for core network services to be activated or deactivated independently of one another. As such, techniques described herein may enable UEs 115 to activate only those core network services that are required or expected, thereby reducing control signaling within the network and reducing power consumption at the UEs 115. Moreover, aspects of the present disclosure enable wireless devices to maintain (e.g., store) context information used for performance of respective core network services based on the activation states of each respective core network service at the UEs 115. In this regard, by enabling wireless devices to maintain context information for active and inactive core network services, techniques described herein may facilitate quick and efficient service re-establishment upon activation of a core network service, thereby reducing control signaling used to activate core network services and improving overall user experience.

Figure 2:
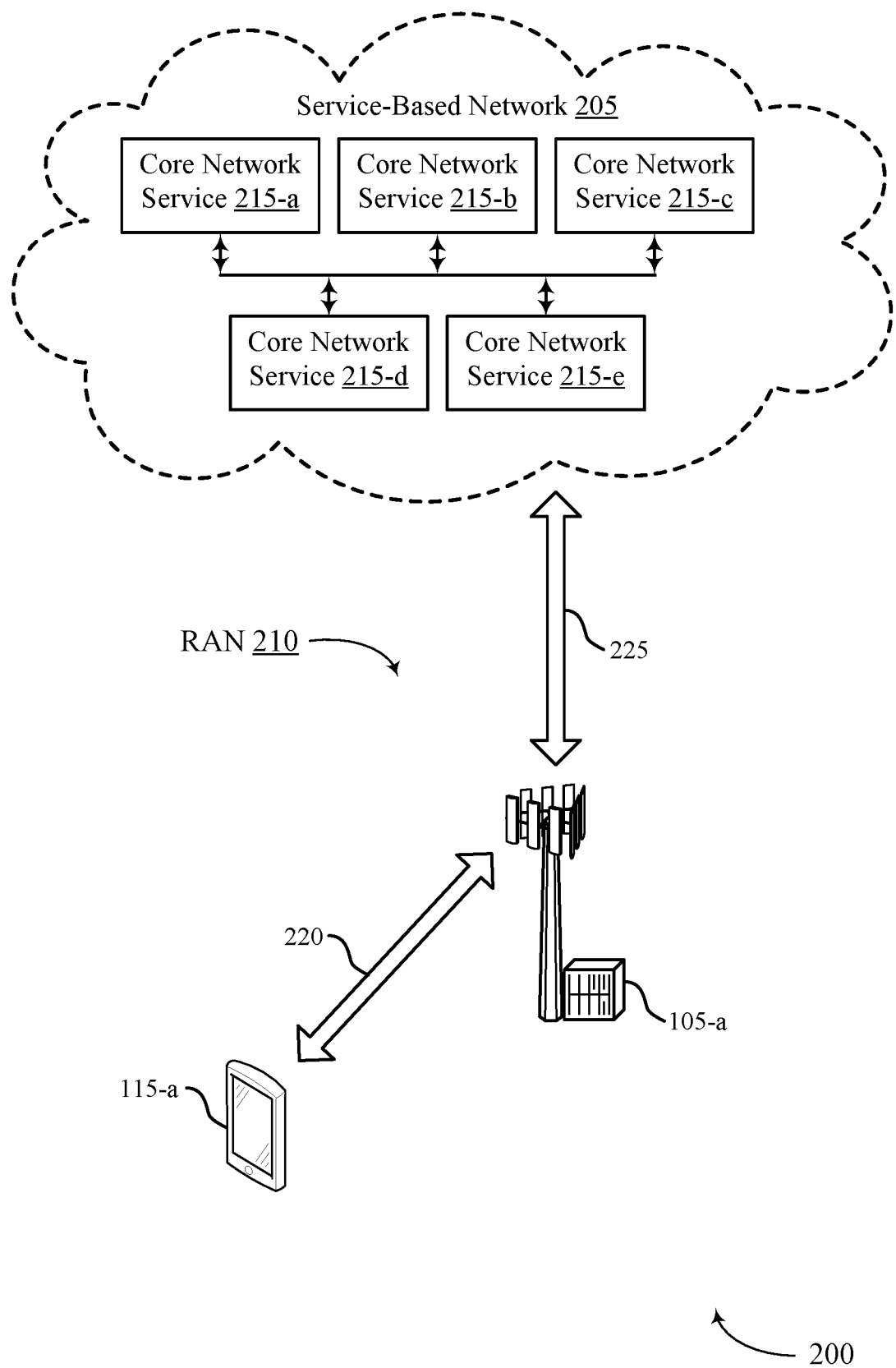
FIG. 2 illustrates an example of a wireless communications system that supports techniques for service states in a service-based wireless system in accordance with one or more aspects of the present disclosure.

FIG. 2 illustrates an example of a wireless communications system 200 that supports techniques for service states in a service-based wireless system in accordance with one or more aspects of the present disclosure. Aspects of the wireless communications system 200 may implement, or be implemented by, aspects of the wireless communications system 100. In some implementations, the wireless communications system 200 illustrates an example architecture of a service-based wireless communications system, such as a 6G network as described with reference to FIG. 1.

The wireless communications system 200 may include one or more UEs 115 (e.g., UE 115-a), one or more network entities (e.g., network entity 105-a), and a service-based network 205. In some aspects, the service-based network 205 may be configured to communicate or interface with a RAN 210 of the wireless communications system 200, where the RAN 210 includes the one or more network entities (e.g., network entity 105-a). The service-based network 205 may support or offer a set of core network services 215 (e.g., core network services 215-a, 215-b, 215-c, 215-d, 215-d, 215-e). In some implementations, the service-based network 205 may include or be associated with a cloud platform, where the respective core network services 215 are hosted at respective network addressees in the cloud platform.

The UE 115-a may communicate with the network entity 105-a using one or more communication links 220, which may include an example of an access link (e.g., a Uu link). The communication link 220 may include a bi-directional link that can include both uplink and downlink communication. Similarly, the network entity 105-a of the RAN 210 may be configured to communicate with (e.g., interface with) the service-based network 205 via one or more communication links (e.g., communication ink 225), where the communication link 215 may be configured to facilitate bi-directional communications between the network entity 105-a and each of the respective core network services 215 of the service-based network 205.

As shown in FIG. 2, the wireless communications system 200 may exhibit a service-based architecture where the entities of the RAN 210 (e.g., network entity 105-a) are configured to connect the UE 115-a to core network services 215 of the service-based network 205. In particular, the RAN 210 (e.g., network entity 105-a) may be configured to relay communications between the UE 115-a and the various core network services 215 of the service-based network to enable the UE 115-a to establish and maintain wireless connections with the respective core network services 215 in order to exchange communications associated with the various network functionalities that are supported by the respective core network services 215. In other words, the wireless communications system 200 may enable the UE 115-a to "subscribe" to the respective core network services 215 on an ala carte basis depending on the needs or requirements of the UE 115-a. In this regard, different UEs 115 within the wireless communications system 200 may be able to subscribe to different subsets of core network services 215 depending on the capabilities of the UEs 115, applications executed at the UEs 115, a mobility of the UEs 115, etc.

Each core network service 215 may be associated with a respective network address within the service-based network 205. Stated differently, each core network service 215 may be hosted at one or more components of a cloud-based network, where the components of each core network service 215 may be associated with a respective network address. The respective core network services 215 may be provided by network providers, third-party entities, etc., where each core network service 215 is configured to support a respective service or functionality offered to the components of the wireless communications system 200 (e.g., UE 115-a, network entity 105-a).

Different services, functionalities, and core network functions that may be supported or offered by the respective core network services 215 may include, but are not limited to, a mobility service, a security service, a privacy service, a location service, etc. For example, the first core network service 215-a may include a core network mobility service that that hosts information and provides signaling that facilitate the geographical movement of the UE 115-a throughout wireless communications system. By way of another example, the second core network service 215-b may include a security service that provides security and encryption services to subscribing UEs 115 within the wireless communications system 200.

In some aspects, each core network service 215 may include a respective API configured to facilitate wireless communications with the network entity 105-a and the UE 115-a, such as the network service APIs 180 illustrated in FIG. 1. APIs at the respective core network services 215 may include routing APIs, configuration APIs, or both. Routing APIs may be configured for service data unit communications between the UE 115-a and the respective core network services 215. Comparatively, configuration APIs may be configured to facilitate communications between the network entity 105-a and the respective core network services 215 to negotiate service requirements and service-specific operation.

In some aspects, the network entity 105-a (e.g., eDU) may facilitate traffic routing (e.g., service data unit routing) from the UE 115-a to the core network services 215, and vice versa. The network entity 105-a may facilitate traffic routing between the respective devices directly, via other network entities 105-a, via proxy, or any combination thereof. Moreover, in some cases, the UE 115-a may be communicatively coupled to multiple network entities 105 (e.g., dual connectivity), where the multiple network entities 105 facilitate traffic routing with the same or different sets of core network services 215. Additionally, the network entity 105-a may support service configurations or service contexts associated with communications parameters within the system, such as QoS flows, security, and UE 115 service contexts. In some aspects, the communication link 220 between the network entity 105-a and the UE 115-a may be associated with an access stratum configuration that facilitates over-the-air service awareness. The access stratum configuration may include including logical channels, access stratum security, access stratum context, and the like. For example, the access stratum configuration may be associated with a service-specific configuration (e.g., logical channels corresponding to QoS flows for each respective core network service 215) and a service-agnostic configuration (e.g., parameters which are common to all core network services 215).

The service-based wireless communications system 200 (e.g., 6G network) illustrated in FIG. 2 may exhibit several differences and advantages as compared to some other types of wireless systems, such as networks that instead exhibit a relatively more vertical, hierarchal architecture that includes many "layers" of different devices that perform functions for the network. A more hierarchal structure may result in processing and other functions being performed at multiple devices (e.g., network entity 105 and one or more back-end devices), thereby leading to inefficient use of resources and high power consumption. Additionally, the back-end architecture of a network with a more vertical, hierarchal architecture may be owned and maintained by a small handful of operators, which may render it difficult for other parties/ entities to integrate with such systems, and services offered to UEs 115 and other devices may be difficult to customize within such systems.

Comparatively, service-based wireless communications system 200 illustrated in FIG. 2 exhibits a flatter, horizontal architecture which enables the respective functions of wireless communications systems to be distributed across different components (e.g., core network services 215) of the system. For example, such functions and protocols may be divided up and distributed across the set of core network services 215 such that each core network service 215 may support or enable a small portion of the capabilities and functionality of conventional wireless communications systems. In other words, the service-based architecture may enable functions and protocols to be split into self-contained services (e.g., core network services 215) as compared to components that provide all-encompassing network functions and protocols (e.g., modularization of network services/functionality across multiple core network services 215).

In this regard, the wireless communications system 200 may illustrate an example of a cloud-native platform configured to host a merger of CORE and RAN services, which may simplify protocols and reduce a duplication of processing operations across CORE and RAN (e.g., redistribution of CORE and RAN 210 services). In other words, the convergence of RAN 210 and CN functions may reduce repeated operations and functionality to serve one UE at different layers.

The wireless communications system 200 may extend benefits associated with the service-based architecture of the service-based network 205 to the RAN 210, including benefits of increased scalability, resiliency, elasticity, agility, reuse, visibility, automation, and failover. Additionally, the service-based architecture may enable each core network service 215 across RAN 210 and CORE to scale independently by increasing or decreasing resources allocated across the respective core network services 215 independently.

In some implementations, as will be described in further detail herein, the wireless communications system 200 may support signaling that may be used to selectively adjust activation states of core network services 215 at a UE 115. In particular, aspects of the present disclosure are directed to signaling that enables the UE 115-a to subscribe to core network services 215 of the service-based network 205, exchange signaling indicating whether respective core network services 215 are in an active or inactive state, and to maintain context information for both active and inactive core network services 215 to facilitate quick service re-establishment.

Figure 3:
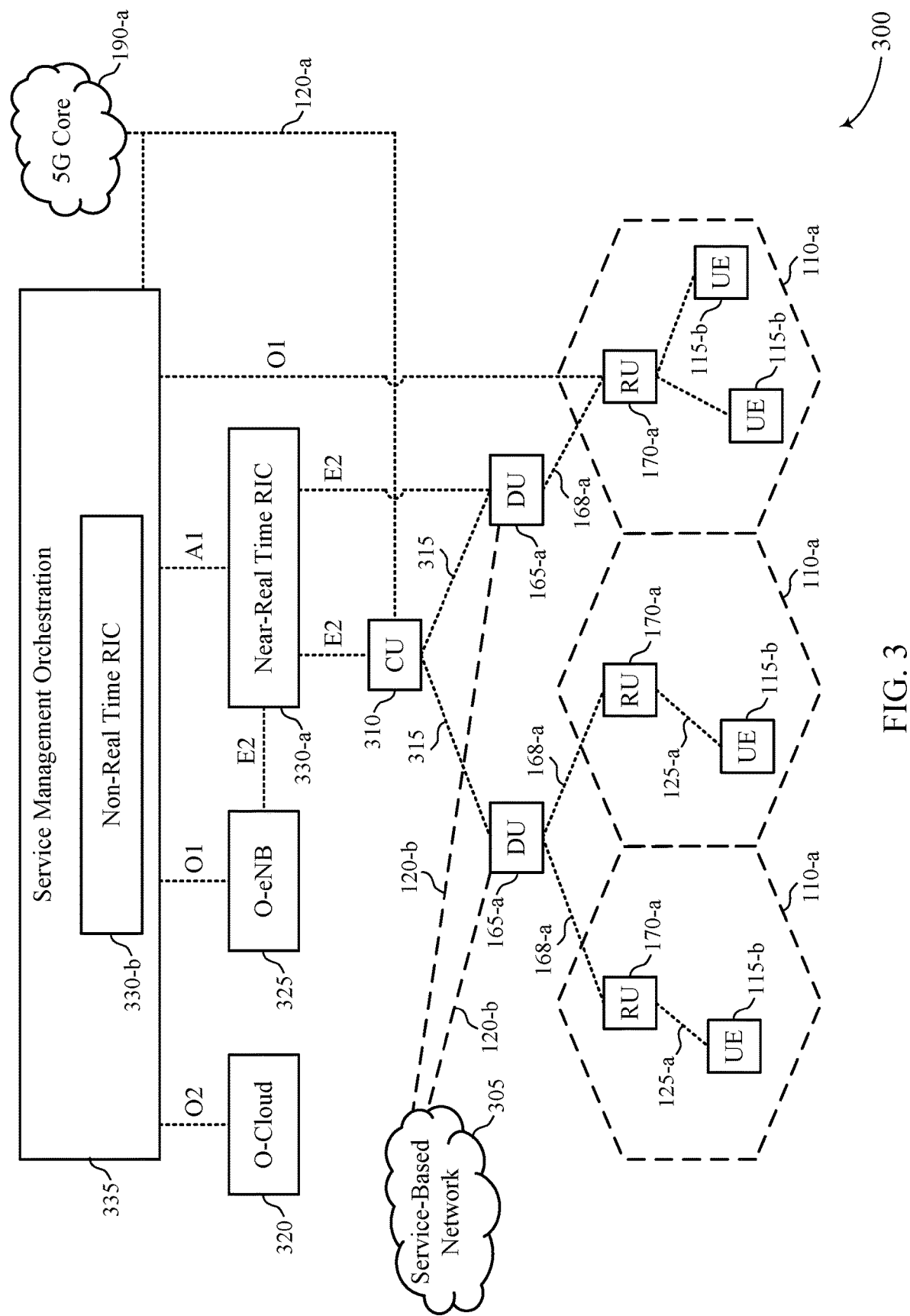
FIG. 3 illustrates an example of a network architecture that supports techniques for service states in a service-based wireless system in accordance with one or more aspects of the present disclosure.

FIG. 3 illustrates an example of a network architecture 300 (e.g., a disaggregated base station architecture, a disaggregated RAN architecture) that supports techniques for service states in a service-based wireless system in accordance with one or more aspects of the present disclosure. The network architecture 300 may illustrate an example for implementing one or more aspects of the wireless communications system 100. The network architecture 300 may include a service-based network 305, which may be an example of a service-based network 130 or 205, that communicates with DUs 165-a via links 120-b. In this example, DUs 165 may also communicate with one or more CUs 310 that may communicate directly with a 5G core 190-a via a backhaul communication link 120-a, or indirectly with the 5G core 190-a through one or more disaggregated network entities 105 (e.g., a Near-RT RIC 330-a via an E2 link, or a Non-RT RIC 330-b associated with an SMO 335 (e.g., an SMO Framework), or both). A CU 310 may communicate with one or more DUs 165-*a* via respective midhaul communication links 315 (e.g., an F1 interface). The DUs 165-*a* may communicate with one or more RUs 170-*a* via respective fronthaul communication links 168-*a*. The RUs 170-*a* may be associated with respective coverage areas 110-*a* and may communicate with UEs 115-*b* via one or more communication links 125-*a*. In some implementations, a UE 115-*b* may be simultaneously served by multiple RUs 170-*a*.

Each of the network entities 105 of the network architecture 300 (e.g., CUs 310, DUs 165-*a*, RUs 170-*a*, Non-RT RICs 330-*a*, Near-RT RICs 330-*b*, SMOs 335, Open Clouds (O-Clouds) 320, Open eNBs (O-eNBs) 325) may include one or more interfaces or may be coupled with one or more interfaces configured to receive or transmit signals (e.g., data, information) via a wired or wireless transmission medium. Each network entity 105, or an associated processor (e.g., controller) providing instructions to an interface of the network entity 105, may be configured to communicate with one or more of the other network entities 105 via the transmission medium. For example, the network entities 105 may include a wired interface configured to receive or transmit signals over a wired transmission medium to one or more of the other network entities 105. Additionally, or alternatively, the network entities 105 may include a wireless interface, which may include a receiver, a transmitter, or transceiver (e.g., an RF transceiver) configured to receive or transmit signals, or both, over a wireless transmission medium to one or more of the other network entities 105.

In some examples, a CU 310 may host one or more higher layer control functions. Such control functions may include RRC, PDCP, SDAP, or the like. Each control function may be implemented with an interface configured to communicate signals with other control functions hosted by the CU 310. A CU 310 may be configured to handle user plane functionality (e.g., CU-UP), control plane functionality (e.g., CU-CP), or a combination thereof. In some examples, a CU 310 may be logically split into one or more CU-UP units and one or more CU-CP units. A CU-UP unit may communicate bidirectionally with the CU-CP unit via an interface, such as an E1 interface when implemented in an O-RAN configuration. A CU 310 may be implemented to communicate with a DU 165-*a*, as necessary, for network control and signaling.

A DU 165-*a* may correspond to a logical unit that includes one or more functions (e.g., base station functions, RAN functions) to control the operation of one or more RUs 170-*a*. In some examples, when interfacing with service-based network 305, a DU 165-*a* may host one or more APIs for one or more services of the service-based network 305 and one or more corresponding services at one or more UEs 115-*b*. In some examples, when interfacing with CUs 310, a DU 165-*a* may host, at least partially, one or more of an RLC layer, a MAC layer, and one or more aspects of a PHY layer (e.g., a high PHY layer, such as modules for FEC encoding and decoding, scrambling, modulation and demodulation, or the like) depending, at least in part, on a functional split, such as those defined by the 3rd Generation Partnership Project (3GPP). In some examples, a DU 165-*a* may further host one or more low PHY layers. Each layer may be implemented with an interface configured to communicate signals with other layers hosted by the DU 165-*a*, or with control functions hosted by a CU 310.

In some examples, lower-layer functionality may be implemented by one or more RUs 170-*a*. For example, an RU 170-*a*, controlled by a DU 165-*a*, may correspond to a logical node that hosts RF processing functions, or low-PHY layer functions (e.g., performing fast Fourier transform (FFT), inverse FFT (iFFT), digital beamforming, physical random access channel (PRACH) extraction and filtering, or the like), or both, based at least in part on the functional split, such as a lower-layer functional split. In such an architecture, an RU 170-*a* may be implemented to handle over the air (OTA) communication with one or more UEs 115-*b*. In some implementations, real-time and non-real-time aspects of control and user plane communication with the RU(s) 170-*a* may be controlled by the corresponding DU 165-*a*. In some examples, such a configuration may enable a DU 165-*a* and a CU 310 to be implemented in a cloud-based RAN architecture, such as a vRAN architecture.

The SMO 335 may be configured to support RAN deployment and provisioning of non-virtualized and virtualized network entities 105. For non-virtualized network entities 105, the SMO 335 may be configured to support the deployment of dedicated physical resources for RAN coverage requirements which may be managed via an operations and maintenance interface (e.g., an O1 interface). For virtualized network entities 105, the SMO 335 may be configured to interact with a cloud computing platform (e.g., an O-Cloud 320) to perform network entity life cycle management (e.g., to instantiate virtualized network entities 105) via a cloud computing platform interface (e.g., an O2 interface). Such virtualized network entities 105 can include, but are not limited to, CUs 310, DUs 165-*a*, RUs 170-*a*, and Near-RT RICs 330-*a*. In some implementations, the SMO 335 may communicate with components configured in accordance with a 4G RAN (e.g., via an O1 interface). Additionally, or alternatively, in some implementations, the SMO 335 may communicate directly with one or more RUs 170-*a* via an O1 interface. The SMO 335 also may include a Non-RT RIC 330-*b* configured to support functionality of the SMO 335.

The Non-RT RIC 330-*b* may be configured to include a logical function that enables non-real-time control and optimization of RAN elements and resources, Artificial Intelligence (AI) or Machine Learning (ML) workflows including model training and updates, or policy-based guidance of applications/features in the Near-RT RIC 330-*a*. The Non-RT RIC 330-*b* may be coupled to or communicate with (e.g., via an A1 interface) the Near-RT RIC 330-*a*. The Near-RT RIC 330-*a* may be configured to include a logical function that enables near-real-time control and optimization of RAN elements and resources via data collection and actions over an interface (e.g., via an E2 interface) connecting one or more CUs 310, one or more DUs 165-*a*, or both, as well as an O-eNB 325, with the Near-RT RIC 330-*a*.

In some examples, to generate AI/ML models to be deployed in the Near-RT RIC 330-*b*, the Non-RT RIC 330-*b* may receive parameters or external enrichment information from external servers. Such information may be utilized by the Near-RT RIC 330-*a* and may be received at the SMO 335 or the Non-RT RIC 330-*b* from non-network data sources or from network functions. In some examples, the Non-RT RIC 330-*b* or the Near-RT RIC 330-*a* may be configured to tune RAN behavior or performance. For example, the Non-RT RIC 330-*b* may monitor long-term trends and patterns for performance and employ AI or ML models to perform corrective actions through the SMO 335 (e.g., reconfiguration via O1) or via generation of RAN management policies (e.g., A1 policies).

In some implementations, as will be described in further detail herein, the network architecture 300 may support that may be used to selectively adjust activation states of core network services at a UE 115. In particular, aspects of the present disclosure are directed to signaling that enables the UE 115-a to subscribe to core network services of a service-based network, exchange signaling indicating whether respective core network services are in an active or inactive state, and to maintain context information for both active and inactive core network services to facilitate quick service re-establishment.

Figure 4:
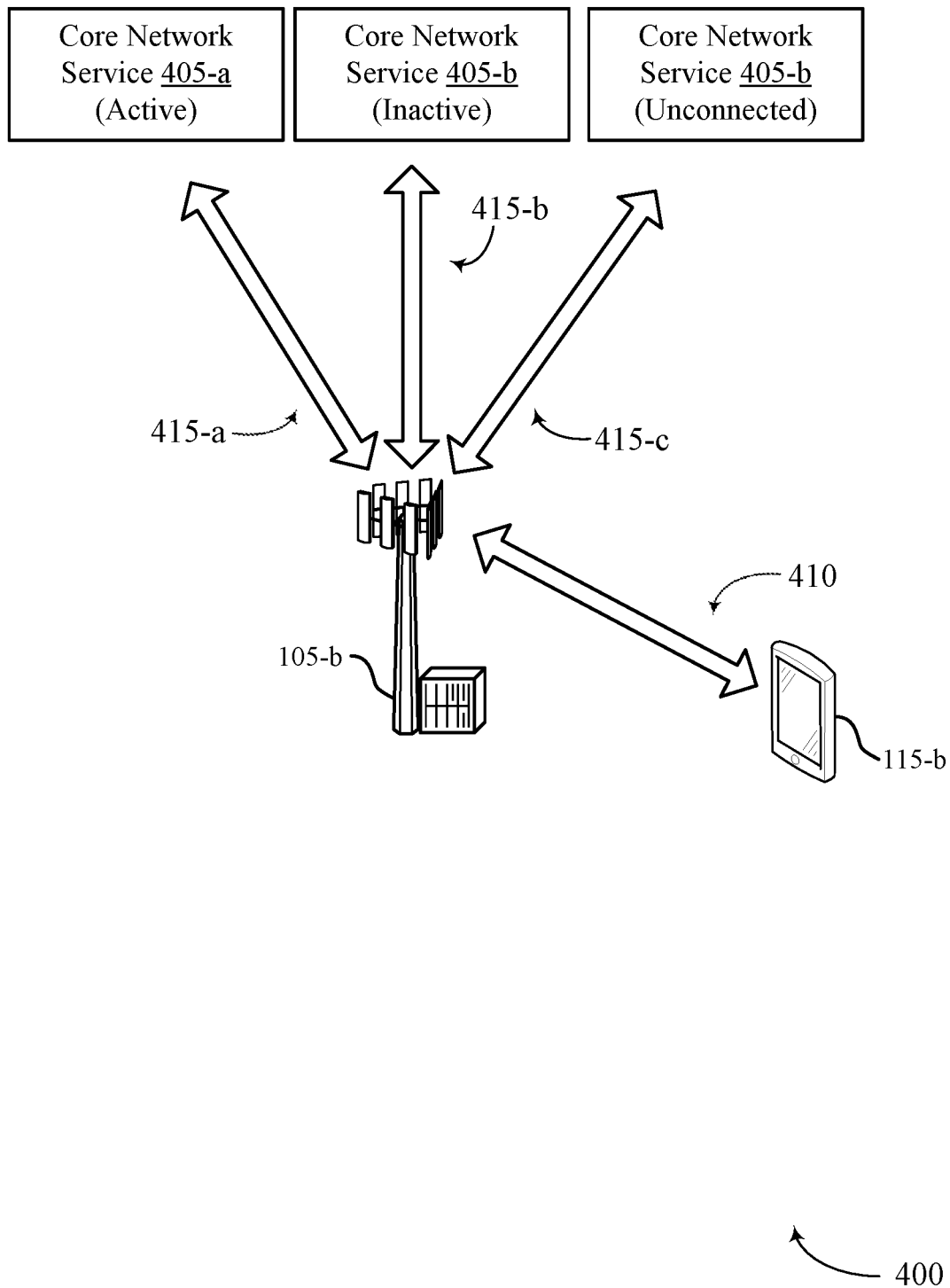
FIG. 4 illustrates an example of a wireless communications system that supports techniques for service states in a service-based wireless system in accordance with one or more aspects of the present disclosure.

FIG. 4 illustrates an example of a wireless communications system 400 that supports techniques for service states in a service-based wireless system in accordance with one or more aspects of the present disclosure. In some examples, aspects of the wireless communications system 400 may implement, or be implemented by, aspects of the wireless communications system 100, the wireless communications system 200, the network architecture 300, or any combination thereof. In particular, the wireless communications system 400 may support signaling that enables UEs 115 to subscribe to core network services 415, exchange signaling indicating whether respective core network services 415 are in an active or inactive state, and to maintain context information for both active and inactive core network services 415 to facilitate quick service re-establishment, as described with respect to FIG. 1.

The wireless communications system 400 may include a UE 115-b, a network entity 105-b, a first core network service 405-a, a second core network service 405-b, and a third core network service 405-c. In some implementations, the network entity 105-b may include an example of an O-RAN entity which includes multiple components, such as one or more DUs, as shown and described in FIG. 3. In this regard, the network entity 105-b illustrated in FIG. 4 may additionally or alternatively be referred to as a DU or eDU.

The core network services 405 may be associated with a service-based network, such as the service-based network 205 illustrated in FIG. 2. In some aspects, the service-based network including the core network services 405 may be configured to communicate or interface with a RAN of the wireless communications system 400, where the RAN includes the one or more network entities (e.g., network entity 105-b). In some implementations, the core network services 405 may be associated with, or hosted by, a cloud platform, where the respective core network services 405 are hosted at respective network addressees in the cloud platform.

The UE 115-b may communicate with the network entity 105-b using a communication link 410, which may be an example of an NR, LTE, or 6G link between the UE 115-b and the network entity 105-b. In some cases, the communication link 410 may include an example of an access link (e.g., Uu link) which may include a bi-directional link that enables both uplink and downlink communication. Similarly, the network entity 105-b of the RAN may be configured to communicate with (e.g., interface with) the core network services 405 of the service-based network via communication links 415-a, 415-b, and 415-c, where the communication links 415 may be configured to facilitate bi-directional communications between the network entity 105-b and each of the respective core network services 405. In some aspects, each core network service 405 may include a respective API configured to facilitate wireless communications with the network entity 105-b and the UE 115-b, such as the network service APIs 180 illustrated in FIG. 1.

In some aspects, the network entity 105-b (e.g., DU, eDU) may facilitate traffic routing (e.g., service data unit routing) from the UE 115-b to the core network services 405, and vice versa. In other words, the network entity 105-b may be configured to relay communications (e.g., service messages) from the UE 115-b to the core network services 405, and vice versa. The network entity 105-b may facilitate traffic routing between the respective devices directly, via other network entities 105, via proxy, or any combination thereof.

As noted previously herein, a RAN may interface with a service-based network that offers various core network services 405, and may relay communications between UEs 115 and the respective core network services 405. In such cases, a UE 115 may "subscribe" to different core network services 405, where each respective core network service 405 may be in a different activation state at the UE 115 (e.g., active state, inactive state, unconnected state). The UE may be able to actively perform communications with core network services 405 in the active state, but may be unable to perform communications with core network services 405 in the inactive or unconnected states. However, some conventional, non-service-based wireless communications systems do not provide any signaling or other mechanisms that enable core network services 405 to be individually activated and deactivated at UEs 115.

Accordingly, the wireless communications system 400 may support signaling that may be used to selectively adjust activation states (e.g., service states) of core network services 405 at the UE 115-b. In particular, aspects of the present disclosure are directed to signaling, configurations, and other mechanisms that enable the UE 115-b to subscribe to core network services 405, exchange signaling indicating whether respective core network services 405 are in an active or inactive state, and to maintain context information for both active and inactive core network services 405 to facilitate quick service re-establishment.

In other words, aspects of the present disclosure are directed to techniques for service establishment, where RAN context information may be exchanged as a service. In some implementations, activation states for each respective core network service 405 may be independently adjusted for each respective core network service 405 (e.g., activation state per-service). In some aspects, the wireless communications system 400 may support signaling and other mechanisms that enable wireless devices to fetch and/or adjust activation states for core network services 405, and to fetch, store, and maintain AS context information usable for preforming communications associated with respective core network services 405.

In some aspects, the UE 115-b may be configured to operate in different RAN or eDU states. The term "RAN/eDU states" of the UE 115-e may be used to may refer to the state of the UE 115-b relative to the network entity 105-b or RAN (e.g., whether or not the UE 115-b is connected to the RAN). For example, the UE 115-b may be configured to operate in one of an idle RAN state (e.g., eDU-idle state), a connected RAN state (e.g., eDU-connected or eDU-active state), or an inactive RAN state (e.g., eDU-inactive state). In the eDU-idle state, the UE 115-b may not have a wireless connection with the network entity 105-b (e.g., no RAN connection). Comparatively, in the eDU-active/connected state, the UE 115-b may have an active wireless connection with the network entity 105-b that enables wireless communications between the respective devices (e.g., active RAN connection with the network entity 105-b). Lastly, in the eDU-inactive state, the UE 115-b may have eDU context information for communicating with the network entity 105-b via the communication link 410, but may not have ongoing communications with the network entity 105-b. While in the eDU-inactive state, the network entity 105-b (and/or the UE 115-b) may maintain a last UE-RAN connection configuration.

Additionally, aspects of the present disclosure may enable core network services 405 to be maintained in different activation states (e.g., services states) at the UE 115-*b*. As compared to RAN/eDU states of the UE 115-*e*, which refer to communications between the UE 115-*b* and the RAN, the term "activation state" or "service state" associated with a core network service 405 may be used to refer to the state of the UE 115-*b* relative to each respective core network service 405. Each respective core network service 405 offered by a service-based network may be in one of an active state, an inactive state, or an unconnected state (e.g., unregistered state) at each UE 115 of the wireless communications system 400. Activation states may be maintained at each core network service 405 independently.

For example, as shown in FIG. 4, the first core network service 405-*a* may be in an active state at the UE 115-*b*, the second core network service 405-*b* may be in an inactive state at the UE 115-*b*, and the third core network service 405-*c* may be in an unconnected state at the UE 115-*b*. Moreover, each core network service 405 may be in a different state at different UEs 115. For example, the first core network service 405-*a* may be in an inactive or unconnected state at an additional UE 115, and the second core network service 405-*b* may be in an active or unconnected state at the additional UE 115.

In some aspects, different core network services 405 may be maintained (e.g., activated, deactivated) at the UE 115-*b* based on the requirements or expectations of the UE 115-*b* (e.g., which applications are currently being executed by the UE 115-*b*). In some aspects, each core network service 405 offered by a service-based network may initially start in the unconnected state at the UE 115-*b* until the UE 115-*b* subscribes to the respective core network service 405, at which point the respective core network service 405 may be transitioned to one of the active or inactive states. In some aspects, the UE 115-*b* may be configured to perform communications with core network services 405 in the active state. Comparatively, the UE 115-*b* may be unable to perform communications with core network services 405 in the inactive or unconnected states. In some aspects, the activation state for each respective core network service 405 at the UE 115-*b* may be changed independently from one another (e.g., the second core network service 405-*b* may be activated without affecting the activation states of the other core network services 405).

As will be further described herein, the UE 115-*b*, the network entity 105-*b*, the core network services 405, or any combination thereof, may be configured to maintain (or not to maintain) context information associated with performance of core network services 405 (e.g., service context, UE context) based on the activation state of each respective core network service 405.

As it is used herein, the term "context information" may be used to refer to information maintained at devices (e.g., UEs 115, network entities 105, core network services 405) that enable the respective devices to communicate with other devices. Context information may include identifiers (e.g., network addresses) associated with other devices, communications parameters (e.g., type/format of communications), feedback procedures between devices, resources for communications between devices, and the like. Context information may include "service context" information, which may include information stored/maintained by UEs 115 and/or network entities 105 for communicating with core network services 405, and "UE context" information, which may include information stored/maintained by core network services 405 and/or network entities 105 for communicating with UEs 115 (e.g., UE context may enable core network services to communicate with UEs 115 via a relay provided by a DU).

For example, context information for the first core network service 405-*a* may be maintained at the UE 115-*b*, the network entity 105-*b*, and the first core network service 405-*a* based on the first core network service 405-*a* being in the active state at the UE 115-*b*. While in the active state, the first core network service 405-*a* may know or identify the serving network entity 105-*b* (e.g., serving DU) for the UE 115-*b* (e.g., due to active exchange of communications).

By way of another example, context information for the second core network service 405-*b* may be maintained at the UE 115-*b* and the second core network service 405-*b* based on the second core network service 405-*b* being in the inactive state at the UE 115-*b*. As compared to the first core network service 405-*a*, the network entity 105-*b* may not be configured to maintain context information for the second core network service 405-*b* due to the fact that there are no ongoing communications between the UE 115-*b* and the second core network service 405-*b* based on the second core network service 405-*b* being in the inactive state. While in the inactive state, the second core network service 405-*b* may not know or identify the serving network entity 105-*b*/serving DU for the UE 115-*b* (e.g., due to absence of active communications being exchanged). Finally, context information may not be maintained at any of the UE 115-*b*, the network entity 105-*b*, or the third core network service 405-*c* based on the third core network service 405-*c* being in the unconnected state at the UE 115-*b*.

Different communications or operations enabled by different combinations of RAN/eDU states and core network service 405 activation states are shown in Table 1 below:

TABLE 1

| | | Core Network Service Activation State | | |
|---|---|---|---|---|
| | | Unregistered State (No Service) | Active State (Service) | Inactive Service (Service Context) |
| RAN/eDU State | eDU-Idle (No Connection) | No communications; UE is not reachable | Transitory state; core network service will become inactive | Core network service maintains context for quick service | eDU State/Activation State Summary

TABLE 1-continued eDU State/Activation State Summary

| | Core Network Service Activation State | | |
|---|---|---|---|
| | Unregistered State (No Service) | Active State (Service) | Inactive Service (Service Context) |
| eDU-Connected (eDU Connection) | UE can perform service discovery; core network service authentication and registration (e.g., subscribe to core network services) | UE can communicate with active core network services; some core network services may require separate registration/ authentication | re-establishment Transitory state; core network service may become active; core network service maintains context for quick service re-establishment |
| eDU-Inactive (eDU Context) | UE does not require any core network services; UE saving power; UE not reachable | Transitory state; core network service will become inactive | Core network service and eDU have context for quick service re-establishment |

In some aspects, the UE 115-b may obtain information from a subscriber service (e.g., core network subscriber service) or discovery service (e.g., core network discovery service) associated with other core network services 405 offered by the core network service 405 (e.g., the subscriber/discovery service may indicate which core network services 405 are accessible to the UE 115-b). After obtaining information from the subscriber/discovery service, the UE 115-b may subscribe to additional core network services 405. In some aspects, each core network service 405 may be associated with a security service or some level of security.

In some aspects, core network services 405 may be related to, or inter-dependent upon, other core network services 405 within a "group" or "cluster" of core network services 405 (e.g., the UE 115-b is expected to subscribe to the second core network service 405-b in order to communicate with the first core network service 405-a). In this regard, the activation states of core network services 405 within a group or cluster may exhibit interdependencies with one another. In some cases, multiple network operators (e.g., mobile virtual network operators (MVNOs)) may share or be associated with the same core network services 405/connectivity services. Moreover, because each core network service 405 may be operated independently of one another, a single operator may be able to host or offer new core network services 405 without affecting other core network services 405 within the network.

In some aspects, the UE 115-b, the network entity 105-b, and/or the respective core network services 405 may be configured to exchange signaling that selectively adjusts an activation state of each respective core network service 405 at the UE 115-b. For example, the UE 115-b may be configured to transmit a message to the second core network service 405-b (via the network entity 105-b) that includes an instruction to activate the second core network service 405-b at the UE 115-b.

The UE 115-b may keep core network services 405 in the active state when the respective core network service 405 is being used (e.g., communicated with) and when the UE 115-b is connected to the network entity 105-b (e.g., eDU-active/connected state). Similarly, core network services 405 may be configured to establish service/contexts with the UE 115-b, and determine if/when the respective core network service 405 is active at the UE 115-b. In some aspects, the UE 115-b may determine the need or expectation to communicate with additional core network services 405 for which the UE 115-b has established a context and are currently inactive. For example, the UE 115-b may determine an expectation to exchange communications with the second core network service 405-b that is in the inactive state. In this example, the UE 115-b may transmit an activation request to the network entity 105-b, where the activation request indicates the second core network service 405-b (and/or additional core network services 405) that are to be activated at the UE 115-b. In this example, the network entity 105-b may relay the activation request to the respective core network service 405.

In some aspects, an activation request may indicate routing information (e.g., network address) for each core network service 405 that is to be activated, and may optionally include additional service protocol messages to be delivered to the newly activated core network service 405. In some cases, the UE 115-b may receive a confirmation message from network entity 105-b which indicates which core network services 405 were successfully (or unsuccessfully) activated. The UE 115-b may then transition each of the confirmed core network services 405 to the active state at the UE 115-b. In some aspects, the network entity 105-b may receive requests from the UE 115-b and/or the activated core network services 405 to keep the respective core network services 405 in the active state, and for the network entity 105-b to maintain context information (e.g., service context, UE context) for performing the respective core network service 405.

The core network services 405 in the active state at the UE 115-b may be configured to maintain a context (e.g., service context, UE context) with the network entity 105-b to which the UE 115-b is connected. The context information (e.g., UE context) maintained at the core network service 405 may include information associated with how to address communications to the UE 115-b and/or the network entity 105-b (e.g., cell ID, UE ID), service-related configuration information associated with the network entity 105-b, etc. In cases where the UE 115-b performs a handover to a new network entity 105-b, the core network service 405 may be configured to re-establish a context with the new network entity 105-b.

For each requested core network service 405 that was not successfully activated, the UE 115-b may receive (e.g., from the network entity 105-b) a cause for the activation failure (e.g., cause code). The cause for the activation failure may be indicated via direct local signaling, via one or more service protocol messages, or both. In the case of activation failure, the UE 115-b may remove or discard context information (e.g., a service context) for the failed core network service 405 based on the failure cause. In some aspects, the UE 115-b may attempt to reestablish a context (e.g., re-activate or re-subscribe) with the core network service 405 or establish context with another core network service 405 based on the activation failure.

In some aspects, the UE 115-b, the network entity 105-b, and/or the core network service 405 may determine when one or more core network services 405 become inactive at the UE 115-b (e.g., deactivated, or otherwise transition to the inactive state) based on explicit signaling from the UE 115-b and/or core network service 405, based on the UE 115-b disconnecting from the network entity 105-b or other RAN node, based on a local protocol error (e.g., messages transmitted to core network service 405 failing repeatedly), or any combination thereof. For example, in cases where the first core network service 405-a has executed its purpose, the first core network service 405-a and/or the UE 115-b may transmit signaling indicating a deactivation of the first core network service 405-a at the UE 115-b. Further, all activated core network services 405 may be deactivated (e.g., transitioned to the inactive state) when the UE 115-b disconnects from the network entity 105-b (e.g., when the UE 115-b enters the eDU-idle or inactive state).

Moreover, if the UE 115-b determines that there are no active core network services 405 at the UE 115-b, or determines that the UE 115-b does not need/expect to communicate with any core network service 405 at the time or in the near future, the UE 115-b may be configured to transmit a request to the network entity 105-b to release the RAN connection with the UE 115-b. If there are any core network services 405 that are active at the UE 115-b, the request may include further signaling to the activated core network service 405 indicating that the UE 115-b is disconnecting, and deactivating the core network services 405 at the UE 115-b. Similarly, in some aspects, the network entity 105-b may be configured to determine that there are no active core network services 405 at the UE 115-b, and may therefore initiate a release of the RAN connection with the UE 115-b. In such cases, the network entity 105-b may determine that there are no active core network services 405 based on explicit signaling from the UE 115-b and/or the previously-activated core network services 405, based on a release request received from the UE 115-b, due to radio link failure, or any combination thereof.

In cases where a core network service 405 is deactivated at the UE 115-b (e.g., transitioned to the inactive state at the UE 115-b), the core network service 405 may be configured to maintain (e.g., store in memory) a UE context for the communicating with the UE 115-b. However, core network services 405 in the inactive state may not maintain up-to-date information associated with which network entity 105 the UE 115-b is connected to. In this regard, the core network service 405 may either release/discard the network entity 105-b identity and related information, or maintain information associated with the "last connected network entity 105-b/DU" in the event the UE 115-b re-connects to the same network entity 105-b or activates the core network service 405 while the UE 115-b is connected to the same network entity 105-b.

The maintenance (e.g., storage) of context information (e.g., service context, UE context) for communications between the UE 115-b, network entity 105-b, and core network services 405 may be further shown and described with reference to FIGS. 5 and 6.

Figure 5:
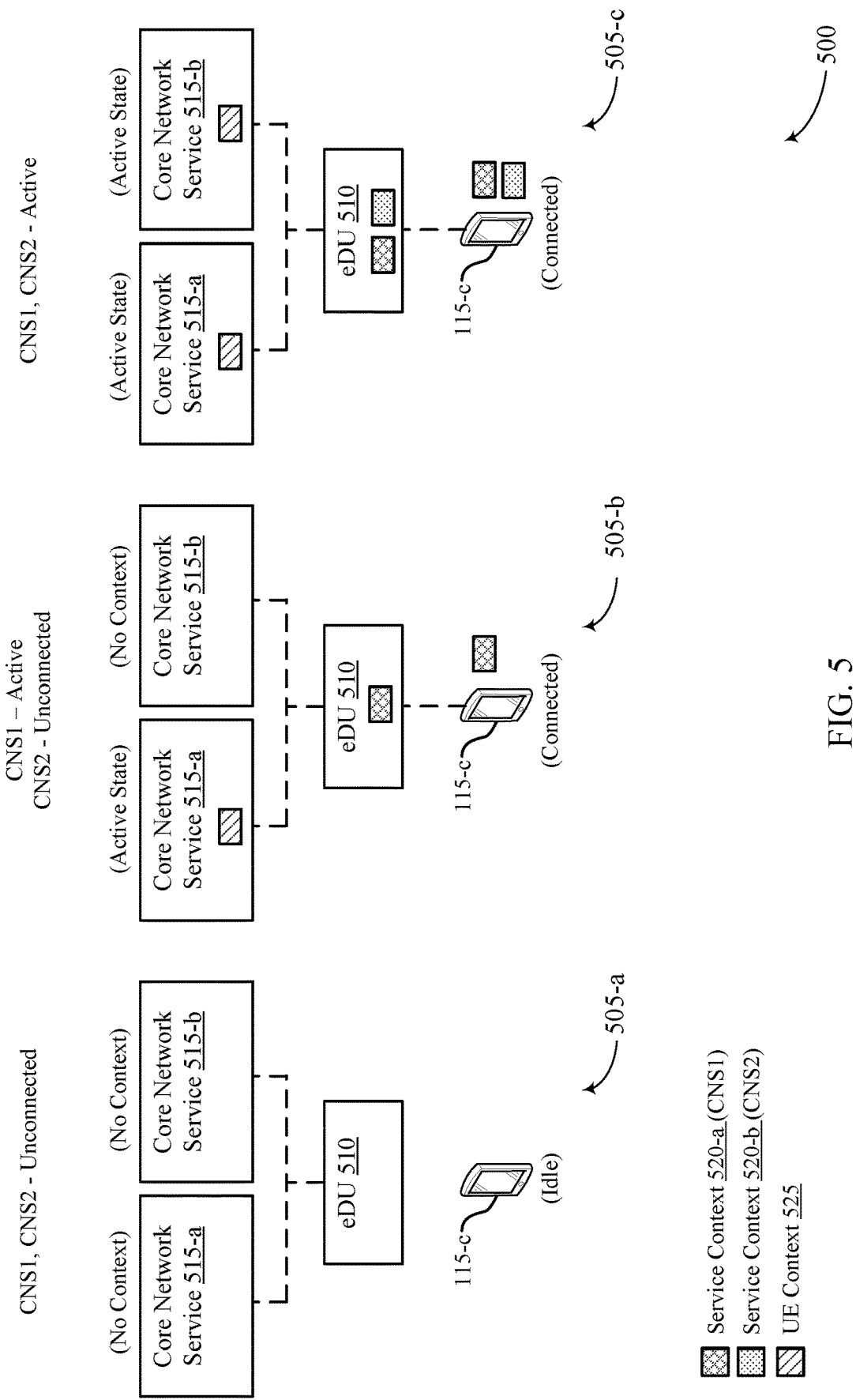
FIG. 5 illustrates an example of an activation state configuration that supports techniques for service states in a service-based wireless system in accordance with one or more aspects of the present disclosure.

FIG. 5 illustrates an example of an activation state configuration 500 that supports techniques for service states in a service-based wireless system in accordance with one or more aspects of the present disclosure. In some examples, aspects of the activation state configuration 500 may implement, or be implemented by, aspects of the wireless communications system 100, the wireless communications system 200, the network architecture 300, the wireless communications system 400, or any combination thereof. In particular, the activation state configuration 500 illustrates where context information (e.g., service context, UE context) for core network services are maintained at different wireless devices based on the respective activation states of the core network services, as described with reference to FIGS. 1-4, among other aspects.

The activation state configuration 500 in FIG. 5 illustrates different configurations 505-a, 505-b, and 505-c that each include a UE 115-c, an eDU 510 (e.g., network entity 105), a first core network service 515-a, and a second core network service 515-b, which may be examples of UEs 115, network entity 105, and core network services as described herein. In particular, each configuration 505 illustrates where context information for the respective core network services 515 may be stored based on the RAN/eDU state of the UE 115-c and based on the activation states of the respective core network services 515.

For example, referring to the first configuration 505-a, the UE 115-c may be operating in an idle state (e.g., eDU-idle). As such, the UE 115-c may not have any RAN connection with the eDU 510, and each of the core network services 515 may be in the unconnected state. As such, the UE 115-c may not have any context information (e.g., service context) for communicating with the core network services 515, and the core network services 515 may not have any context information (e.g., UE context) for communicating with the UE 115-c.

Referring now to the second configuration 505-b, the UE 115-b may be operating in a connected state (e.g., eDU-active or eDU-connected state), and may therefore have an active connection with the eDU 5150. In this example, the first core network service 515-a may be in the active state, and the second core network service 515-b may be in the unconnected state. As such, as described with reference to the first configuration, neither the UE 115-c nor the second core network service 515-b may have any context information (e.g., service context, UE context) for communicating with one another based on the second core network service 515-b being in the unconnected state at the UE 115-c. Comparatively, because the first core network service 515-a is in the active state, a service context 520-a associated with the first core network service 515-a may be maintained (e.g., stored) at the UE 115-c and the eDU 510. Moreover, the core network service 515-a may maintain a UE context 525 associated with communications with the UE 115-c based on the first core network service 515-a being in the active state at the UE 115-c.

Referring now to the third configuration 505-c, the UE 115-b may be operating in a connected state (e.g., eDU-active or eDU-connected state), and may therefore have an active connection with the eDU 5150. In this example, both the first core network service 515-a and the second core network service 515-b may be in the active state. As such, both the UE 115-*c* and the eDU 510 may maintain a first service context 520-*a* and a second service context 520-*b* associated with the first core network service 515-*a* and the second core network service 515-*b*, respectively. Moreover, both core network services 515 may maintain a UE context 525 associated with communications with the UE 115-*c* based on the respective core network services 515 being in the active state at the UE 115-*c*.

While the UE context 525 stored at the first core network service 515-*a* and the second core network service 515-*b* are shown and described as including the same UE context 525, this is solely for illustrative purposes. In particular, each respective core network service 515 may maintain a service-specific UE context 525 for communicating with the UE 115-*c*. Moreover, the UE context 525 may include information (e.g., identifier, network address) associated with the network eDU 510 that facilitates communications between the UE 115-*c* and the respective core network services 515.

Figure 6:
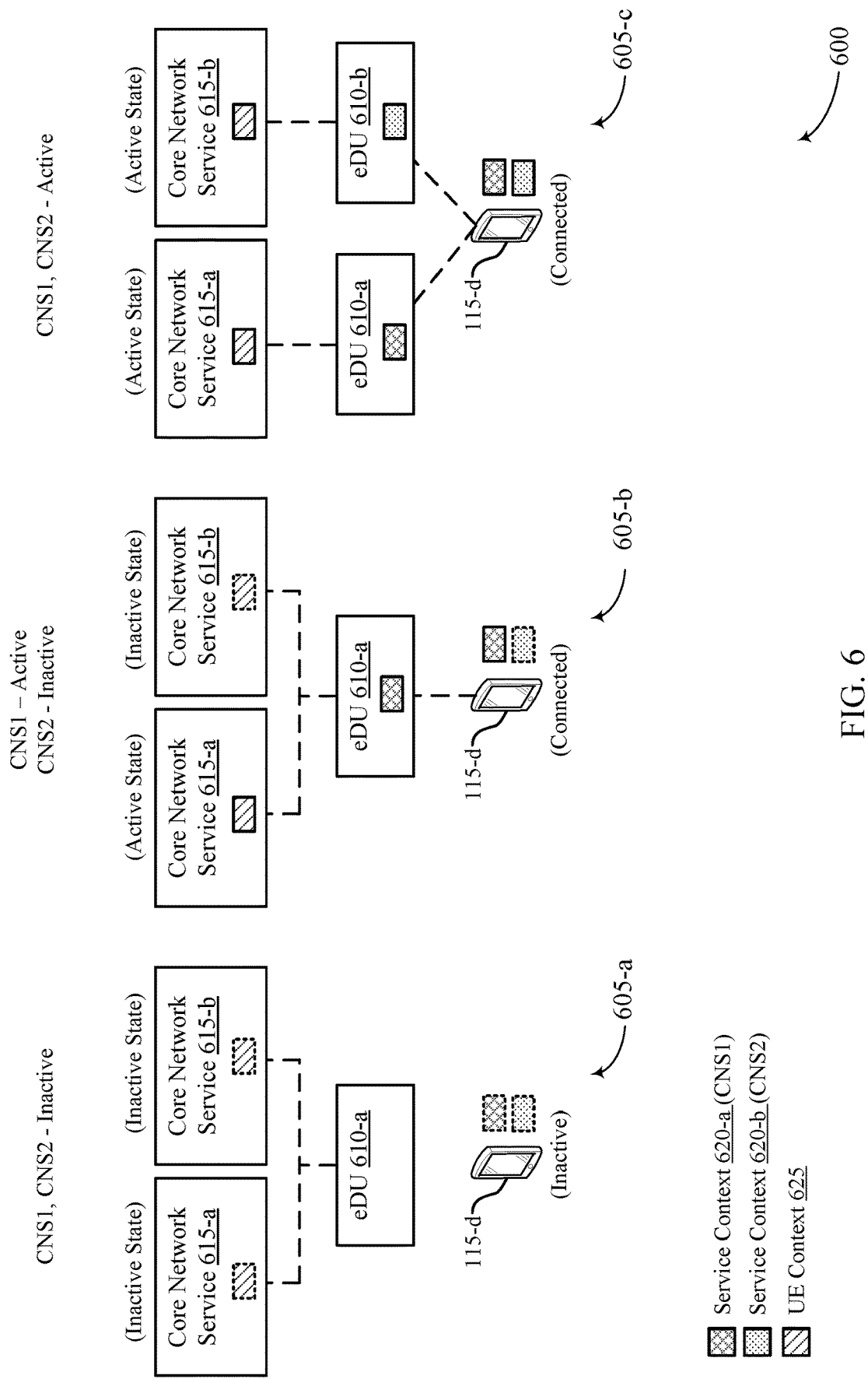
FIG. 6 illustrates an example of an activation state configuration that supports techniques for service states in a service-based wireless system in accordance with one or more aspects of the present disclosure.

FIG. 6 illustrates an example of an activation state configuration 600 that supports techniques for service states in a service-based wireless system in accordance with one or more aspects of the present disclosure. In some examples, aspects of the activation state configuration 600 may implement, or be implemented by, aspects of the wireless communications system 100, the wireless communications system 200, the network architecture 300, the wireless communications system 400, the activation state configuration 500, or any combination thereof. In particular, the activation state configuration 600 illustrates where context information (e.g., service context, UE context) for core network services are maintained at different wireless devices based on the respective activation states of the core network services, as described with reference to FIGS. 1-5, among other aspects.

The activation state configuration 500 in FIG. 6 illustrates different configurations 605-*a*, 605-*b*, and 605-*c* that each include a UE 115-*d*, one or more eDUs 610 (e.g., network entities 105), a first core network service 615-*a*, and a second core network service 615-*b*, which may be examples of UEs 115, network entity 105, and core network services as described herein. In particular, each configuration 605 illustrates where context information for the respective core network services 615 may be stored based on the RAN/eDU state of the UE 115-*d* and based on the activation states of the respective core network services 615.

For example, referring to the first configuration 605-*a*, the UE 115-*d* may be operating in an inactive state (e.g., eDU-inactive). As such, the UE 115-*d* may not have any RAN connection with the eDU 610. In this example, each of the core network services 615 may be in the inactive state at the UE 115-*c*. As such, the UE 115-*d* may maintain a first service context 620-*a* associated with the first core network service 615-*a* and a second service context 620-*b* associated with the second core network service 615-*b* based on the respective core network services 615 being in the inactive state. Similarly, both core network services 615 may maintain a UE context 625 associated with communications with the UE 115-*d* based on the respective core network services 615 being in the inactive state at the UE 115-*d*. In some aspects, maintaining service context 620 and UE context 625 information at the UE 115-*d* and the core network services 615, respectively, may enable the respective devices to quickly and efficiently re-establish communications with one another in the event the respective core network services 615 are subsequently activated at the UE 115-*d*.

Referring now to the second configuration 605-*b*, the UE 115-*b* may be operating in a connected state (e.g., eDU-active or eDU-connected state), and may therefore have an active connection with the eDU 6150. In this example, the first core network service 615-*a* may be in the active state. As such, because the first core network service 615-*a* is in the active state, a service context 620-*a* associated with the first core network service 615-*a* may be maintained (e.g., stored) at the UE 115-*d* and the eDU 610. Moreover, the first core network service 615-*a* may maintain a UE context 625 associated with communications with the UE 115-*d* based on the first core network service 615-*a* being in the active state at the UE 115-*d*. Comparatively, the second core network service 615-*b* may be in the inactive state. As such, because the second core network service 615-*b* is in the inactive state, a service context 620-*a* associated with the second core network service 615-*b* may be maintained (e.g., stored) at the UE 115-*d* (but not the eDU 610). Moreover, the second core network service 615-*b* may maintain a UE context 625 associated with communications with the UE 115-*d* based on the second core network service 615-*b* being in the inactive state at the UE 115-*d*.

Referring now to the third configuration 605-*c*, the UE 115-*b* may be operating in a connected state (e.g., eDU-active or eDU-connected state) with a first eDU 610-*a* and a second eDU 610-*b*, and may therefore have an active connection with the respective eDUs 610. In this regard, the third configuration 605-*c* may illustrate an example of a dual connectivity scenario. Additionally, or alternatively, the first eDU 610-*a* may be an example of a primary cell (PCell), and the second eDU 610-*b* may be an example of a secondary cell (SCell).\

Continuing with reference to the third configuration, the both the first core network service 615-*a* and the second core network service 615-*b* may be in the active state. As such, the UE 115-*d* may maintain a first service context 620-*a* and a second service context 620-*b* associated with the first core network service 615-*a* and the second core network service 615-*b*, respectively. Moreover, the first eDU 610-*a* may maintain the first service context 620-*a* associated with the first core network service 615-*a*, and the second eDU 610-*a* may maintain the second service context 620-*b* associated with the second core network service 615-*b*. Further, both core network services 615 may maintain a UE context 625 associated with communications with the UE 115-*d* based on the respective core network services 615 being in the active state at the UE 115-*d*. In particular, the UE context 625 maintained at the first core network service 615-*a* may include information for communicating with the first eDU 610-*a*, and the second UE context 625 maintained at the second core network service 615-*b* may include information for communicating with the second eDU 610-*b*.

While the UE context 625 stored at the first core network service 615-*a* and the second core network service 615-*b* are shown and described as including the same UE context 625, this is solely for illustrative purposes. In particular, each respective core network service 615 may maintain a service-specific UE context 625 for communicating with the UE 115-*d*. Moreover, the UE context 625 may include information (e.g., identifier, network address) associated with the network eDU 610 that facilitates communications between the UE 115-*c* and the respective core network services 615. In this regard, the UE context 625 stored and maintained by the first core network service 615-*a* may be different from the UE context 625 stored and maintained by the second core network service 615 in that the respective UE contexts 625 are associated with communications with the UE 115-*d* performed via different eDUs 610.

Figure 7:
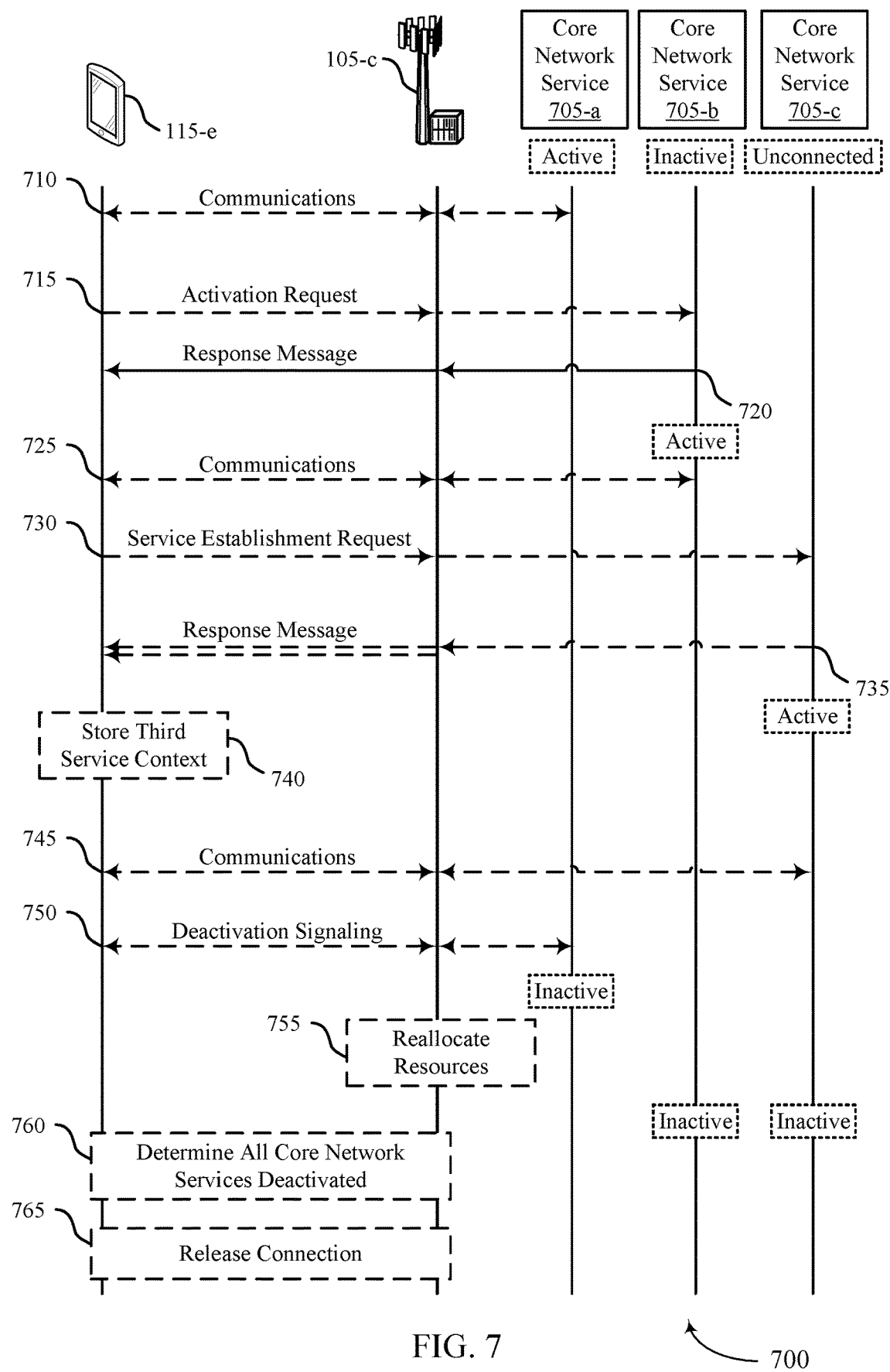
FIG. 7 illustrates an example of a process flow that supports techniques for service states in a service-based wireless system in accordance with one or more aspects of the present disclosure.

FIG. 7 illustrates an example of a process flow 700 that supports techniques for service states in a service-based wireless system in accordance with one or more aspects of the present disclosure. In some examples, aspects of the process flow 700 may implement, or be implemented by, aspects of the wireless communications system 100, the wireless communications system 200, the network architecture 300, the wireless communications system 400, the activation state configuration 500, the activation state configuration 600, or any combination thereof. In particular, the process flow 700 illustrates signaling that enables UEs 115 to subscribe to core network services 705, exchange signaling indicating whether respective core network services 705 are in an active or inactive state, and to maintain context information for both active and inactive core network services 415 to facilitate quick service re-establishment, as described with reference to FIGS. 1-6, among other aspects.

In some examples, the operations illustrated in process flow 700 may be performed by hardware (e.g., including circuitry, processing blocks, logic components, and other components), code (e.g., software) executed by a processor, or any combination thereof. Alternative examples of the following may be implemented, where some steps are performed in a different order than described or are not performed at all. In some cases, steps may include additional features not mentioned below, or further steps may be added.

The process flow 700 may include a UE 115-e, a network entity 105-c, a first core network service 705-a, a second core network service 705-b, and a third core network service 705-c, which may be examples of UEs 115, network entities 105, core network services, and other wireless devices described with reference to FIGS. 1-6.

In some aspects, the core network services 705 may be included within a set of services offered or provided by a service-based network, such as the service-based network 205 illustrated in FIG. 2. In such cases, the service-based network including the core network service 705 may be configured to interface with (e.g., communicate with) a RAN including the network entity 105-c (e.g., DU, eDU) in order to facilitate communications between the service-based network and the UE 115-e. In this regard, the signaling illustrated in FIG. 7 may include example signaling within a network with a service-based architecture, such as a 6G system.

In some aspects, respective core network services 705 may be in different activation states at the UE 115-e. For example, as shown in FIG. 7, the first core network service 705-a may be in an active state at the UE 115-e, the second core network service 705-b may be in an inactive state at the UE 115-e, and the third core network service 705-c may be in an unconnected state at the UE 115-e.

As shown and described herein, context information (e.g., service context 520, 620, UE context 525, 625) may be stored and maintained at the respective components (e.g., UE 115-e, network entity 105-c, core network services 705) based on the activation states of the respective core network services 705. For example, a service context associated with the first core network service 705-a may be maintained at the UE 115-e and the network entity 105-c based on the first core network service 705-a being in the active state at the UE 115-c. Moreover, the first core network service 705-a may maintain a UE context associated with the UE 115-e based on the first core network service 705-a being in the active state at the UE 115-e. Comparatively, the UE 115-e (but not the network entity 105-c) may maintain a service context associated with the second core network service 705-b based on the second core network service 705-b being in the inactive state at the UE 115-c. Moreover, the second core network service 705-b may maintain a UE context associated with the UE 115-e based on the second core network service 705-b being in the active state at the UE 115-e. Lastly, none of the UE 115-e, network entity 105-c, or third core network service 705-c may maintain context information (e.g., service context, UE context) associated with the third core network service 705-c based on the third core network service 705-c being in the unconnected state at the UE 115-e.

At 710, the UE 115-e may exchange service messages with the first core network service 705-a via a relay provided by the network entity 105-c, and in accordance with a service context for communicating with the first core network service 705-a. In this regard, the network entity 105-c may relay service messages (e.g., service protocol data units) between the UE 115-e and the first core network service 705 in accordance with the service context associated with the first core network service 705-a. Moreover, the first core network service 705-a may communicate service messages with the UE 115-e (via the network entity 105-c) in accordance with a UE context associated with the UE 115-e. As noted previously herein, context information associated with the first core network service 705-a (e.g., service context, UE context) may be stored at the UE 115-e, the network entity 105-c, and the first core network service 705-a based on the first core network service 705-a being in the active state at the UE 115-e.

In some aspects, service messages exchanged between the UE 115-e and the first core network service 705-a may include identifiers associated with the UE 115-e and the first core network service 705-a, such as the UE ID, the network address of the first core network service 705-a, and the like.

At 715, the UE 115-e may transmit, to the second core network service 705-b and via the network entity 105-c, a request to activate the second core network service 705-b at the UE 115-e (e.g., activation request). The activation request may include routing information (e.g., a network address) associated with the second core network service 705-b. Additionally, or alternatively, the request may include a service message (e.g., service data protocol unit) that is to be delivered to the second core network service 705-b.

In some aspects, the second core network service 705-b may be associated with a second service context, which may be maintained at the UE 115-e based on the second core network service 705-b being in the inactive state at the UE 115-e. Moreover, the second core network service 705-b may be configured to maintain a UE context based on the second core network service 705-b being in the inactive state at the UE 115-e.

At 720, the UE 115-e may receive a response message from the second core network service 705-b (e.g., via the network entity 105-c). In some aspects, the response message may indicate whether the second core network service 705-b has been successfully activated or not (e.g., whether the second core network service 705-b accepts the activation).

In cases where the second core network service 705-b was not successfully activated, the response message may indicate a cause for the activation failure (e.g., cause code). In some aspects, in the case of activation failure, the UE 115-e may remove or discard the context information (e.g., the service context) associated with the second core network service 705-b. the failed core network service 405 based on the failure cause. Additionally, or alternatively, the UE 115-b may attempt to reestablish a context with the second core network service 705-b (e.g., transmit a new activation request), or establish context with another core network service 705 based on the activation failure.

Conversely, in cases where the activation of the second core network service 705-*b* is successful, the UE 115-*e* may transition the second core network service 705-*b* to the active state at the UE 115-*e*. Moreover, the network entity 105-*c* may acquire and maintain context information (e.g., service context) associated with the second core network service 705-*b* based on the activation of the second core network service 705-*b*.

In some aspects, the network entity 105-*c* may receive requests from the UE 115-*e* and/or the activated core network services 705 (e.g., first core network service 705-*a*, second core network service 705-*b*) to keep the respective core network services 405 in the active state, and for the network entity 105-*b* to maintain context information (e.g., service context, UE context) for performing the respective core network service 705.

At 725, the UE 115-*e* may exchange service messages with the second core network service 705-*b* via a relay provided by the network entity 105-*c*, and in accordance with the service context for communicating with the second core network service 705-*b*. In this regard, the network entity 105-*c* may relay service messages (e.g., service protocol data units) between the UE 115-*e* and the second core network service 705-*b* in accordance with the service context associated with the second core network service 705-*b*. Moreover, the second core network service 705-*b* may communicate service messages with the UE 115-*e* (via the network entity 105-*c*) in accordance with a UE context associated with the UE 115-*e*.

In some aspects, the UE 115-*e* and the second core network service 705-*b* may communicate with one another at 725 based on communicating the activation request at 715, communicating the response message at 720, activating the second core network service 705-*b* at the UE 115-*e*, or any combination thereof. As noted previously herein, context information associated with the second core network service 705-*b* (e.g., service context, UE context) may be stored at the UE 115-*e*, the network entity 105-*c*, and the second core network service 705-*b* based on the second core network service 705-*b* being transitioned to the active state at the UE 115-*e*.

In some aspects, service messages exchanged between the UE 115-*e* and the second core network service 705-*b* may include identifiers associated with the UE 115-*e* and the second core network service 705-*b*, such as the UE ID, the network address of the second core network service 705-*b*, and the like.

At 730, the UE 115-*c* may transmit a request (e.g., service request) to establish service with the third core network service 705-*c* (via the network entity 105-*c*) based on the third core network service 705-*c* being in the unconnected state at the UE 115-*e*. In some aspects, the service request may include a network address associated with the third core network service 705-*c*. In other words, the UE 115-*e* may request to establish a service context with the third core network service 705-*c*. In some aspects, the UE 115-*e* may transmit the service request as part of a service establishment procedure (e.g., subscription procedure) between the UE 115-*e* and the third core network service 705-*c*.

At 735, the UE 115-*e* may receive a response message from the third core network service 705-*c* (e.g., via the network entity 105-*c*). In some aspects, the response message may indicate whether the third core network service 705-*c* has been successfully activated or not (e.g., whether the third core network service 705-*c* accepts the activation).

As noted previously herein, in cases where the third core network service 705-*c* was not successfully activated, the response message may indicate a cause for the activation failure (e.g., cause code). In some aspects, in such cases, the UE 115-*b* may attempt to reestablish a context with the third core network service 705-*c* (e.g., transmit a new activation request), or establish context with another core network service 705 based on the activation failure.

Conversely, in cases where the activation of the third core network service 705-*c* is successful, the response message from the third core network service 705-*c* may indicate a third service contest for communicating with the third core network service 705-*c*. Moreover, the network entity 105-*c* may acquire and maintain context information (e.g., third service context) associated with the third core network service 705-*c* based on the activation of the third core network service 705-*c*, and the third core network service 705-*c* may acquire and maintain UE context associated with the UE 115-*e* based on the activation of the third core network service 705-*c*.

At 740, the UE 115-*e* may store (and subsequently maintain) the third service context associated with communications with the third core network service 705-*c* in memory. As noted previously herein, the UE 115-*e* may not have stored any context information associated with the third core network service 705-*c* based on the third core network service 705-*c* being in the unconnected state. As such, the UE 115-*e* may store the third service context based on activating the third core network service 705-*c* at the UE 115-*e*.

At 745, the UE 115-*e* may exchange service messages with the third core network service 705-*c* via a relay provided by the network entity 105-*c*, and in accordance with the third service context for communicating with the third core network service 705-*c* which was stored at 740. In this regard, the network entity 105-*c* may relay service messages (e.g., service protocol data units) between the UE 115-*e* and the third core network service 705-*c* in accordance with the third service context associated with the third core network service 705-*c*. Moreover, the third core network service 705-*c* may communicate service messages with the UE 115-*e* (via the network entity 105-*c*) in accordance with a UE context associated with the UE 115-*e* (which the third core network service 705-*c* may store and maintain based on the activation of the third core network service 705-*c*). As noted previously herein, service messages exchanged between the UE 115-*e* and the third core network service 705-*c* may include identifiers associated with the UE 115-*e* and the third core network service 705-*c*, such as the UE ID, the network address of the third core network service 705-*c*, and the like.

At 750, the UE 115-*e*, the network entity 105-*c*, the first core network service 705-*a*, or any combination thereof, may exchange signaling indicating a deactivation of the first core network service 705-*a* at the UE 115-*e*.

As noted previously herein, the deactivation of core network services 705 may be based on (e.g., triggered by) a variety of different events or parameters. For example, the deactivation of the first core network service 705-*a* may be based on explicit signaling from the first core network service 705-*a* and/or the UE 115-*e* (e.g., such as when the first core network service 705-*a* has executed its purpose), a release of a wireless connection between the UE 115-*e* and the network entity 105-*c*, a radio link failure, a failure of one or more messages transmitted from the UE 115-*e* to the first core network service 705-*a* (or vice versa), or any combination thereof.

In some aspects, the first core network service 705-*a* may be deactivated (e.g., transitioned to the inactive state) at the UE 115-*e* based on the signaling at 750. In some implementations, the UE 115-*e* may still maintain the first service context associated with the first core network service 705-*a* even after deactivating the first core network service 705-*a* at the UE 115-*e*. Similarly, the first core network service 705-*a* may maintain the UE context for communicating with the UE 115-*e* even after the first core network service 705-*a* being deactivated at the UE 115-*e*.

At 755, the network entity 105-*c* may reallocate resources that were previously associated with (e.g., allocated to) communications between the UE 115-*e* and the first core network service 705-*a*. In particular, the network entity 105-*c* may reallocate resources based on the deactivation of the first core network service 705-*a* at 750. The network entity 105-*c* may reallocate the resources to another core network service 705, to another UE 115, or any combination thereof.

At 760, the UE 115-*e*, the network entity 105-*c*, or both, may determine that all core network services 705 have been deactivated at the UE 115-*e* (e.g., the UE 115-*e* does not have any active core network services 705-*c*). In some aspects, the UE 115-*e*, the network entity 105-*c*, or both, may determine that all core network services 705 have been deactivated based on explicit signaling deactivating the preciously-activated core network services 705, based on the UE 115-*e* disconnecting from the network entity 105-*c*, based on a local protocol error (e.g., messages transmitted to core network services 705 failing repeatedly), or any combination thereof.

At 765, the UE 115-*e*, the network entity 105-*c*, or both, may release the wireless connection between the respective devices (e.g., UE 115-*e* disconnects from the RAN). In some aspects, the UE 115-*e* and/or the network entity 105-*c* may release the connection at 765 based on determining that all core network services 705 have been deactivated at the UE 115-*e* at 760.

For example, if the UE 115-*e* determines that there are no active core network services 705 at the UE 115-*e*, or determines that the UE 115-*e* does not need/expect to communicate with any core network service 705 at the time or in the near future, the UE 115-*e* may be configured to transmit a request to the network entity 105-*c* to release the RAN connection with the UE 115-*e*. Similarly, in some aspects, the network entity 105-*c* may be configured to determine that there are no active core network services 705 at the UE 115-*c*, and may therefore initiate a release of the RAN connection with the UE 115-*e*.

Figure 8:
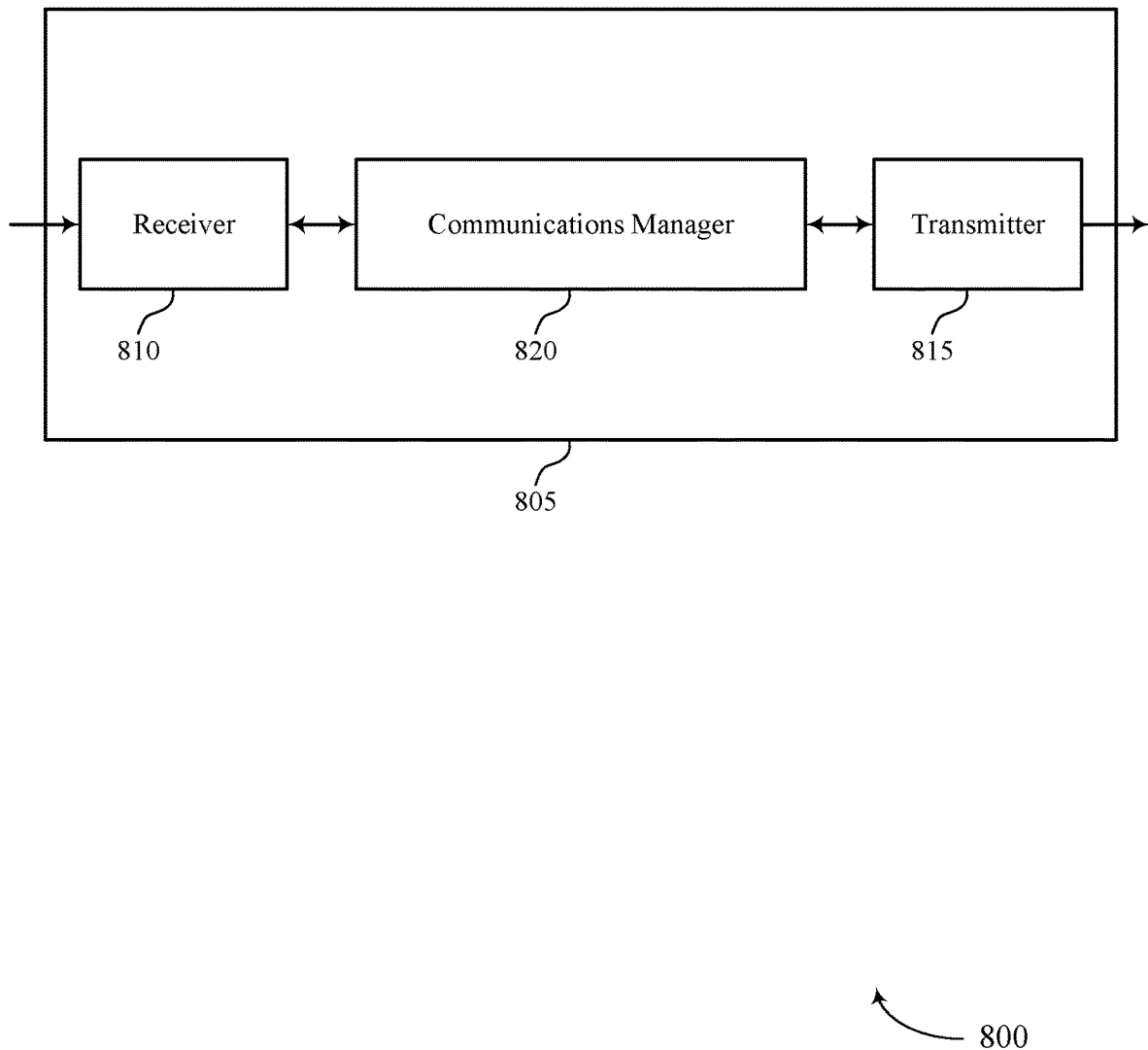
FIGS. 8 and 9 show block diagrams of devices that support techniques for service states in a service-based wireless system in accordance with one or more aspects of the present disclosure.

FIG. 8 shows a block diagram 800 of a device 805 that supports techniques for service states in a service-based wireless system in accordance with one or more aspects of the present disclosure. The device 805 may be an example of aspects of a UE 115 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to techniques for service states in a service-based wireless system). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to techniques for service states in a service-based wireless system). In some examples, the transmitter 815 may be co-located with a receiver 810 in a transceiver module. The transmitter 815 may utilize a single antenna or a set of multiple antennas.

The communications manager 820, the receiver 810, the transmitter 815, or various combinations thereof or various components thereof may be examples of means for performing various aspects of techniques for service states in a service-based wireless system as described herein. For example, the communications manager 820, the receiver 810, the transmitter 815, or various combinations or components thereof may support a method for performing one or more of the functions described herein.

In some examples, the communications manager 820, the receiver 810, the transmitter 815, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 820, the receiver 810, the transmitter 815, or various combinations or components thereof may be implemented in code (e.g., as communications management software or firmware) executed by a processor. If implemented in code executed by a processor, the functions of the communications manager 820, the receiver 810, the transmitter 815, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 820 may be configured to perform various operations (e.g., receiving, obtaining, monitoring, outputting, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to obtain information, output information, or perform various other operations as described herein.

The communications manager 820 may support wireless communication at a UE in accordance with examples as disclosed herein. For example, the communications manager 820 may be configured as or otherwise support a means for communicating, via a DU, a first service message with a first core network service offered by a service-based network, the first service message communicated in accordance with a first service context for communicating with the first core network service, the first service context maintained at the UE based on the first core network service being in an active state at the UE. The communications manager 820 may be configured as or otherwise support a means for transmitting, to the DU, a request to activate a second core network service offered by the service-based network, the second core network service associated with a second service context for communicating with the second core network service, where the second service context is maintained at the UE based on the second core network service being in an inactive state at the UE. The communications manager 820 may be configured as or otherwise support a means for receiving, from the DU in response to the request, a message indicating an activation of the second core network service at the UE. The communications manager 820 may be configured as or otherwise support a means for communicating, via a DU, a second service message with the second core network service in accordance with the second service context based on the activation of the second core network service at the UE.

By including or configuring the communications manager 820 in accordance with examples as described herein, the device 805 (e.g., a processor controlling or otherwise coupled with the receiver 810, the transmitter 815, the communications manager 820, or a combination thereof) may support techniques that enable UEs 115 to subscribe to different core network services on an à la carte basis depending on the needs or requirements of the respective UEs 115, and to activate and deactivate the respective core network services. In this regard, aspects of the present disclosure enable different core network services to be maintained in different activation states at the UEs 115 depending on the needs or requirements of the respective UEs 115, and for core network services to be activated or deactivated independently of one another. As such, techniques described herein may enable UEs 115 to activate only those core network services that are required or expected, thereby reducing control signaling within the network and reducing power consumption at the UEs 115. Moreover, aspects of the present disclosure enable wireless devices to maintain (e.g., store) context information used for performance of respective core network services based on the activation states of each respective core network service at the UEs 115. In this regard, by enabling wireless devices to maintain context information for active and inactive core network services, techniques described herein may facilitate quick and efficient service re-establishment upon activation of a core network service, thereby reducing control signaling used to activate core network services and improving overall user experience.

Figure 9:
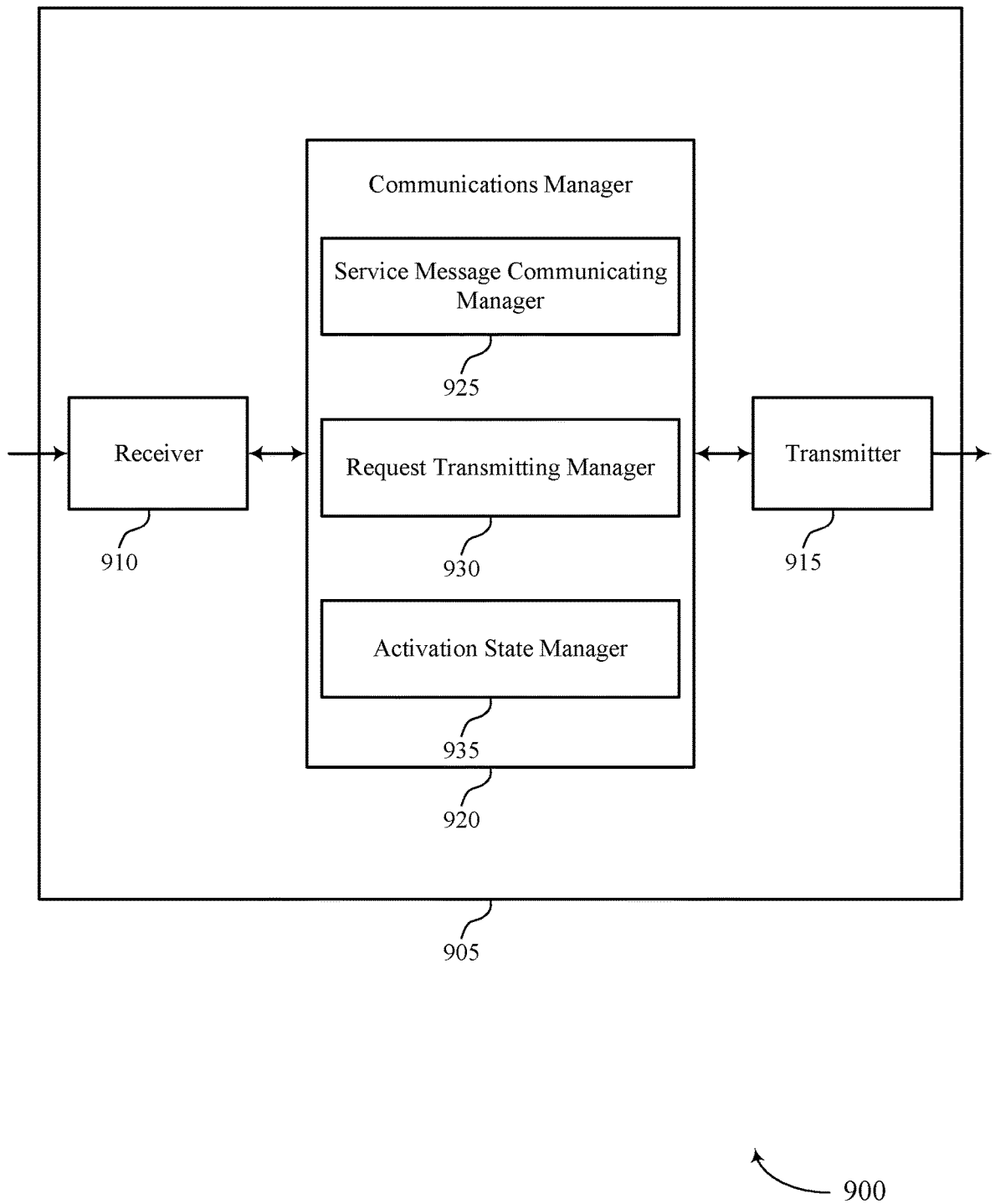

FIG. 9 shows a block diagram 900 of a device 905 that supports techniques for service states in a service-based wireless system in accordance with one or more aspects of the present disclosure. The device 905 may be an example of aspects of a device 805 or a UE 115 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to techniques for service states in a service-based wireless system). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to techniques for service states in a service-based wireless system). In some examples, the transmitter 915 may be co-located with a receiver 910 in a transceiver module. The transmitter 915 may utilize a single antenna or a set of multiple antennas.

The device 905, or various components thereof, may be an example of means for performing various aspects of techniques for service states in a service-based wireless system as described herein. For example, the communications manager 920 may include a service message communicating manager 925, a request transmitting manager 930, an activation state manager 935, or any combination thereof. The communications manager 920 may be an example of aspects of a communications manager 820 as described herein. In some examples, the communications manager 920, or various components thereof, may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communication at a UE in accordance with examples as disclosed herein. The service message communicating manager 925 may be configured as or otherwise support a means for communicating, via a DU, a first service message with a first core network service offered by a service-based network, the first service message communicated in accordance with a first service context for communicating with the first core network service, the first service context maintained at the UE based on the first core network service being in an active state at the UE. The request transmitting manager 930 may be configured as or otherwise support a means for transmitting, to the DU, a request to activate a second core network service offered by the service-based network, the second core network service associated with a second service context for communicating with the second core network service, where the second service context is maintained at the UE based on the second core network service being in an inactive state at the UE. The activation state manager 935 may be configured as or otherwise support a means for receiving, from the DU in response to the request, a message indicating an activation of the second core network service at the UE. The service message communicating manager 925 may be configured as or otherwise support a means for communicating, via a DU, a second service message with the second core network service in accordance with the second service context based on the activation of the second core network service at the UE.

Figure 10:
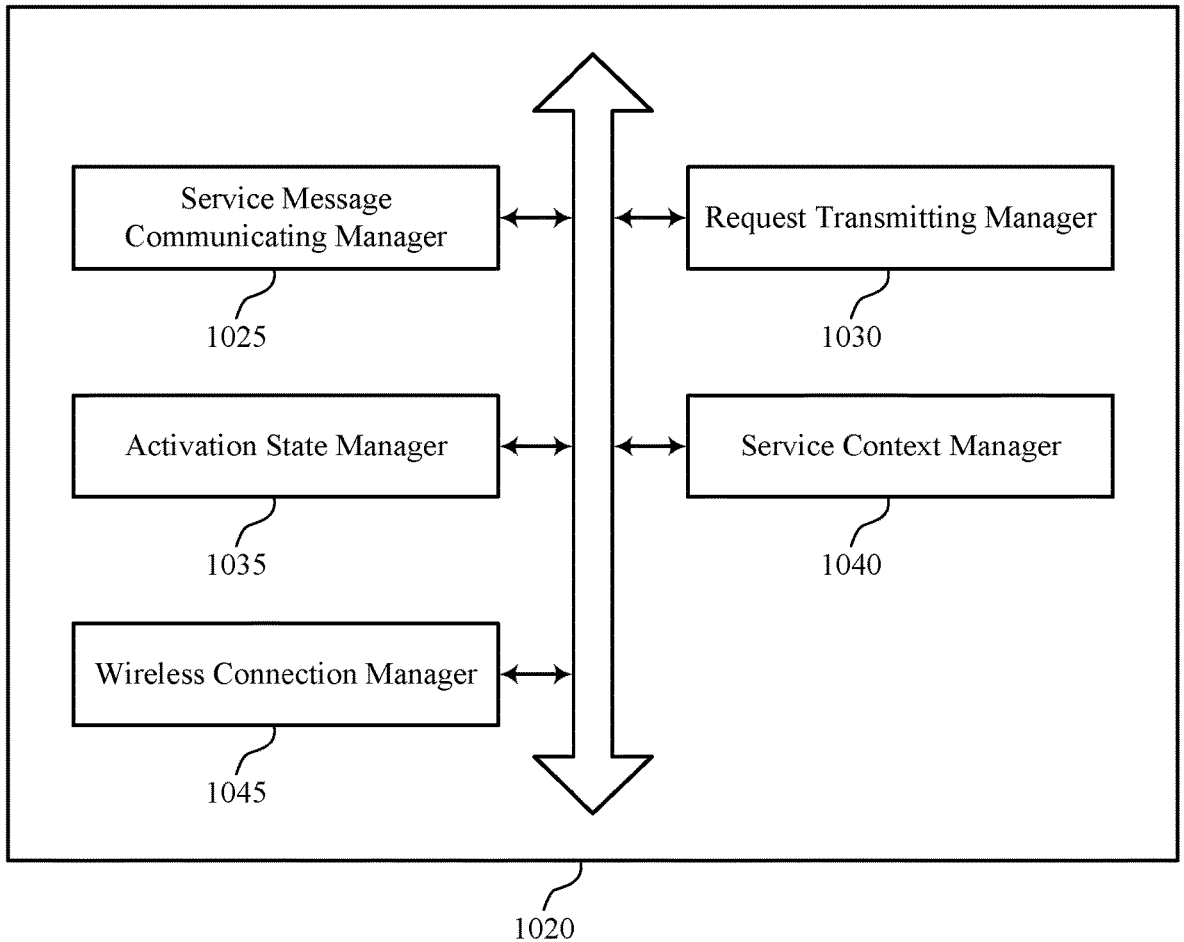
FIG. 10 shows a block diagram of a communications manager that supports techniques for service states in a service-based wireless system in accordance with one or more aspects of the present disclosure.

FIG. 10 shows a block diagram 1000 of a communications manager 1020 that supports techniques for service states in a service-based wireless system in accordance with one or more aspects of the present disclosure. The communications manager 1020 may be an example of aspects of a communications manager 820, a communications manager 920, or both, as described herein. The communications manager 1020, or various components thereof, may be an example of means for performing various aspects of techniques for service states in a service-based wireless system as described herein. For example, the communications manager 1020 may include a service message communicating manager 1025, a request transmitting manager 1030, an activation state manager 1035, a service context manager 1040, a wireless connection manager 1045, or any combination thereof. Each of these components may communicate, directly or indirectly, with one another (e.g., via one or more buses).

The communications manager 1020 may support wireless communication at a UE in accordance with examples as disclosed herein. The service message communicating manager 1025 may be configured as or otherwise support a means for communicating, via a DU, a first service message with a first core network service offered by a service-based network, the first service message communicated in accordance with a first service context for communicating with the first core network service, the first service context maintained at the UE based on the first core network service being in an active state at the UE. The request transmitting manager 1030 may be configured as or otherwise support a means for transmitting, to the DU, a request to activate a second core network service offered by the service-based network, the second core network service associated with a second service context for communicating with the second core network service, where the second service context is maintained at the UE based on the second core network service being in an inactive state at the UE. The activation state manager 1035 may be configured as or otherwise support a means for receiving, from the DU in response to the request, a message indicating an activation of the second core network service at the UE. In some examples, the service message communicating manager 1025 may be configured as or otherwise support a means for communicating, via a DU, a second service message with the second core network service in accordance with the second service context based on the activation of the second core network service at the UE.

In some examples, the request transmitting manager 1030 may be configured as or otherwise support a means for transmitting, to the DU, a second request to establish service with a third core network service based on the third core network service being in an unconnected state at the UE. In some examples, the service context manager 1040 may be configured as or otherwise support a means for receiving, from the DU based on the second request, a second message indicating a third service context for communicating with the third core network service. In some examples, the service context manager 1040 may be configured as or otherwise support a means for storing the third service context in memory based on transitioning the third core network service from the unconnected state to one of the active state or the inactive state at the UE.

In some examples, the activation state manager 1035 may be configured as or otherwise support a means for communicating, with the DU, a second message indicating a deactivation of the first core network service at the UE, where the first service context is maintained at the UE based on the deactivation.

In some examples, the deactivation of the first core network service is based on signaling from the first core network service, a release of a wireless connection between the UE and the DU, a radio link failure, a failure of one or more messages transmitted from the UE to the first core network service, or any combination thereof.

In some examples, the activation state manager 1035 may be configured as or otherwise support a means for identifying that all core network services including the first core network service and the second core network service have been deactivated at the UE. In some examples, the wireless connection manager 1045 may be configured as or otherwise support a means for releasing a wireless connection with the DU based on the identifying.

In some examples, the request transmitting manager 1030 may be configured as or otherwise support a means for transmitting, via the request, a network address associated with the second core network service, a third service message associated with the second core network service, or both.

In some examples, the request transmitting manager 1030 may be configured as or otherwise support a means for transmitting, to the DU, a second request to activate a third core network service offered by the service-based network, the third core network service associated with a third service context for communicating with the third core network service, where the third service context is maintained at the UE based on third core network service being in an inactive state at the UE. In some examples, the activation state manager 1035 may be configured as or otherwise support a means for receiving, from the DU based on the second request, a second message indicating an activation failure of the third core network service.

In some examples, the service context manager 1040 may be configured as or otherwise support a means for removing the third service context from memory based on receiving the second message indicating the activation failure of the third service context.

Figure 11:
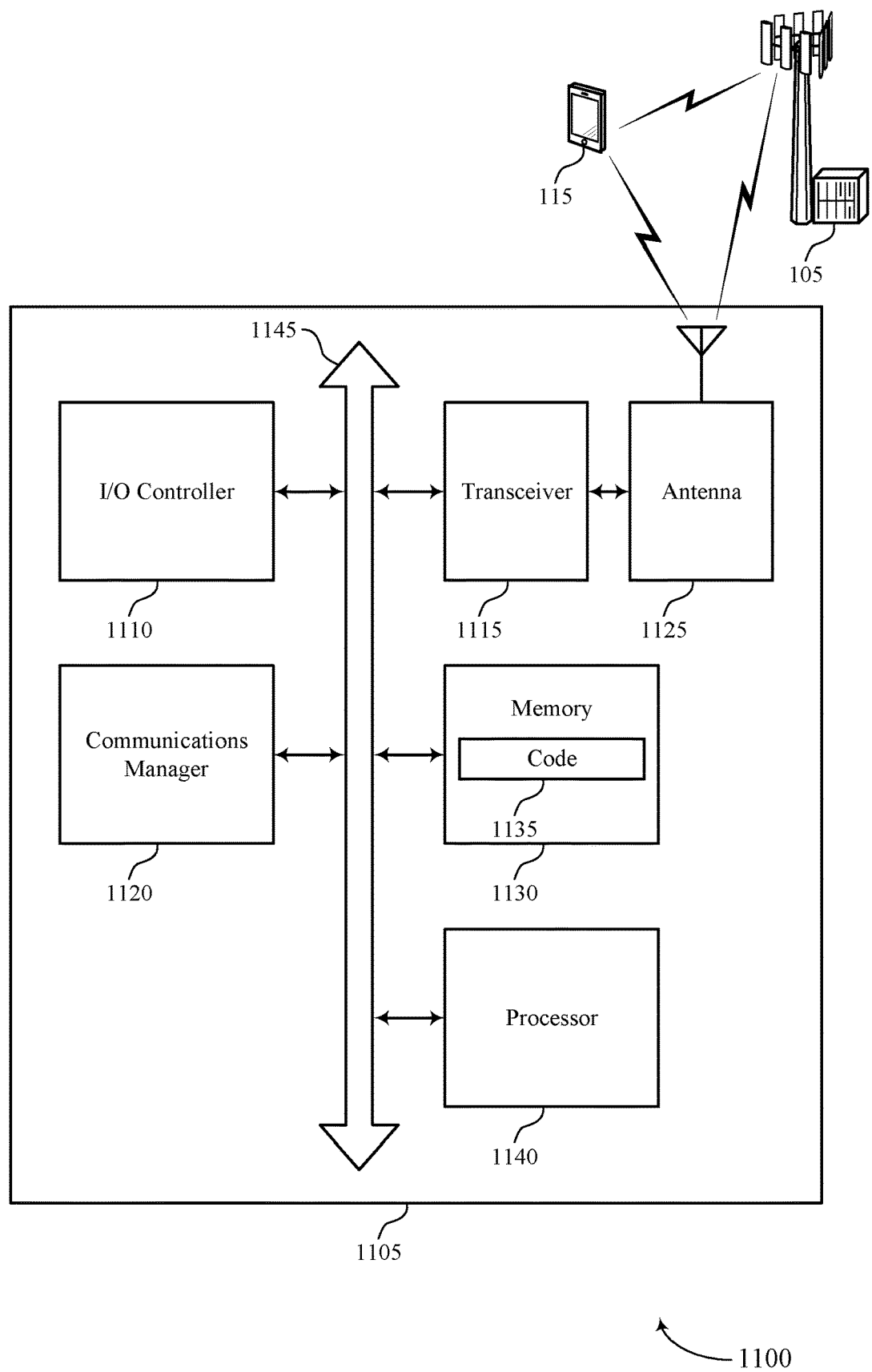
FIG. 11 shows a diagram of a system including a device that supports techniques for service states in a service-based wireless system in accordance with one or more aspects of the present disclosure.

FIG. 11 shows a diagram of a system 1100 including a device 1105 that supports techniques for service states in a service-based wireless system in accordance with one or more aspects of the present disclosure. The device 1105 may be an example of or include the components of a device 805, a device 905, or a UE 115 as described herein. The device 1105 may communicate (e.g., wirelessly) with one or more network entities 105, one or more UEs 115, or any combination thereof. The device 1105 may include components for bi-directional voice and data communications including components for transmitting and receiving communications, such as a communications manager 1120, an input/output (I/O) controller 1110, a transceiver 1115, an antenna 1125, a memory 1130, code 1135, and a processor 1140. These components may be in electronic communication or otherwise coupled (e.g., operatively, communicatively, functionally, electronically, electrically) via one or more buses (e.g., a bus 1145).

The I/O controller 1110 may manage input and output signals for the device 1105. The I/O controller 1110 may also manage peripherals not integrated into the device 1105. In some cases, the I/O controller 1110 may represent a physical connection or port to an external peripheral. In some cases, the I/O controller 1110 may utilize an operating system such as iOS®, ANDROID®, MS-DOS®, MS-WINDOWS®, OS/2®, UNIX®, LINUX®, or another known operating system. Additionally, or alternatively, the I/O controller 1110 may represent or interact with a modem, a keyboard, a mouse, a touchscreen, or a similar device. In some cases, the I/O controller 1110 may be implemented as part of a processor, such as the processor 1140. In some cases, a user may interact with the device 1105 via the I/O controller 1110 or via hardware components controlled by the I/O controller 1110.

In some cases, the device 1105 may include a single antenna 1125. However, in some other cases, the device 1105 may have more than one antenna 1125, which may be capable of concurrently transmitting or receiving multiple wireless transmissions. The transceiver 1115 may communicate bi-directionally, via the one or more antennas 1125, wired, or wireless links as described herein. For example, the transceiver 1115 may represent a wireless transceiver and may communicate bi-directionally with another wireless transceiver. The transceiver 1115 may also include a modem to modulate the packets, to provide the modulated packets to one or more antennas 1125 for transmission, and to demodulate packets received from the one or more antennas 1125. The transceiver 1115, or the transceiver 1115 and one or more antennas 1125, may be an example of a transmitter 815, a transmitter 915, a receiver 810, a receiver 910, or any combination thereof or component thereof, as described herein.

The memory 1130 may include random access memory (RAM) and read-only memory (ROM). The memory 1130 may store computer-readable, computer-executable code 1135 including instructions that, when executed by the processor 1140, cause the device 1105 to perform various functions described herein. The code 1135 may be stored in a non-transitory computer-readable medium such as system memory or another type of memory. In some cases, the code 1135 may not be directly executable by the processor 1140 but may cause a computer (e.g., when compiled and executed) to perform functions described herein. In some cases, the memory 1130 may contain, among other things, a basic I/O system (BIOS) which may control basic hardware or software operation such as the interaction with peripheral components or devices.

The processor 1140 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting techniques for service states in a service-based wireless system). For example, the device 1105 or a component of the device 1105 may include a processor 1140 and memory 1130 coupled with or to the processor 1140, the processor 1140 and memory 1130 configured to perform various functions described herein.

The communications manager 1120 may support wireless communication at a UE in accordance with examples as disclosed herein. For example, the communications manager 1120 may be configured as or otherwise support a means for communicating, via a DU, a first service message with a first core network service offered by a service-based network, the first service message communicated in accordance with a first service context for communicating with the first core network service, the first service context maintained at the UE based on the first core network service being in an active state at the UE. The communications manager 1120 may be configured as or otherwise support a means for transmitting, to the DU, a request to activate a second core network service offered by the service-based network, the second core network service associated with a second service context for communicating with the second core network service, where the second service context is maintained at the UE based on the second core network service being in an inactive state at the UE. The communications manager 1120 may be configured as or otherwise support a means for receiving, from the DU in response to the request, a message indicating an activation of the second core network service at the UE. The communications manager 1120 may be configured as or otherwise support a means for communicating, via a DU, a second service message with the second core network service in accordance with the second service context based on the activation of the second core network service at the UE.

By including or configuring the communications manager 1120 in accordance with examples as described herein, the device 1105 may support techniques enable UEs 115 to subscribe to different core network services on an à la carte basis depending on the needs or requirements of the respective UEs 115, and to activate and deactivate the respective core network services. In this regard, aspects of the present disclosure enable different core network services to be maintained in different activation states at the UEs 115 depending on the needs or requirements of the respective UEs 115, and for core network services to be activated or deactivated independently of one another. As such, techniques described herein may enable UEs 115 to activate only those core network services that are required or expected, thereby reducing control signaling within the network and reducing power consumption at the UEs 115. Moreover, aspects of the present disclosure enable wireless devices to maintain (e.g., store) context information used for performance of respective core network services based on the activation states of each respective core network service at the UEs 115. In this regard, by enabling wireless devices to maintain context information for active and inactive core network services, techniques described herein may facilitate quick and efficient service re-establishment upon activation of a core network service, thereby reducing control signaling used to activate core network services and improving overall user experience.

In some examples, the communications manager 1120 may be configured to perform various operations (e.g., receiving, monitoring, transmitting) using or otherwise in cooperation with the transceiver 1115, the one or more antennas 1125, or any combination thereof. Although the communications manager 1120 is illustrated as a separate component, in some examples, one or more functions described with reference to the communications manager 1120 may be supported by or performed by the processor 1140, the memory 1130, the code 1135, or any combination thereof. For example, the code 1135 may include instructions executable by the processor 1140 to cause the device 1105 to perform various aspects of techniques for service states in a service-based wireless system as described herein, or the processor 1140 and the memory 1130 may be otherwise configured to perform or support such operations.

Figure 12:
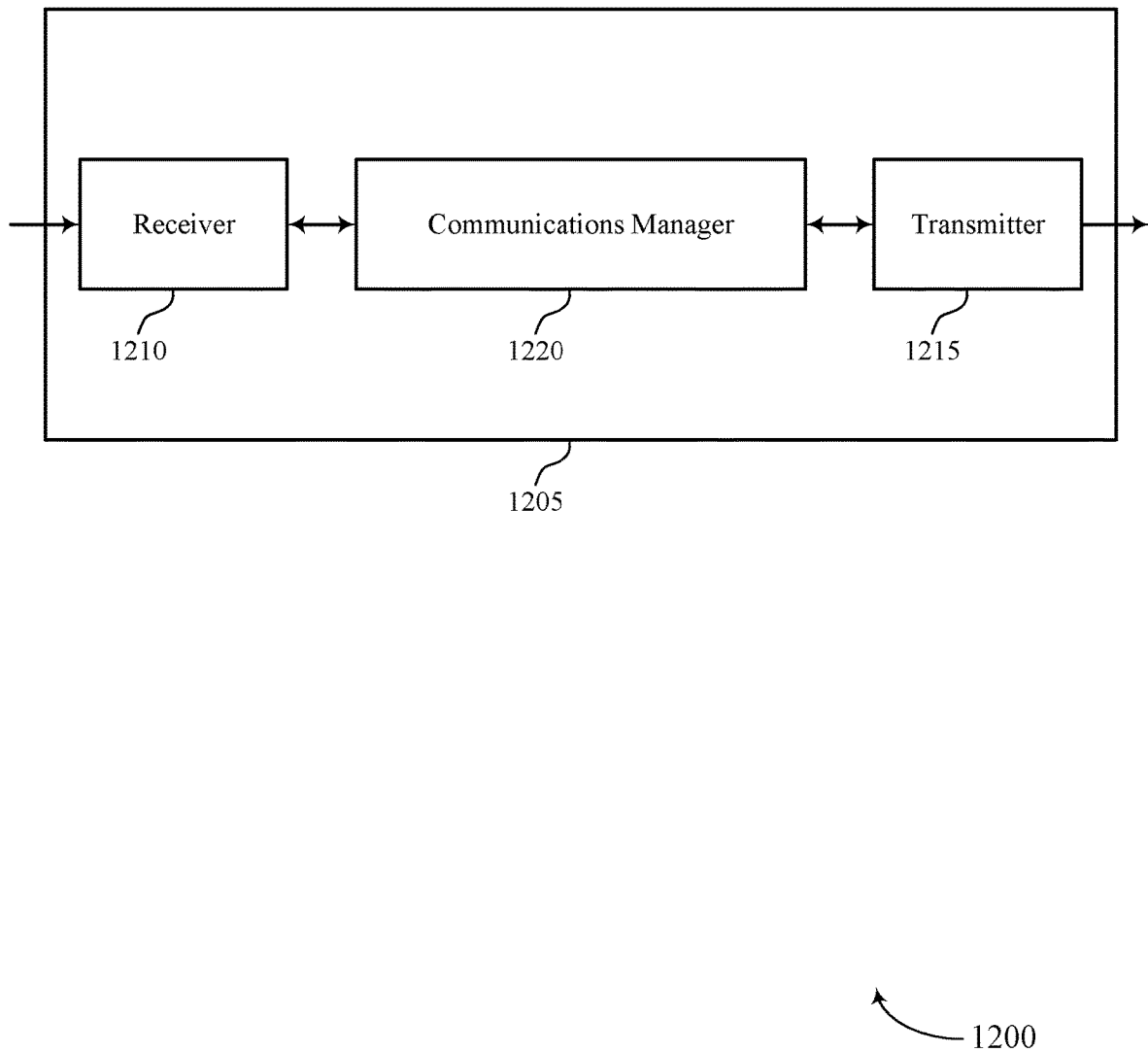
FIGS. 12 and 13 show block diagrams of devices that support techniques for service states in a service-based wireless system in accordance with one or more aspects of the present disclosure.

FIG. 12 shows a block diagram 1200 of a device 1205 that supports techniques for service states in a service-based wireless system in accordance with one or more aspects of the present disclosure. The device 1205 may be an example of aspects of a network entity 105 as described herein. The device 1205 may include a receiver 1210, a transmitter 1215, and a communications manager 1220. The device

1205 may also include a processor. Each of these components may be in communication with one another (e.g., via one or more buses).

The receiver 1210 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1205. In some examples, the receiver 1210 may support obtaining information by receiving signals via one or more antennas. Additionally, or alternatively, the receiver 1210 may support obtaining information by receiving signals via one or more wired (e.g., electrical, fiber optic) interfaces, wireless interfaces, or any combination thereof.

The transmitter 1215 may provide a means for outputting (e.g., transmitting, providing, conveying, sending) information generated by other components of the device 1205. For example, the transmitter 1215 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1215 may support outputting information by transmitting signals via one or more antennas. Additionally, or alternatively, the transmitter 1215 may support outputting information by transmitting signals via one or more wired (e.g., electrical, fiber optic) interfaces, wireless interfaces, or any combination thereof. In some examples, the transmitter 1215 and the receiver 1210 may be co-located in a transceiver, which may include or be coupled with a modem.

The communications manager 1220, the receiver 1210, the transmitter 1215, or various combinations thereof or various components thereof may be examples of means for performing various aspects of techniques for service states in a service-based wireless system as described herein. For example, the communications manager 1220, the receiver 1210, the transmitter 1215, or various combinations or components thereof may support a method for performing one or more of the functions described herein.

In some examples, the communications manager 1220, the receiver 1210, the transmitter 1215, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1220, the receiver 1210, the transmitter 1215, or various combinations or components thereof may be implemented in code (e.g., as communications management software or firmware) executed by a processor. If implemented in code executed by a processor, the functions of the communications manager 1220, the receiver 1210, the transmitter 1215, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 1220 may be configured to perform various operations (e.g., receiving, obtaining, monitoring, outputting, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to obtain information, output information, or perform various other operations as described herein.

The communications manager 1220 may support wireless communication at a DU in accordance with examples as disclosed herein. For example, the communications manager 1220 may be configured as or otherwise support a means for communicating a first service message between a UE and a first core network service offered by a service-based network, the first service message communicated in accordance with a first service context for communicating with the first core network service, the first service context maintained at the DU based on the first core network service being in an active state at the UE. The communications manager 1220 may be configured as or otherwise support a means for receiving a request to activate a second core network service offered by the service-based network from an inactive state to the active state at the UE, the second core network service associated with a second service context for communicating with the second core network service. The communications manager 1220 may be configured as or otherwise support a means for transmitting, to the UE based on the request, a message indicating an activation of the second core network service at the UE. The communications manager 1220 may be configured as or otherwise support a means for communicating a second service message between the UE and the second core network service in accordance with the second service context based on the activation of the second core network service at the UE.

Additionally, or alternatively, the communications manager 1220 may support wireless communication at a core network service offered by a service-based network in accordance with examples as disclosed herein. For example, the communications manager 1220 may be configured as or otherwise support a means for communicating, via a DU, a first service message with a UE in accordance with a first UE context for communicating with the UE, the first UE context maintained at the core network service based on the core network service being in an active state at the UE. The communications manager 1220 may be configured as or otherwise support a means for receiving, from the DU, a message indicating a deactivation of the core network service at the UE, where the first UE context is maintained in memory based on the message indicating the deactivation of the core network service at the UE. The communications manager 1220 may be configured as or otherwise support a means for receiving, from the DU, a request to activate the core network service at the UE. The communications manager 1220 may be configured as or otherwise support a means for communicating, via the DU, a second service message with the UE in accordance with the first UE context and based on maintaining the first UE context in memory and receiving the request to activate the core network service at the UE.

By including or configuring the communications manager 1220 in accordance with examples as described herein, the device 1205 (e.g., a processor controlling or otherwise coupled with the receiver 1210, the transmitter 1215, the communications manager 1220, or a combination thereof) may support techniques enable UEs 115 to subscribe to different core network services on an à la carte basis depending on the needs or requirements of the respective UEs 115, and to activate and deactivate the respective core network services. In this regard, aspects of the present disclosure enable different core network services to be maintained in different activation states at the UEs 115 depending on the needs or requirements of the respective UEs 115, and for core network services to be activated or deactivated independently of one another. As such, techniques described herein may enable UEs 115 to activate only those core network services that are required or expected, thereby reducing control signaling within the network and reducing power consumption at the UEs 115. Moreover, aspects of the present disclosure enable wireless devices to maintain (e.g., store) context information used for performance of respective core network services based on the activation states of each respective core network service at the UEs 115. In this regard, by enabling wireless devices to maintain context information for active and inactive core network services, techniques described herein may facilitate quick and efficient service re-establishment upon activation of a core network service, thereby reducing control signaling used to activate core network services and improving overall user experience.

Figure 13:
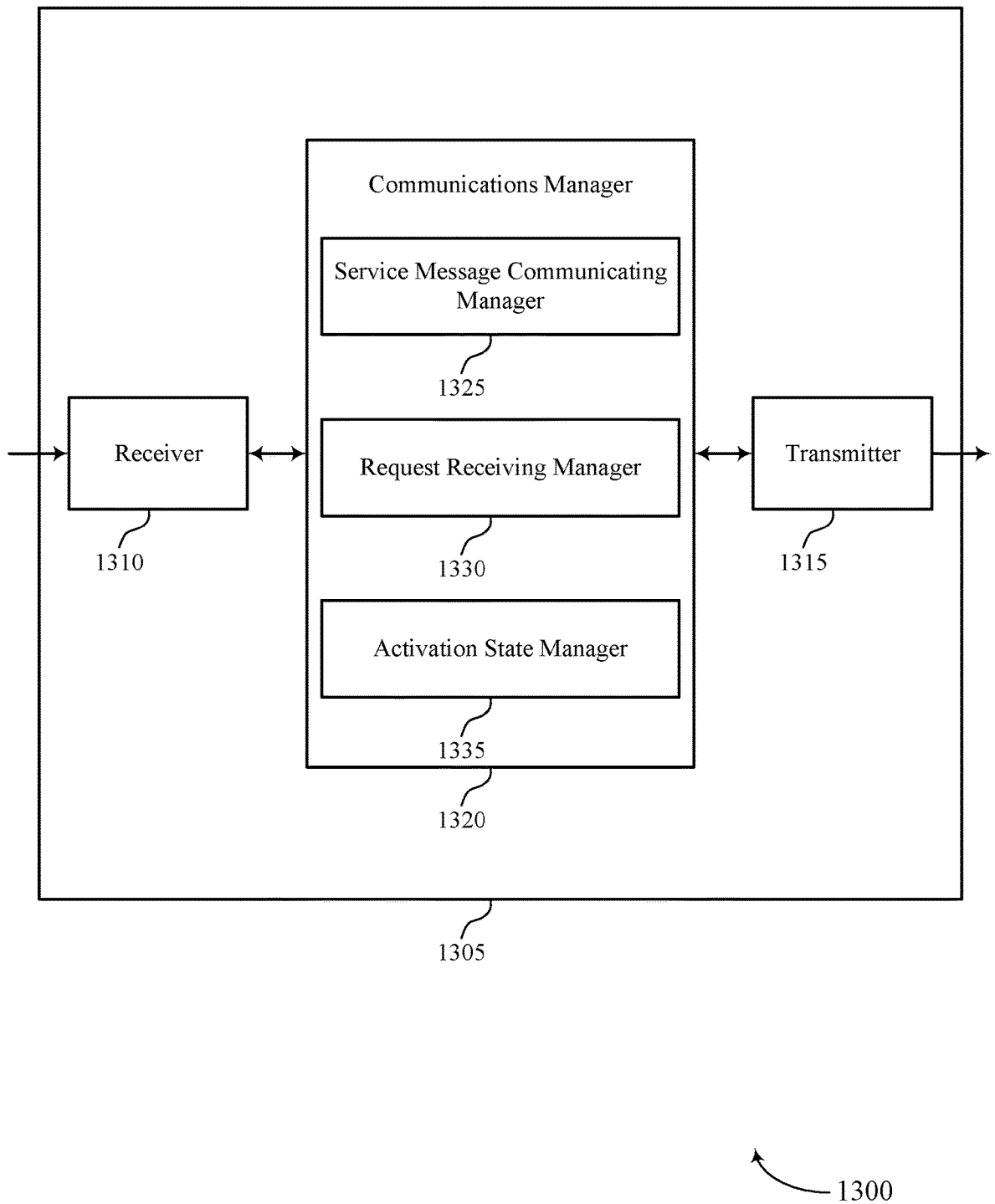

FIG. 13 shows a block diagram 1300 of a device 1305 that supports techniques for service states in a service-based wireless system in accordance with one or more aspects of the present disclosure. The device 1305 may be an example of aspects of a device 1205 or a network entity 105 as described herein. The device 1305 may include a receiver 1310, a transmitter 1315, and a communications manager 1320. The device 1305 may also include a processor. Each of these components may be in communication with one another (e.g., via one or more buses).

The receiver 1310 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1305. In some examples, the receiver 1310 may support obtaining information by receiving signals via one or more antennas. Additionally, or alternatively, the receiver 1310 may support obtaining information by receiving signals via one or more wired (e.g., electrical, fiber optic) interfaces, wireless interfaces, or any combination thereof.

The transmitter 1315 may provide a means for outputting (e.g., transmitting, providing, conveying, sending) information generated by other components of the device 1305. For example, the transmitter 1315 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1315 may support outputting information by transmitting signals via one or more antennas. Additionally, or alternatively, the transmitter 1315 may support outputting information by transmitting signals via one or more wired (e.g., electrical, fiber optic) interfaces, wireless interfaces, or any combination thereof. In some examples, the transmitter 1315 and the receiver 1310 may be co-located in a transceiver, which may include or be coupled with a modem.

The device 1305, or various components thereof, may be an example of means for performing various aspects of techniques for service states in a service-based wireless system as described herein. For example, the communications manager 1320 may include a service message communicating manager 1325, a request receiving manager 1330, an activation state manager 1335, or any combination thereof. The communications manager 1320 may be an example of aspects of a communications manager 1220 as described herein. In some examples, the communications manager 1320, or various components thereof, may be configured to perform various operations (e.g., receiving, obtaining, monitoring, outputting, transmitting) using or otherwise in cooperation with the receiver 1310, the transmitter 1315, or both. For example, the communications manager 1320 may receive information from the receiver 1310, send information to the transmitter 1315, or be integrated in combination with the receiver 1310, the transmitter 1315, or both to obtain information, output information, or perform various other operations as described herein.

The communications manager 1320 may support wireless communication at a DU in accordance with examples as disclosed herein. The service message communicating manager 1325 may be configured as or otherwise support a means for communicating a first service message between a UE and a first core network service offered by a service-based network, the first service message communicated in accordance with a first service context for communicating with the first core network service, the first service context maintained at the DU based on the first core network service being in an active state at the UE. The request receiving manager 1330 may be configured as or otherwise support a means for receiving a request to activate a second core network service offered by the service-based network from an inactive state to the active state at the UE, the second core network service associated with a second service context for communicating with the second core network service. The activation state manager 1335 may be configured as or otherwise support a means for transmitting, to the UE based on the request, a message indicating an activation of the second core network service at the UE. The service message communicating manager 1325 may be configured as or otherwise support a means for communicating a second service message between the UE and the second core network service in accordance with the second service context based on the activation of the second core network service at the UE.

Additionally, or alternatively, the communications manager 1320 may support wireless communication at a core network service offered by a service-based network in accordance with examples as disclosed herein. The service message communicating manager 1325 may be configured as or otherwise support a means for communicating, via a DU, a first service message with a UE in accordance with a first UE context for communicating with the UE, the first UE context maintained at the core network service based on the core network service being in an active state at the UE. The activation state manager 1335 may be configured as or otherwise support a means for receiving, from the DU, a message indicating a deactivation of the core network service at the UE, where the first UE context is maintained in memory based on the message indicating the deactivation of the core network service at the UE. The request receiving manager 1330 may be configured as or otherwise support a means for receiving, from the DU, a request to activate the core network service at the UE. The service message communicating manager 1325 may be configured as or otherwise support a means for communicating, via the DU, a second service message with the UE in accordance with the first UE context and based on maintaining the first UE context in memory and receiving the request to activate the core network service at the UE.

Figure 14:
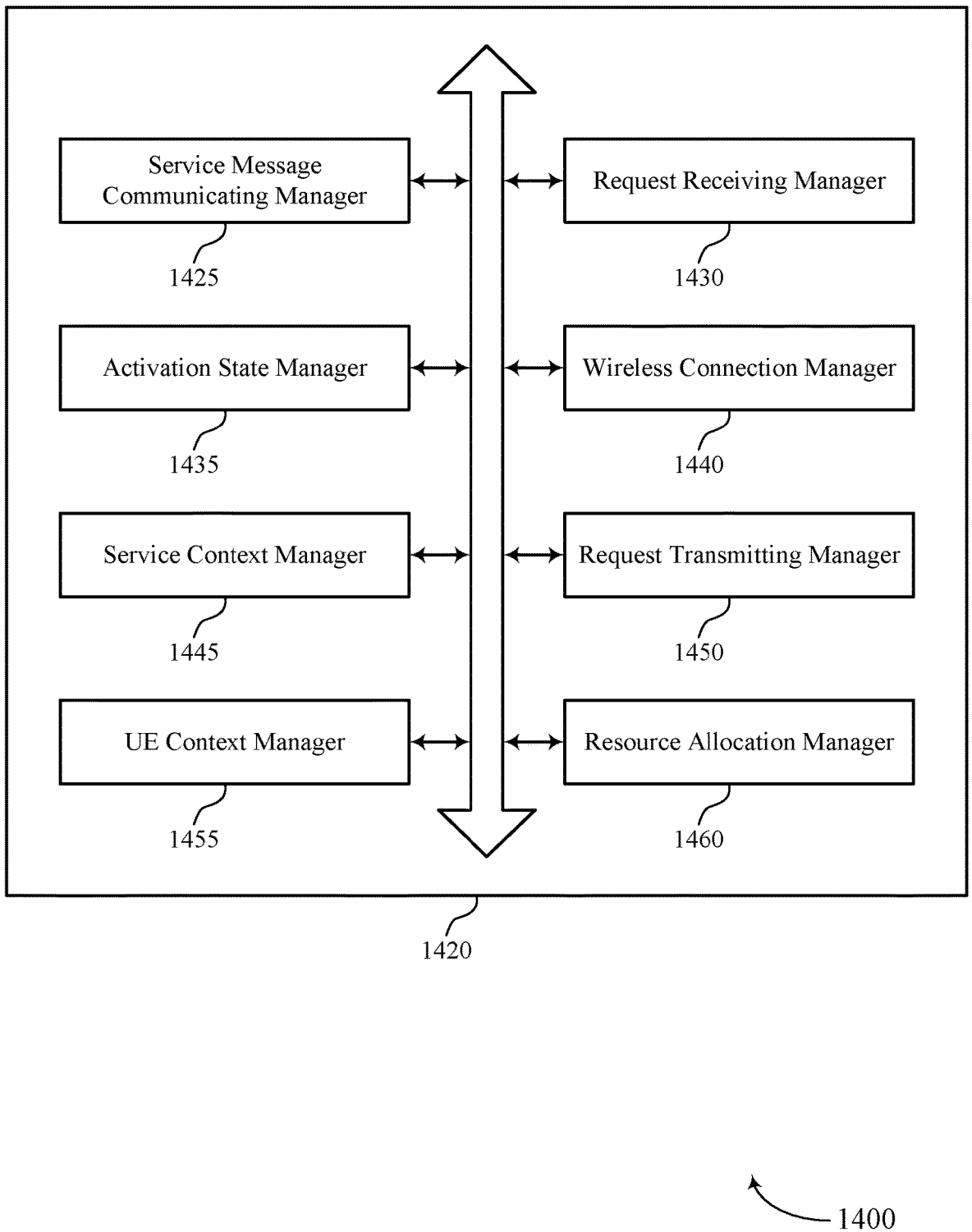
FIG. 14 shows a block diagram of a communications manager that supports techniques for service states in a service-based wireless system in accordance with one or more aspects of the present disclosure.

FIG. 14 shows a block diagram 1400 of a communications manager 1420 that supports techniques for service states in a service-based wireless system in accordance with one or more aspects of the present disclosure. The communications manager 1420 may be an example of aspects of a communications manager 1220, a communications manager 1320, or both, as described herein. The communications manager 1420, or various components thereof, may be an example of means for performing various aspects of techniques for service states in a service-based wireless system as described herein. For example, the communications manager 1420 may include a service message communicating manager 1425, a request receiving manager 1430, an activation state manager 1435, a wireless connection manager 1440, a service context manager 1445, a request transmitting manager 1450, a UE context manager 1455, a resource allocation manager 1460, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1420 may support wireless communication at a DU in accordance with examples as disclosed herein. The service message communicating manager 1425 may be configured as or otherwise support a means for communicating a first service message between a UE and a first core network service offered by a service-based network, the first service message communicated in accordance with a first service context for communicating with the first core network service, the first service context maintained at the DU based on the first core network service being in an active state at the UE. The request receiving manager 1430 may be configured as or otherwise support a means for receiving a request to activate a second core network service offered by the service-based network from an inactive state to the active state at the UE, the second core network service associated with a second service context for communicating with the second core network service. The activation state manager 1435 may be configured as or otherwise support a means for transmitting, to the UE based on the request, a message indicating an activation of the second core network service at the UE. In some examples, the service message communicating manager 1425 may be configured as or otherwise support a means for communicating a second service message between the UE and the second core network service in accordance with the second service context based on the activation of the second core network service at the UE.

In some examples, the activation state manager 1435 may be configured as or otherwise support a means for communicating, with the UE, the first core network service, or both, a second message indicating a deactivation of the first core network service at the UE.

In some examples, the resource allocation manager 1460 may be configured as or otherwise support a means for reallocating a set of resources that were previously allocated for wireless communications between the UE and the first core network service to an additional UE, an additional core network service, or both, where the reallocation is based on the second message indicating the deactivation of the first core network service.

In some examples, the deactivation of the first core network service is based on signaling from the first core network service, signaling from the UE, a release of a wireless connection between the UE and the DU, a radio link failure, a failure of one or more messages transmitted from the UE to the first core network service, or any combination thereof.

In some examples, the wireless connection manager 1440 may be configured as or otherwise support a means for establishing a wireless connection with the UE based on a handover procedure from a second DU to the DU. In some examples, the service context manager 1445 may be configured as or otherwise support a means for obtaining the first service context associated with the first core network service from the first core network service, an additional core network service, or both, based on establishing the wireless connection, where communicating the first service message is based on obtaining the first service context.

In some examples, the request transmitting manager 1450 may be configured as or otherwise support a means for transmitting the request to the second core network service based on receiving the request. In some examples, the activation state manager 1435 may be configured as or otherwise support a means for receiving, from the second core network service based on transmitting the request, an acknowledgment of the activation of the second core network service, where transmitting the message indicating the activation of the second core network service is based on the acknowledgment.

In some examples, the request receiving manager 1430 may be configured as or otherwise support a means for receiving, via the request, a network address associated with the second core network service, a third service message associated with the second core network service, or both, where transmitting the request to the second core network service is based on receiving the network address, the third service message, or both.

In some examples, the request receiving manager 1430 may be configured as or otherwise support a means for receiving, from the UE, a second request to activate a third core network service offered by the service-based network at the UE, the third core network service associated with a third service context for communicating with the third core network service. In some examples, the activation state manager 1435 may be configured as or otherwise support a means for transmitting, to the UE based on the second request, a second message indicating an activation failure of the third core network service.

In some examples, the activation state manager 1435 may be configured as or otherwise support a means for identifying that all core network services including the first core network service and the second core network service have been deactivated at the UE. In some examples, the wireless connection manager 1440 may be configured as or otherwise support a means for releasing a wireless connection with the UE based on the identifying.

Additionally, or alternatively, the communications manager 1420 may support wireless communication at a core network service offered by a service-based network in accordance with examples as disclosed herein. In some examples, the service message communicating manager 1425 may be configured as or otherwise support a means for communicating, via a DU, a first service message with a UE in accordance with a first UE context for communicating with the UE, the first UE context maintained at the core network service based on the core network service being in an active state at the UE. In some examples, the activation state manager 1435 may be configured as or otherwise support a means for receiving, from the DU, a message indicating a deactivation of the core network service at the UE, where the first UE context is maintained in memory based on the message indicating the deactivation of the core network service at the UE. In some examples, the request receiving manager 1430 may be configured as or otherwise support a means for receiving, from the DU, a request to activate the core network service at the UE. In some examples, the service message communicating manager 1425 may be configured as or otherwise support a means for communicating, via the DU, a second service message with the UE in accordance with the first UE context and based on maintaining the first UE context in memory and receiving the request to activate the core network service at the UE.

In some examples, the request receiving manager 1430 may be configured as or otherwise support a means for receiving, from the DU, a second request to establish service with a second UE based on the core network service being in an unconnected state at the second UE. In some examples, the service context manager 1445 may be configured as or otherwise support a means for transmitting, to the DU based on the second request, a second message indicating a first service context for communicating with the core network service. In some examples, the UE context manager 1455 may be configured as or otherwise support a means for storing a second UE context associated with the second UE in memory based on transmitting the second message indicating the first service context.

In some examples, the request receiving manager 1430 may be configured as or otherwise support a means for receiving, from the DU, a second request for a first service context associated with wireless communications with the core network service based on a handover procedure from a second DU to the DU. In some examples, the service message communicating manager 1425 may be configured as or otherwise support a means for transmitting, to the DU based on the second request, the first service context associated with the core network service, where communicating the first service message is based on the first service context.

In some examples, the activation state manager 1435 may be configured as or otherwise support a means for transmitting, to the DU, a second message indicating the deactivation of the core network service at the UE, where receiving the message indicating the deactivation is based on the second message.

In some examples, the deactivation of the core network service is based on signaling from the core network service, a release of a wireless connection between the UE and the DU, a radio link failure, a failure of one or more messages transmitted from the UE to the core network service, or any combination thereof.

Figure 15:
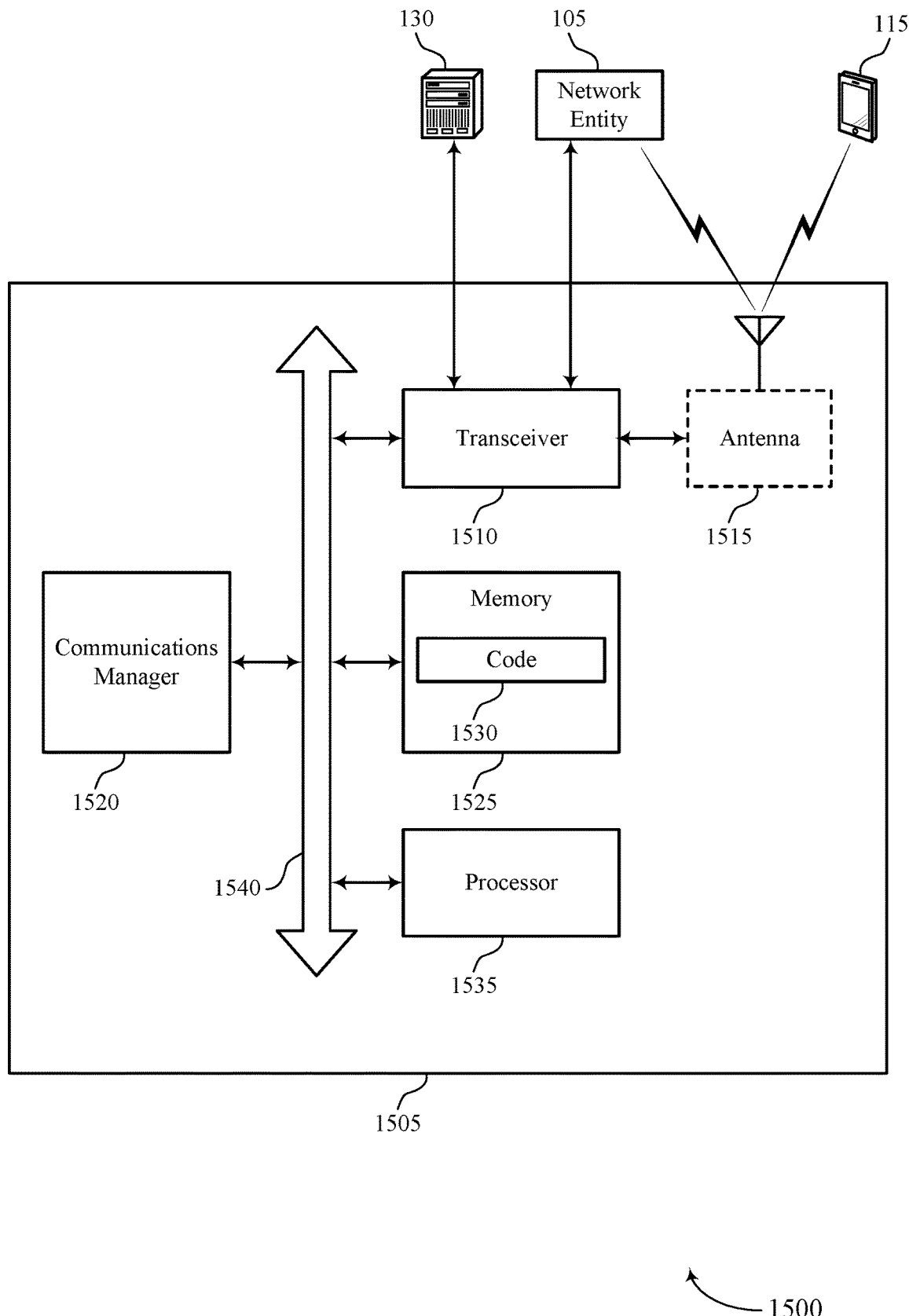
FIG. 15 shows a diagram of a system including a device that supports techniques for service states in a service-based wireless system in accordance with one or more aspects of the present disclosure.

FIG. 15 shows a diagram of a system 1500 including a device 1505 that supports techniques for service states in a service-based wireless system in accordance with one or more aspects of the present disclosure. The device 1505 may be an example of or include the components of a device 1205, a device 1305, or a network entity 105 as described herein. The device 1505 may communicate with one or more network entities 105, one or more UEs 115, or any combination thereof, which may include communications over one or more wired interfaces, over one or more wireless interfaces, or any combination thereof. The device 1505 may include components that support outputting and obtaining communications, such as a communications manager 1520, a transceiver 1510, an antenna 1515, a memory 1525, code 1530, and a processor 1535. These components may be in electronic communication or otherwise coupled (e.g., operatively, communicatively, functionally, electronically, electrically) via one or more buses (e.g., a bus 1540).

The transceiver 1510 may support bi-directional communications via wired links, wireless links, or both as described herein. In some examples, the transceiver 1510 may include a wired transceiver and may communicate bi-directionally with another wired transceiver. Additionally, or alternatively, in some examples, the transceiver 1510 may include a wireless transceiver and may communicate bi-directionally with another wireless transceiver. In some examples, the device 1505 may include one or more antennas 1515, which may be capable of transmitting or receiving wireless transmissions (e.g., concurrently). The transceiver 1510 may also include a modem to modulate signals, to provide the modulated signals for transmission (e.g., by one or more antennas 1515, by a wired transmitter), to receive modulated signals (e.g., from one or more antennas 1515, from a wired receiver), and to demodulate signals. In some implementations, the transceiver 1510 may include one or more interfaces, such as one or more interfaces coupled with the one or more antennas 1515 that are configured to support various receiving or obtaining operations, or one or more interfaces coupled with the one or more antennas 1515 that are configured to support various transmitting or outputting operations, or a combination thereof. In some implementations, the transceiver 1510 may include or be configured for coupling with one or more processors or memory components that are operable to perform or support operations based on received or obtained information or signals, or to generate information or other signals for transmission or other outputting, or any combination thereof. In some implementations, the transceiver 1510, or the transceiver 1510 and the one or more antennas 1515, or the transceiver 1510 and the one or more antennas 1515 and one or more processors or memory components (for example, the processor 1535, or the memory 1525, or both), may be included in a chip or chip assembly that is installed in the device 1505. In some examples, the transceiver may be operable to support communications via one or more communications links (e.g., a communication link 125, a backhaul communication link 120, a midhaul communication link, a fronthaul communication link 168).

The memory 1525 may include RAM and ROM. The memory 1525 may store computer-readable, computer-executable code 1530 including instructions that, when executed by the processor 1535, cause the device 1505 to perform various functions described herein. The code 1530 may be stored in a non-transitory computer-readable medium such as system memory or another type of memory. In some cases, the code 1530 may not be directly executable by the processor 1535 but may cause a computer (e.g., when compiled and executed) to perform functions described herein. In some cases, the memory 1525 may contain, among other things, a BIOS which may control basic hardware or software operation such as the interaction with peripheral components or devices.

The processor 1535 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1535 may be configured to operate a memory array using a memory controller. In some other cases, a memory controller may be integrated into the processor 1535. The processor 1535 may be configured to execute computer-readable instructions stored in a memory (e.g., the memory 1525) to cause the device 1505 to perform various functions (e.g., functions or tasks supporting techniques for service states in a service-based wireless system). For example, the device 1505 or a component of the device 1505 may include a processor 1535 and memory 1525 coupled with the processor 1535, the processor 1535 and memory 1525 configured to perform various functions described herein. The processor 1535 may be an example of a cloud-computing platform (e.g., one or more physical nodes and supporting software such as operating systems, virtual machines, or container instances) that may host the functions (e.g., by executing code 1530) to perform the functions of the device 1505. The processor 1535 may be any one or more suitable processors capable of executing scripts or instructions of one or more software programs stored in the device 1505 (such as within the memory 1525). In some implementations, the processor 1535 may be a component of a processing system. A processing system may generally refer to a system or series of machines or components that receives inputs and processes the inputs to produce a set of outputs (which may be passed to other systems or components of, for example, the device 1505). For example, a processing system of the device 1505 may refer to a system including the various other components or subcomponents of the device 1505, such as the processor 1535, or the transceiver 1510, or the communications manager 1520, or other components or combinations of components of the device 1505. The processing system of the device 1505 may interface with other components of the device 1505, and may process information received from other components (such as inputs or signals) or output information to other components. For example, a chip or modem of the device 1505 may include a processing system and one or more interfaces to output information, or to obtain information, or both. The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 1505 may transmit information output from the chip or modem. Additionally, or alternatively, in some implementations, the one or more interfaces may refer to an interface between the processing system of the chip or modem and a receiver, such that the device 1505 may obtain information or signal inputs, and the information may be passed to the processing system. A person having ordinary skill in the art will readily recognize that a first interface also may obtain information or signal inputs, and a second interface also may output information or signal outputs.

In some examples, a bus 1540 may support communications of (e.g., within) a protocol layer of a protocol stack. In some examples, a bus 1540 may support communications associated with a logical channel of a protocol stack (e.g., between protocol layers of a protocol stack), which may include communications performed within a component of the device 1505, or between different components of the device 1505 that may be co-located or located in different locations (e.g., where the device 1505 may refer to a system in which one or more of the communications manager 1520, the transceiver 1510, the memory 1525, the code 1530, and the processor 1535 may be located in one of the different components or divided between different components).

In some examples, the communications manager 1520 may manage aspects of communications with a core network 130 (e.g., via one or more wired or wireless backhaul links). For example, the communications manager 1520 may manage the transfer of data communications for client devices, such as one or more UEs 115. In some examples, the communications manager 1520 may manage communications with other network entities 105, and may include a controller or scheduler for controlling communications with UEs 115 in cooperation with other network entities 105. In some examples, the communications manager 1520 may support an X2 interface within an LTE/LTE-A wireless communications network technology to provide communication between network entities 105.

The communications manager 1520 may support wireless communication at a DU in accordance with examples as disclosed herein. For example, the communications manager 1520 may be configured as or otherwise support a means for communicating a first service message between a UE and a first core network service offered by a service-based network, the first service message communicated in accordance with a first service context for communicating with the first core network service, the first service context maintained at the DU based on the first core network service being in an active state at the UE. The communications manager 1520 may be configured as or otherwise support a means for receiving a request to activate a second core network service offered by the service-based network from an inactive state to the active state at the UE, the second core network service associated with a second service context for communicating with the second core network service. The communications manager 1520 may be configured as or otherwise support a means for transmitting, to the UE based on the request, a message indicating an activation of the second core network service at the UE. The communications manager 1520 may be configured as or otherwise support a means for communicating a second service message between the UE and the second core network service in accordance with the second service context based on the activation of the second core network service at the UE.

Additionally, or alternatively, the communications manager 1520 may support wireless communication at a core network service offered by a service-based network in accordance with examples as disclosed herein. For example, the communications manager 1520 may be configured as or otherwise support a means for communicating, via a DU, a first service message with a UE in accordance with a first UE context for communicating with the UE, the first UE context maintained at the core network service based on the core network service being in an active state at the UE. The communications manager 1520 may be configured as or otherwise support a means for receiving, from the DU, a message indicating a deactivation of the core network service at the UE, where the first UE context is maintained in memory based on the message indicating the deactivation of the core network service at the UE. The communications manager 1520 may be configured as or otherwise support a means for receiving, from the DU, a request to activate the core network service at the UE. The communications manager 1520 may be configured as or otherwise support a means for communicating, via the DU, a second service message with the UE in accordance with the first UE context and based on maintaining the first UE context in memory and receiving the request to activate the core network service at the UE.

By including or configuring the communications manager 1520 in accordance with examples as described herein, the device 1505 may support techniques enable UEs 115 to subscribe to different core network services on an à la carte basis depending on the needs or requirements of the respective UEs 115, and to activate and deactivate the respective core network services. In this regard, aspects of the present disclosure enable different core network services to be maintained in different activation states at the UEs 115 depending on the needs or requirements of the respective UEs 115, and for core network services to be activated or deactivated independently of one another. As such, techniques described herein may enable UEs 115 to activate only those core network services that are required or expected, thereby reducing control signaling within the network and reducing power consumption at the UEs 115. Moreover, aspects of the present disclosure enable wireless devices to maintain (e.g., store) context information used for performance of respective core network services based on the activation states of each respective core network service at the UEs 115. In this regard, by enabling wireless devices to maintain context information for active and inactive core network services, techniques described herein may facilitate quick and efficient service re-establishment upon activation of a core network service, thereby reducing control signaling used to activate core network services and improving overall user experience.

In some examples, the communications manager 1520 may be configured to perform various operations (e.g., receiving, obtaining, monitoring, outputting, transmitting) using or otherwise in cooperation with the transceiver 1510, the one or more antennas 1515 (e.g., where applicable), or any combination thereof. Although the communications manager 1520 is illustrated as a separate component, in some examples, one or more functions described with reference to the communications manager 1520 may be supported by or performed by the transceiver 1510, the processor 1535, the memory 1525, the code 1530, or any combination thereof. For example, the code 1530 may include instructions executable by the processor 1535 to cause the device 1505 to perform various aspects of techniques for service states in a service-based wireless system as described herein, or the processor 1535 and the memory 1525 may be otherwise configured to perform or support such operations.

Figure 16:
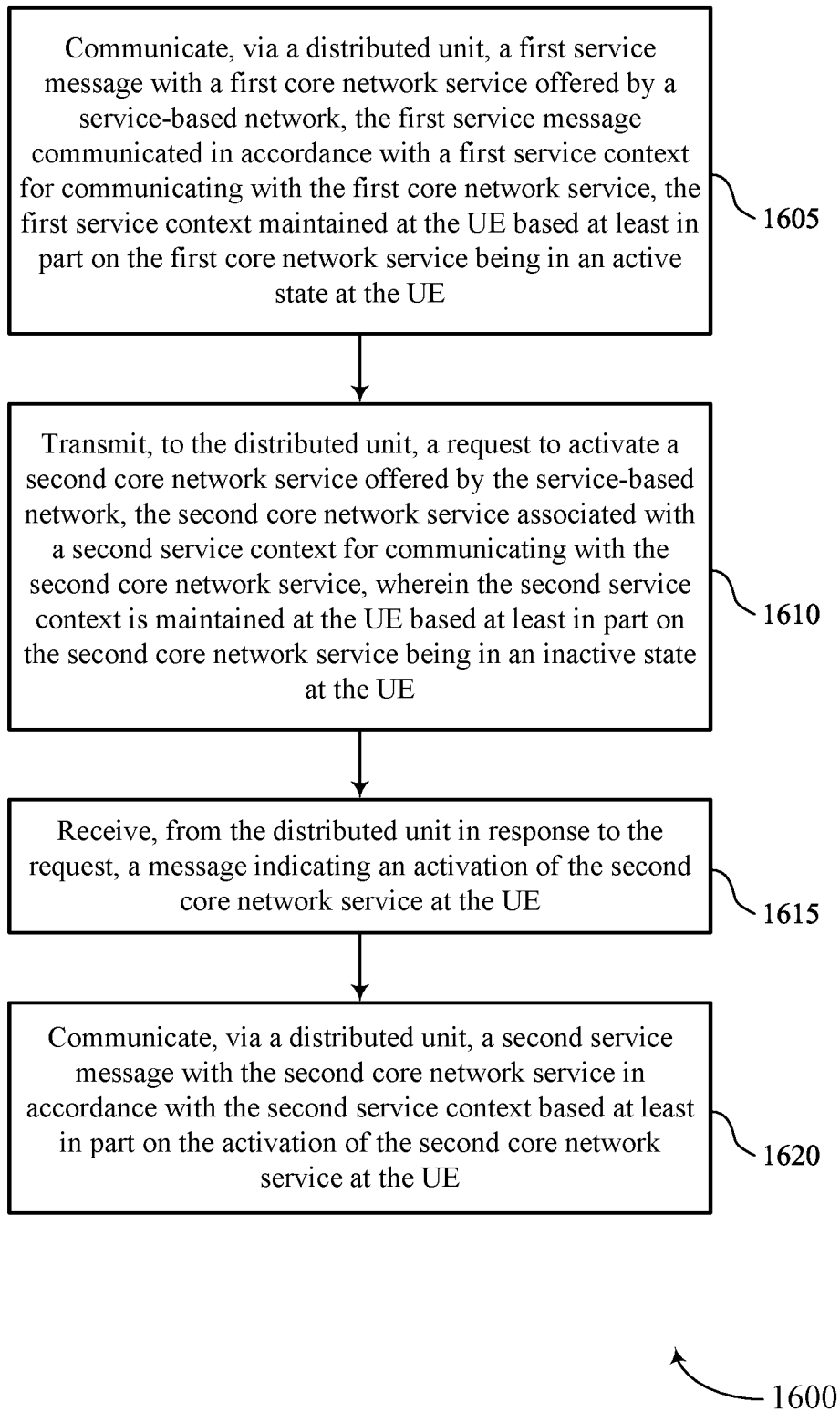
FIGS. 16 through 18 show flowcharts illustrating methods that support techniques for service states in a service-based wireless system in accordance with one or more aspects of the present disclosure.

FIG. 16 shows a flowchart illustrating a method 1600 that supports techniques for service states in a service-based wireless system in accordance with one or more aspects of the present disclosure. The operations of the method 1600 may be implemented by a UE or its components as described herein. For example, the operations of the method 1600 may be performed by a UE 115 as described with reference to FIGS. 1 through 11. In some examples, a UE may execute a set of instructions to control the functional elements of the UE to perform the described functions. Additionally, or alternatively, the UE may perform aspects of the described functions using special-purpose hardware.

At 1605, the method may include communicating, via a DU, a first service message with a first core network service offered by a service-based network, the first service message communicated in accordance with a first service context for communicating with the first core network service, the first service context maintained at the UE based on the first core network service being in an active state at the UE. The operations of 1605 may be performed in accordance with examples as disclosed herein. In some examples, aspects of the operations of 1605 may be performed by a service message communicating manager 1025 as described with reference to FIG. 10.

At 1610, the method may include transmitting, to the DU, a request to activate a second core network service offered by the service-based network, the second core network service associated with a second service context for communicating with the second core network service, where the second service context is maintained at the UE based on the second core network service being in an inactive state at the UE. The operations of 1610 may be performed in accordance with examples as disclosed herein. In some examples, aspects of the operations of 1610 may be performed by a request transmitting manager 1030 as described with reference to FIG. 10.

At 1615, the method may include receiving, from the DU in response to the request, a message indicating an activation of the second core network service at the UE. The operations of 1615 may be performed in accordance with examples as disclosed herein. In some examples, aspects of the operations of 1615 may be performed by an activation state manager 1035 as described with reference to FIG. 10.

At 1620, the method may include communicating, via a DU, a second service message with the second core network service in accordance with the second service context based on the activation of the second core network service at the UE. The operations of 1620 may be performed in accordance with examples as disclosed herein. In some examples, aspects of the operations of 1620 may be performed by a service message communicating manager 1025 as described with reference to FIG. 10.

Figure 17:
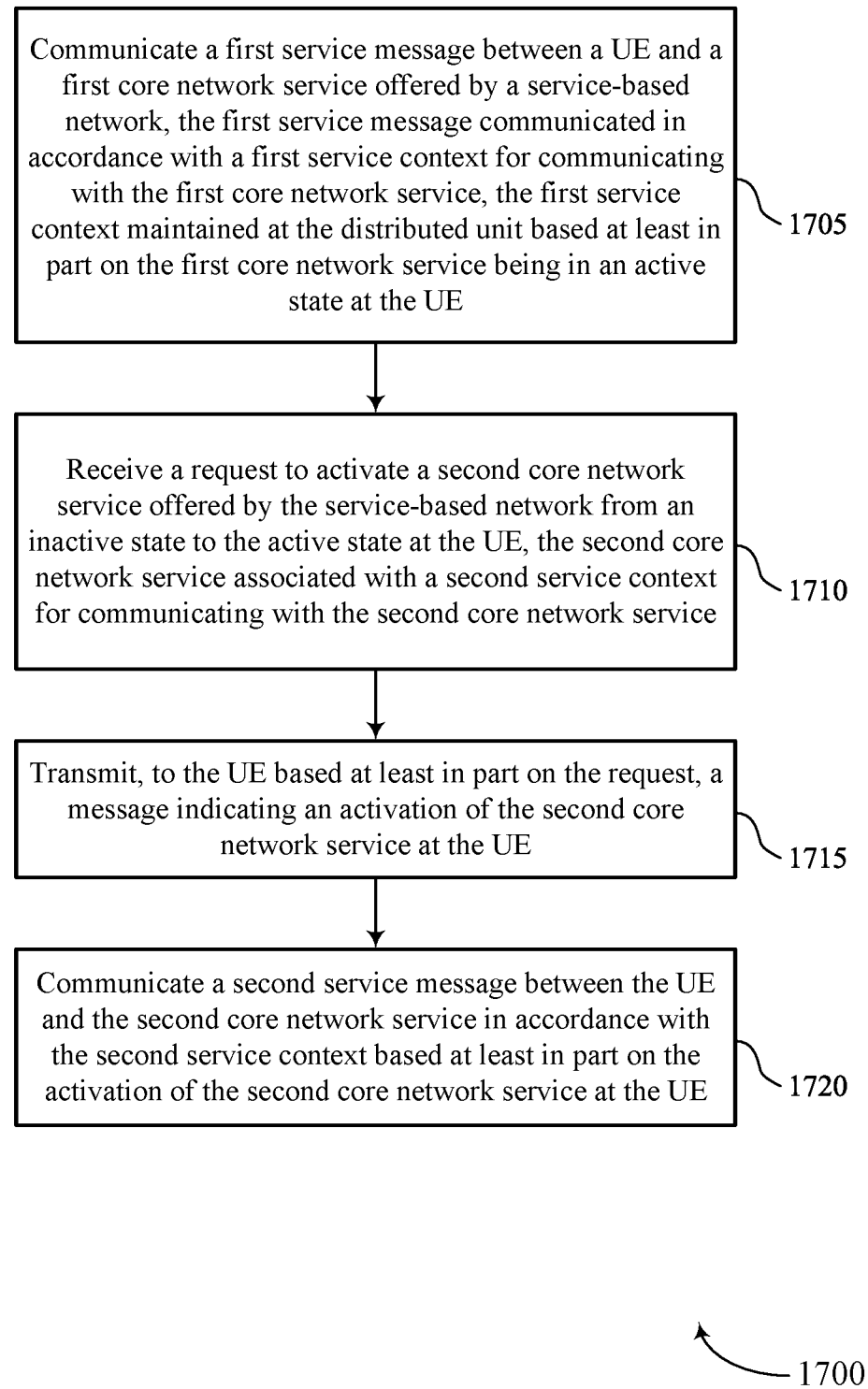

FIG. 17 shows a flowchart illustrating a method 1700 that supports techniques for service states in a service-based wireless system in accordance with one or more aspects of the present disclosure. The operations of the method 1700 may be implemented by a network entity or its components as described herein. For example, the operations of the method 1700 may be performed by a network entity as described with reference to FIGS. 1 through 7 and 12 through 15. In some examples, a network entity may execute a set of instructions to control the functional elements of the network entity to perform the described functions. Additionally, or alternatively, the network entity may perform aspects of the described functions using special-purpose hardware.

At 1705, the method may include communicating a first service message between a UE and a first core network service offered by a service-based network, the first service message communicated in accordance with a first service context for communicating with the first core network service, the first service context maintained at the DU based on the first core network service being in an active state at the UE. The operations of 1705 may be performed in accordance with examples as disclosed herein. In some examples, aspects of the operations of 1705 may be performed by a service message communicating manager 1425 as described with reference to FIG. 14.

At 1710, the method may include receiving a request to activate a second core network service offered by the service-based network from an inactive state to the active state at the UE, the second core network service associated with a second service context for communicating with the second core network service. The operations of 1710 may be performed in accordance with examples as disclosed herein.

In some examples, aspects of the operations of 1710 may be performed by a request receiving manager 1430 as described with reference to FIG. 14.

At 1715, the method may include transmitting, to the UE based on the request, a message indicating an activation of the second core network service at the UE. The operations of 1715 may be performed in accordance with examples as disclosed herein. In some examples, aspects of the operations of 1715 may be performed by an activation state manager 1435 as described with reference to FIG. 14.

At 1720, the method may include communicating a second service message between the UE and the second core network service in accordance with the second service context based on the activation of the second core network service at the UE. The operations of 1720 may be performed in accordance with examples as disclosed herein. In some examples, aspects of the operations of 1720 may be performed by a service message communicating manager 1425 as described with reference to FIG. 14.

Figure 18:
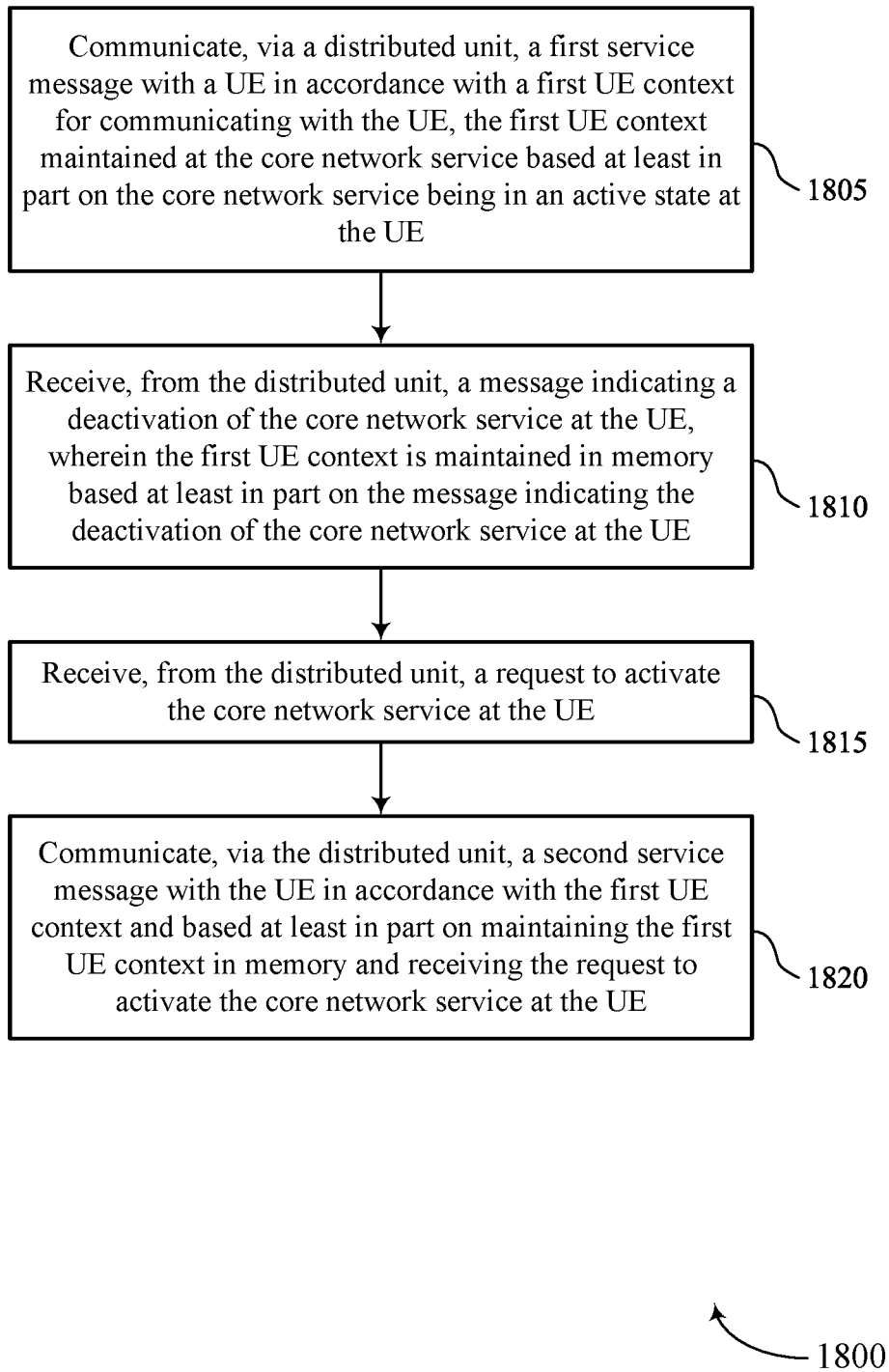

FIG. 18 shows a flowchart illustrating a method 1800 that supports techniques for service states in a service-based wireless system in accordance with one or more aspects of the present disclosure. The operations of the method 1800 may be implemented by a network entity or its components as described herein. For example, the operations of the method 1800 may be performed by a network entity as described with reference to FIGS. 1 through 7 and 12 through 15. In some examples, a network entity may execute a set of instructions to control the functional elements of the network entity to perform the described functions. Additionally, or alternatively, the network entity may perform aspects of the described functions using special-purpose hardware.

At 1805, the method may include communicating, via a DU, a first service message with a UE in accordance with a first UE context for communicating with the UE, the first UE context maintained at the core network service based on the core network service being in an active state at the UE. The operations of 1805 may be performed in accordance with examples as disclosed herein. In some examples, aspects of the operations of 1805 may be performed by a service message communicating manager 1425 as described with reference to FIG. 14.

At 1810, the method may include receiving, from the DU, a message indicating a deactivation of the core network service at the UE, where the first UE context is maintained in memory based on the message indicating the deactivation of the core network service at the UE. The operations of 1810 may be performed in accordance with examples as disclosed herein. In some examples, aspects of the operations of 1810 may be performed by an activation state manager 1435 as described with reference to FIG. 14.

At 1815, the method may include receiving, from the DU, a request to activate the core network service at the UE. The operations of 1815 may be performed in accordance with examples as disclosed herein. In some examples, aspects of the operations of 1815 may be performed by a request receiving manager 1430 as described with reference to FIG. 14.

At 1820, the method may include communicating, via the DU, a second service message with the UE in accordance with the first UE context and based on maintaining the first UE context in memory and receiving the request to activate the core network service at the UE. The operations of 1820 may be performed in accordance with examples as disclosed herein. In some examples, aspects of the operations of 1820 may be performed by a service message communicating manager 1425 as described with reference to FIG. 14.

The following provides an overview of aspects of the present disclosure:

Aspect 1: A method for wireless communication at a UE, comprising: communicating, via a DU, a first service message with a first core network service offered by a service-based network, the first service message communicated in accordance with a first service context for communicating with the first core network service, the first service context maintained at the UE based at least in part on the first core network service being in an active state at the UE; transmitting, to the DU, a request to activate a second core network service offered by the service-based network, the second core network service associated with a second service context for communicating with the second core network service, wherein the second service context is maintained at the UE based at least in part on the second core network service being in an inactive state at the UE; receiving, from the DU in response to the request, a message indicating an activation of the second core network service at the UE; and communicating, via a DU, a second service message with the second core network service in accordance with the second service context based at least in part on the activation of the second core network service at the UE.

Aspect 2: The method of aspect 1, further comprising: transmitting, to the DU, a second request to establish service with a third core network service based at least in part on the third core network service being in an unconnected state at the UE; receiving, from the DU based at least in part on the second request, a second message indicating a third service context for communicating with the third core network service; and storing the third service context in memory based at least in part on transitioning the third core network service from the unconnected state to one of the active state or the inactive state at the UE.

Aspect 3: The method of any of aspects 1 through 2, further comprising: communicating, with the DU, a second message indicating a deactivation of the first core network service at the UE, wherein the first service context is maintained at the UE based at least in part on the deactivation.

Aspect 4: The method of aspect 3, wherein the deactivation of the first core network service is based at least in part on signaling from the first core network service, a release of a wireless connection between the UE and the DU, a radio link failure, a failure of one or more messages transmitted from the UE to the first core network service, or any combination thereof.

Aspect 5: The method of any of aspects 1 through 4, further comprising: identifying that all core network services including the first core network service and the second core network service have been deactivated at the UE; and releasing a wireless connection with the DU based at least in part on the identifying.

Aspect 6: The method of any of aspects 1 through 5, further comprising: transmitting, via the request, a network address associated with the second core network service, a third service message associated with the second core network service, or both.

Aspect 7: The method of any of aspects 1 through 6, further comprising: transmitting, to the DU, a second request to activate a third core network service offered by the service-based network, the third core network service associated with a third service context for communicating with the third core network service, wherein the third service context is maintained at the UE based at least in part on third core network service being in an inactive state at the UE; and receiving, from the DU based at least in part on the second request, a second message indicating an activation failure of the third core network service.

Aspect 8: The method of aspect 7, further comprising: removing the third service context from memory based at least in part on receiving the second message indicating the activation failure of the third service context.

Aspect 9: A method for wireless communication at a DU, comprising: communicating a first service message between a UE and a first core network service offered by a service-based network, the first service message communicated in accordance with a first service context for communicating with the first core network service, the first service context maintained at the DU based at least in part on the first core network service being in an active state at the UE; receiving a request to activate a second core network service offered by the service-based network from an inactive state to the active state at the UE, the second core network service associated with a second service context for communicating with the second core network service; transmitting, to the UE based at least in part on the request, a message indicating an activation of the second core network service at the UE; and communicating a second service message between the UE and the second core network service in accordance with the second service context based at least in part on the activation of the second core network service at the UE.

Aspect 10: The method of aspect 9, further comprising: communicating, with the UE, the first core network service, or both, a second message indicating a deactivation of the first core network service at the UE.

Aspect 11: The method of aspect 10, further comprising: reallocating a set of resources that were previously allocated for wireless communications between the UE and the first core network service to an additional UE, an additional core network service, or both, wherein the reallocation is based at least in part on the second message indicating the deactivation of the first core network service.

Aspect 12: The method of any of aspects 10 through 11, wherein the deactivation of the first core network service is based at least in part on signaling from the first core network service, signaling from the UE, a release of a wireless connection between the UE and the DU, a radio link failure, a failure of one or more messages transmitted from the UE to the first core network service, or any combination thereof.

Aspect 13: The method of any of aspects 9 through 12, further comprising: establishing a wireless connection with the UE based at least in part on a handover procedure from a second DU to the DU; and obtaining the first service context associated with the first core network service from the first core network service, an additional core network service, or both, based at least in part on establishing the wireless connection, wherein communicating the first service message is based at least in part on obtaining the first service context.

Aspect 14: The method of any of aspects 9 through 13, further comprising: transmitting the request to the second core network service based at least in part on receiving the request; and receiving, from the second core network service based at least in part on transmitting the request, an acknowledgment of the activation of the second core network service, wherein transmitting the message indicating the activation of the second core network service is based at least in part on the acknowledgment.

Aspect 15: The method of aspect 14, further comprising: receiving, via the request, a network address associated with the second core network service, a third service message associated with the second core network service, or both, wherein transmitting the request to the second core network service is based at least in part on receiving the network address, the third service message, or both.

Aspect 16: The method of any of aspects 9 through 15, further comprising: receiving, from the UE, a second request to activate a third core network service offered by the service-based network at the UE, the third core network service associated with a third service context for communicating with the third core network service; and transmitting, to the UE based at least in part on the second request, a second message indicating an activation failure of the third core network service.

Aspect 17: The method of any of aspects 9 through 16, further comprising: identifying that all core network services including the first core network service and the second core network service have been deactivated at the UE; and releasing a wireless connection with the UE based at least in part on the identifying.

Aspect 18: A method for wireless communication at a core network service offered by a service-based network, comprising: communicating, via a DU, a first service message with a UE in accordance with a first UE context for communicating with the UE, the first UE context maintained at the core network service based at least in part on the core network service being in an active state at the UE; receiving, from the DU, a message indicating a deactivation of the core network service at the UE, wherein the first UE context is maintained in memory based at least in part on the message indicating the deactivation of the core network service at the UE; receiving, from the DU, a request to activate the core network service at the UE; and communicating, via the DU, a second service message with the UE in accordance with the first UE context and based at least in part on maintaining the first UE context in memory and receiving the request to activate the core network service at the UE.

Aspect 19: The method of aspect 18, further comprising: receiving, from the DU, a second request to establish service with a second UE based at least in part on the core network service being in an unconnected state at the second UE; transmitting, to the DU based at least in part on the second request, a second message indicating a first service context for communicating with the core network service; and storing a second UE context associated with the second UE in memory based at least in part on transmitting the second message indicating the first service context.

Aspect 20: The method of any of aspects 18 through 19, further comprising: receiving, from the DU, a second request for a first service context associated with wireless communications with the core network service based at least in part on a handover procedure from a second DU to the DU; and transmitting, to the DU based at least in part on the second request, the first service context associated with the core network service, wherein communicating the first service message is based at least in part on the first service context.

Aspect 21: The method of any of aspects 18 through 20, further comprising: transmitting, to the DU, a second message indicating the deactivation of the core network service at the UE, wherein receiving the message indicating the deactivation is based at least in part on the second message.

Aspect 22: The method of any of aspects 18 through 21, wherein the deactivation of the core network service is based at least in part on signaling from the core network service, a release of a wireless connection between the UE and the DU, a radio link failure, a failure of one or more messages transmitted from the UE to the core network service, or any combination thereof.

Aspect 23: An apparatus for wireless communication at a UE, comprising a processor; memory coupled with the processor; and instructions stored in the memory and executable by the processor to cause the apparatus to perform a method of any of aspects 1 through 8.

Aspect 24: An apparatus for wireless communication at a UE, comprising at least one means for performing a method of any of aspects 1 through 8.

Aspect 25: A non-transitory computer-readable medium storing code for wireless communication at a UE, the code comprising instructions executable by a processor to perform a method of any of aspects 1 through 8.

Aspect 26: An apparatus for wireless communication at a DU, comprising a processor; memory coupled with the processor; and instructions stored in the memory and executable by the processor to cause the apparatus to perform a method of any of aspects 9 through 17.

Aspect 27: An apparatus for wireless communication at a DU, comprising at least one means for performing a method of any of aspects 9 through 17.

Aspect 28: A non-transitory computer-readable medium storing code for wireless communication at a DU, the code comprising instructions executable by a processor to perform a method of any of aspects 9 through 17.

Aspect 29: An apparatus for wireless communication at a core network service offered by a service-based network, comprising a processor; memory coupled with the processor; and instructions stored in the memory and executable by the processor to cause the apparatus to perform a method of any of aspects 18 through 22.

Aspect 30: An apparatus for wireless communication at a core network service offered by a service-based network, comprising at least one means for performing a method of any of aspects 18 through 22.

Aspect 31: A non-transitory computer-readable medium storing code for wireless communication at a core network service offered by a service-based network, the code comprising instructions executable by a processor to perform a method of any of aspects 18 through 22.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:
communicating, via a distributed unit, a first service message with a first core network service offered by a service-based network, the first service message communicated in accordance with a first service context for communicating with the first core network service, the first service context maintained at the UE based at least in part on the first core network service being in an active state at the UE;
transmitting, to the distributed unit, a request to activate a second core network service offered by the service-based network, the second core network service associated with a second service context for communicating with the second core network service, wherein the second service context is maintained at the UE based at least in part on the second core network service being in an inactive state at the UE;
receiving, from the distributed unit in response to the request, a message indicating an activation of the second core network service at the UE; and
communicating, via a distributed unit, a second service message with the second core network service in accordance with the second service context based at least in part on the activation of the second core network service at the UE.

2. The method of claim 1, further comprising:
transmitting, to the distributed unit, a second request to establish service with a third core network service based at least in part on the third core network service being in an unconnected state at the UE;
receiving, from the distributed unit based at least in part on the second request, a second message indicating a third service context for communicating with the third core network service; and
storing the third service context in memory based at least in part on transitioning the third core network service from the unconnected state to one of the active state or the inactive state at the UE.

3. The method of claim 1, further comprising:
communicating, with the distributed unit, a second message indicating a deactivation of the first core network service at the UE, wherein the first service context is maintained at the UE based at least in part on the deactivation.

4. The method of claim 3, wherein the deactivation of the first core network service is based at least in part on signaling from the first core network service, a release of a wireless connection between the UE and the distributed unit, a radio link failure, a failure of one or more messages transmitted from the UE to the first core network service, or any combination thereof.

5. The method of claim 1, further comprising:
identifying that all core network services including the first core network service and the second core network service have been deactivated at the UE; and
releasing a wireless connection with the distributed unit based at least in part on the identifying.

6. The method of claim 1, further comprising:
transmitting, via the request, a network address associated with the second core network service, a third service message associated with the second core network service, or both.

7. The method of claim 1, further comprising:
transmitting, to the distributed unit, a second request to activate a third core network service offered by the service-based network, the third core network service associated with a third service context for communicating with the third core network service, wherein the third service context is maintained at the UE based at least in part on third core network service being in an inactive state at the UE; and
receiving, from the distributed unit based at least in part on the second request, a second message indicating an activation failure of the third core network service.

8. The method of claim 7, further comprising:
removing the third service context from memory based at least in part on receiving the second message indicating the activation failure of the third service context.

9. A method for wireless communication at a distributed unit, comprising:
communicating a first service message between a user equipment (UE) and a first core network service offered by a service-based network, the first service message communicated in accordance with a first service context for communicating with the first core network service, the first service context maintained at the distributed unit based at least in part on the first core network service being in an active state at the UE;

receiving a request to activate a second core network service offered by the service-based network from an inactive state to the active state at the UE, the second core network service associated with a second service context for communicating with the second core network service;

transmitting, to the UE based at least in part on the request, a message indicating an activation of the second core network service at the UE; and communicating a second service message between the UE and the second core network service in accordance with the second service context based at least in part on the activation of the second core network service at the UE.

10. The method of claim 9, further comprising:
communicating, with the UE, the first core network service, or both, a second message indicating a deactivation of the first core network service at the UE.

11. The method of claim 10, further comprising:
reallocating a set of resources that were previously allocated for wireless communications between the UE and the first core network service to an additional UE, an additional core network service, or both, wherein the reallocation is based at least in part on the second message indicating the deactivation of the first core network service.

12. The method of claim 10, wherein the deactivation of the first core network service is based at least in part on signaling from the first core network service, signaling from the UE, a release of a wireless connection between the UE and the distributed unit, a radio link failure, a failure of one or more messages transmitted from the UE to the first core network service, or any combination thereof.

13. The method of claim 9, further comprising:
establishing a wireless connection with the UE based at least in part on a handover procedure from a second distributed unit to the distributed unit; and
obtaining the first service context associated with the first core network service from the first core network service, an additional core network service, or both, based at least in part on establishing the wireless connection, wherein communicating the first service message is based at least in part on obtaining the first service context.

14. The method of claim 9, further comprising:
transmitting the request to the second core network service based at least in part on receiving the request; and
receiving, from the second core network service based at least in part on transmitting the request, an acknowledgment of the activation of the second core network service, wherein transmitting the message indicating the activation of the second core network service is based at least in part on the acknowledgment.

15. The method of claim 14, further comprising:
receiving, via the request, a network address associated with the second core network service, a third service message associated with the second core network service, or both, wherein transmitting the request to the second core network service is based at least in part on receiving the network address, the third service message, or both.

16. The method of claim 9, further comprising:
receiving, from the UE, a second request to activate a third core network service offered by the service-based network at the UE, the third core network service associated with a third service context for communicating with the third core network service; and
transmitting, to the UE based at least in part on the second request, a second message indicating an activation failure of the third core network service.

17. The method of claim 9, further comprising:
identifying that all core network services including the first core network service and the second core network service have been deactivated at the UE; and
releasing a wireless connection with the UE based at least in part on the identifying.

18. A method for wireless communication at a core network service offered by a service-based network, comprising:
communicating, via a distributed unit, a first service message with a user equipment (UE) in accordance with a first UE context for communicating with the UE, the first UE context maintained at the core network service based at least in part on the core network service being in an active state at the UE;
receiving, from the distributed unit, a message indicating a deactivation of the core network service at the UE, wherein the first UE context is maintained in memory based at least in part on the message indicating the deactivation of the core network service at the UE;
receiving, from the distributed unit, a request to activate the core network service at the UE; and
communicating, via the distributed unit, a second service message with the UE in accordance with the first UE context and based at least in part on maintaining the first UE context in memory and receiving the request to activate the core network service at the UE.

19. The method of claim 18, further comprising:
receiving, from the distributed unit, a second request to establish service with a second UE based at least in part on the core network service being in an unconnected state at the second UE;
transmitting, to the distributed unit based at least in part on the second request, a second message indicating a first service context for communicating with the core network service; and
storing a second UE context associated with the second UE in memory based at least in part on transmitting the second message indicating the first service context.

20. The method of claim 18, further comprising:
receiving, from the distributed unit, a second request for a first service context associated with wireless communications with the core network service based at least in part on a handover procedure from a second distributed unit to the distributed unit; and
transmitting, to the distributed unit based at least in part on the second request, the first service context associated with the core network service, wherein communicating the first service message is based at least in part on the first service context.

21. The method of claim 18, further comprising:
transmitting, to the distributed unit, a second message indicating the deactivation of the core network service at the UE, wherein receiving the message indicating the deactivation is based at least in part on the second message.

22. The method of claim 18, wherein the deactivation of the core network service is based at least in part on signaling from the core network service, a release of a wireless connection between the UE and the distributed unit, a radio link failure, a failure of one or more messages transmitted from the UE to the core network service, or any combination thereof.

23. An apparatus for wireless communication at a user equipment (UE), comprising:
a processor;
memory coupled with the processor; and
instructions stored in the memory and executable by the processor to cause the apparatus to:
communicate, via a distributed unit, a first service message with a first core network service offered by a service-based network, the first service message communicated in accordance with a first service context for communicating with the first core network service, the first service context maintained at the UE based at least in part on the first core network service being in an active state at the UE;
transmit, to the distributed unit, a request to activate a second core network service offered by the service-based network, the second core network service associated with a second service context for communicating with the second core network service, wherein the second service context is maintained at the UE based at least in part on the second core network service being in an inactive state at the UE;
receive, from the distributed unit in response to the request, a message indicating an activation of the second core network service at the UE; and
communicate, via a distributed unit, a second service message with the second core network service in accordance with the second service context based at least in part on the activation of the second core network service at the UE.

24. The apparatus of claim 23, wherein the instructions are further executable by the processor to cause the apparatus to:
transmit, to the distributed unit, a second request to establish service with a third core network service based at least in part on the third core network service being in an unconnected state at the UE;
receive, from the distributed unit based at least in part on the second request, a second message indicating a third service context for communicating with the third core network service; and
store the third service context in memory based at least in part on transitioning the third core network service from the unconnected state to one of the active state or the inactive state at the UE.

25. The apparatus of claim 23, wherein the instructions are further executable by the processor to cause the apparatus to:
communicate, with the distributed unit, a second message indicating a deactivation of the first core network service at the UE, wherein the first service context is maintained at the UE based at least in part on the deactivation.

26. The apparatus of claim 25, wherein the deactivation of the first core network service is based at least in part on signaling from the first core network service, a release of a wireless connection between the UE and the distributed unit, a radio link failure, a failure of one or more messages transmitted from the UE to the first core network service, or any combination thereof.

27. The apparatus of claim 23, wherein the instructions are further executable by the processor to cause the apparatus to:
identify that all core network services including the first core network service and the second core network service have been deactivated at the UE; and
release a wireless connection with the distributed unit based at least in part on the identifying.

28. The apparatus of claim 23, wherein the instructions are further executable by the processor to cause the apparatus to:
transmit, via the request, a network address associated with the second core network service, a third service message associated with the second core network service, or both.

29. The apparatus of claim 23, wherein the instructions are further executable by the processor to cause the apparatus to:
transmit, to the distributed unit, a second request to activate a third core network service offered by the service-based network, the third core network service associated with a third service context for communicating with the third core network service, wherein the third service context is maintained at the UE based at least in part on third core network service being in an inactive state at the UE; and
receive, from the distributed unit based at least in part on the second request, a second message indicating an activation failure of the third core network service.

30. The apparatus of claim 29, wherein the instructions are further executable by the processor to cause the apparatus to:
remove the third service context from memory based at least in part on receiving the second message indicating the activation failure of the third service context.

* * * * *